(12) United States Patent
Yahata et al.

(10) Patent No.: US 11,941,955 B2
(45) Date of Patent: *Mar. 26, 2024

(54) CONTROL METHOD, COMMUNICATION TERMINAL, NON-TRANSITORY COMPUTER-READABLE RECORDING MEDIUM, AND INFORMATION PROVIDING METHOD

(71) Applicant: Panasonic Intellectual Property Management Co., Ltd., Osaka (JP)

(72) Inventors: Hiroshi Yahata, Osaka (JP); Takahiro Nishi, Nara (JP); Tadamasa Toma, Osaka (JP); Toshiyasu Sugio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,816

(22) Filed: Nov. 9, 2022

(65) Prior Publication Data

US 2023/0072479 A1 Mar. 9, 2023

Related U.S. Application Data

(63) Continuation of application No. PCT/JP2021/017030, filed on Apr. 28, 2021.

(30) Foreign Application Priority Data

May 25, 2020 (JP) ................. 2020-090954

(51) Int. Cl.
*G07F 9/00* (2006.01)

(52) U.S. Cl.
CPC ............ *G07F 9/001* (2020.05); *G07F 9/002* (2020.05); *G07F 9/006* (2013.01)

(58) Field of Classification Search
None
See application file for complete search history.

(56) References Cited

U.S. PATENT DOCUMENTS 7,295,889 B2 * 11/2007 Lahteenmaki ......... G16H 20/60
  700/239
7,783,508 B2   8/2010 Murray et al.
(Continued)

FOREIGN PATENT DOCUMENTS

CN   108711066   10/2018
CN   109937429   6/2019
(Continued)

OTHER PUBLICATIONS

International Search Report of PCT application No. PCT/JP2021/017030 dated Aug. 3, 2021.
(Continued)

*Primary Examiner* — Timothy R Waggoner
(74) *Attorney, Agent, or Firm* — Greenblum & Bernstein, P.L.C.

(57) ABSTRACT

A method includes causing a computer of a communication terminal to perform a process including acquiring, in response to receipt of a beacon signal from a vending machine, identification information and type information and stock information of drinks from the vending machine by short-range wireless communication; acquiring preference information on drinks of a user of the communication terminal; acquiring current biological information of the user; generating, based on the identification information, the type information, the stock information, the preference information, and the biological information, a push notification screen that recommends at least one drink matching a preference of the user indicated by the preference information in relation to a current physical condition of the user indicated by the biological information from among the
(Continued)

drinks stored in the vending machine indicated by the identification information; and displaying the push notification screen on a display of the communication terminal.

28 Claims, 46 Drawing Sheets

(56) References Cited

U.S. PATENT DOCUMENTS

| | | | |
|---|---|---|---|
| 9,898,884 B1* | 2/2018 | Arora | G06Q 30/0226 |
| 2006/0081653 A1* | 4/2006 | Boland | G16H 20/60 |
| | | | 222/243 |
| 2011/0054776 A1 | 3/2011 | Petrov et al. | |
| 2015/0348162 A1* | 12/2015 | Morris | G06Q 30/0631 |
| | | | 705/26.7 |
| 2016/0012513 A1 | 1/2016 | Martinez et al. | |
| 2016/0092931 A1 | 3/2016 | Cuppari et al. | |
| 2017/0213464 A1 | 7/2017 | Emadi et al. | |
| 2017/0372370 A1 | 12/2017 | Alnatsheh et al. | |
| 2018/0029859 A1 | 2/2018 | Hevia et al. | |
| 2018/0150863 A1 | 5/2018 | Unnerstall et al. | |
| 2019/0108709 A1 | 4/2019 | Yamazaki et al. | |
| 2019/0295058 A1 | 9/2019 | Shinohara et al. | |
| 2019/0325411 A1 | 10/2019 | Kai | |
| 2020/0364688 A1 | 11/2020 | Hodge et al. | |
| 2021/0152548 A1 | 5/2021 | Motoike et al. | |
| 2021/0312338 A1 | 10/2021 | Stayner et al. | |
| 2022/0172549 A1 | 6/2022 | Chung et al. | |
| 2023/0060260 A1 | 3/2023 | Yahata et al. | |
| 2023/0061868 A1 | 3/2023 | Yahata et al. | |

FOREIGN PATENT DOCUMENTS

| | | |
|---|---|---|
| JP | 2002-109618 | 4/2002 |
| JP | 2002-216035 | 8/2002 |
| JP | 2003-256929 | 9/2003 |
| JP | 2009-282868 | 12/2009 |
| JP | 2011-203952 | 10/2011 |
| JP | 2014-174824 | 9/2014 |
| JP | 2017-068370 | 4/2017 |
| JP | 2017-146937 | 8/2017 |
| JP | 2017-151715 | 8/2017 |
| JP | 2017-162191 | 9/2017 |
| JP | 2017-174320 | 9/2017 |
| JP | 2018-511089 | 4/2018 |
| JP | 2020-057415 | 4/2020 |
| KR | 10-2018-0092505 | 8/2018 |
| WO | 2016/123545 | 8/2016 |
| WO | 2017/165658 | 9/2017 |
| WO | 2018/042668 | 3/2018 |
| WO | 2018/042669 | 3/2018 |

OTHER PUBLICATIONS

Office Action from U.S. Patent and Trademark Office (USPTO) in U.S. Appl. No. 18/053,810, dated Jul. 5, 2023.
Buzz Noose; "6 Creative Vending Machines that make you go WOW"; https://medium.com/@buzznoose/6-creative-vending-machines-that-make-you-go-wow-c8e921fd477e; Jun. 7, 2016 (Year: 2016).
Reuters Life!; "Japan vending machine recommends drinks to buyers"; https://www.reuters.com/article/us-japan-machines/japan-vending-machine-recommends-drinks-to-buyers-idUSTRE6AE0G720101115; Nov. 14, 2010 (Year: 2010).
Office Action from U.S. Patent and Trademark Office (USPTO) in U.S. Appl. No. 18/053,812, dated Jul. 7, 2023.
Office Action issued in Japan Patent Application No. 2022-502262, dated Apr. 19, 2022, together with English translation thereof.
U.S. Appl. No. 18/053,810 to Hiroshi Yahata et al., filed Nov. 9, 2022.
International Search Report of PCT application No. PCT/JP2020/026584 dated Sep. 1, 2020.
Office Action issued in Japan Patent Application No. 2022-502261, dated Apr. 12, 2022, together with English translation thereof.
U.S. Appl. No. 18/053,812 to Hiroshi Yahata et al., filed Nov. 9, 2022.
International Search Report of PCT application No. PCT/JP2021/015829 dated Jul. 20, 2021.
Office Action issued in Japan Patent Application No. 2022-502260, dated Apr. 5, 2022, together with English translation thereof.
Office Action from U.S. Patent and Trademark Office (USPTO) in U.S. Appl. No. 18/053,812, dated Oct. 26, 2023.
English language translation of Search Report issued by the China National Intellectual Property Administration (CNIPA) in Chinese Patent Application No. 202180036611.X, dated Nov. 19, 2023.
Office Action from U.S. Patent and Trademark Office (USPTO) in U.S. Appl. No. 18/053,810, dated Dec. 29, 2023.

* cited by examiner

| BEACON ID | | | IDENTIFICATION INFORMATION FOR IDENTIFYING VENDING MACHINE |
|---|---|---|---|
| UUID | Major | Minor | |
| 0000-0000-0000-0000-000X | 0x1000 | 0x0000 | BUSINESS ENTITY ID=X  VENDING MACHINE ID=0x0000000 |
| 0000-0000-0000-0000-000X | 0x1000 | 0x0001 | BUSINESS ENTITY ID=X  VENDING MACHINE ID=0x0000001 |
| 0000-0000-0000-0000-000X | 0x1000 | 0x1234 | BUSINESS ENTITY ID=X  VENDING MACHINE ID=0x0001234 |
| 0000-0000-0000-0000-000X | 0x1123 | 0x4567 | BUSINESS ENTITY ID=X  VENDING MACHINE ID=0x1234567 |
| ... | ... | ... | ... |

| BEACON ID | | | |
|---|---|---|---|
| FrameType | Namespace ID | Instance ID | IDENTIFICATION INFORMATION FOR IDENTIFYING VENDING MACHINE |
| 0 | X-1 | 000000 | BUSINESS ENTITY ID=X  VENDING MACHINE ID="000000" |
| 0 | X-1 | 001000 | BUSINESS ENTITY ID=X  VENDING MACHINE ID="001000" |
| 0 | X-1 | 123456 | BUSINESS ENTITY ID=X  VENDING MACHINE ID="123456" |
| 0 | X-1 | QWERTY | BUSINESS ENTITY ID=X  VENDING MACHINE ID="QWERTY" |
| ⋮ | ⋮ | ⋮ | ⋮ |

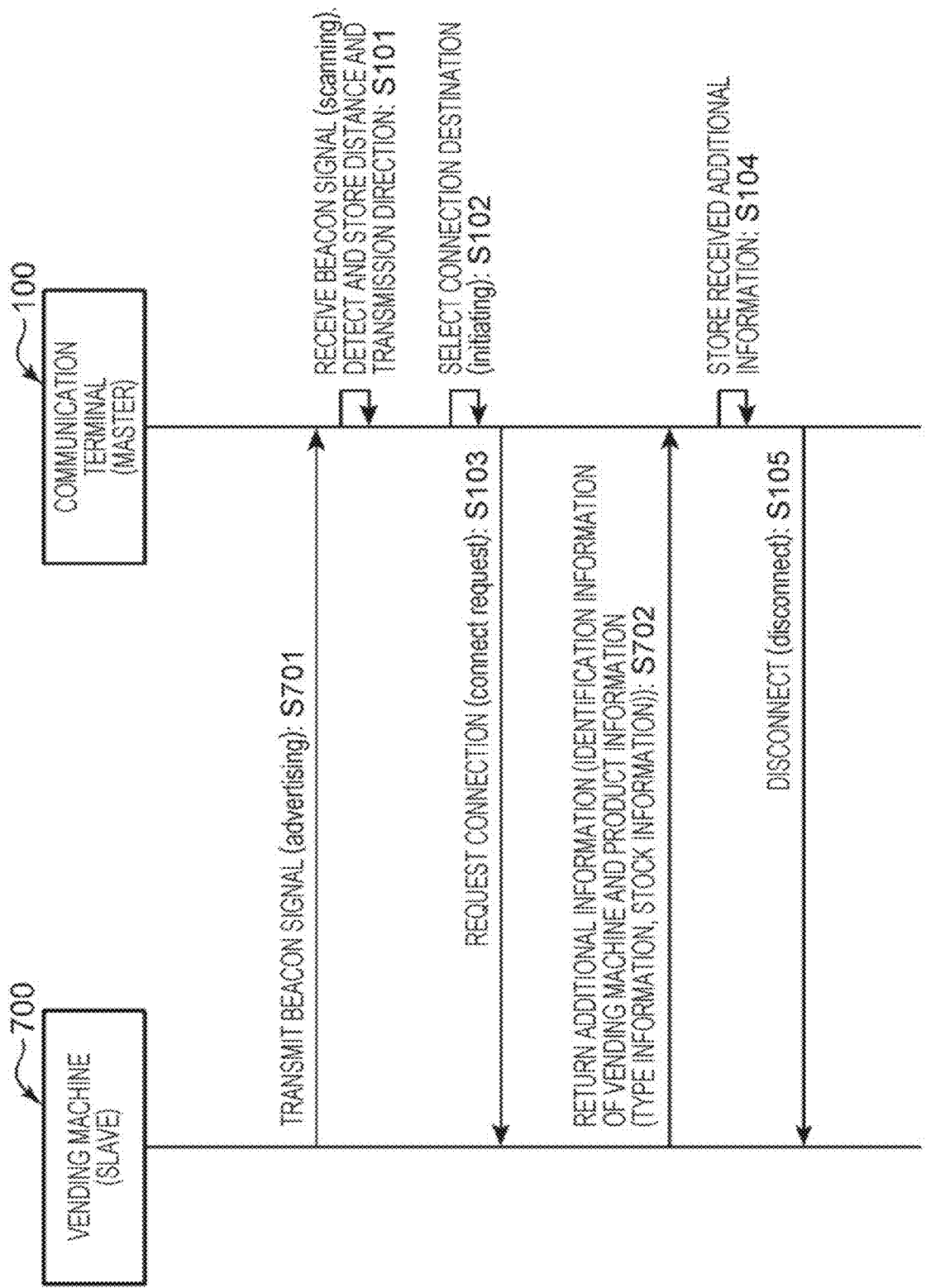

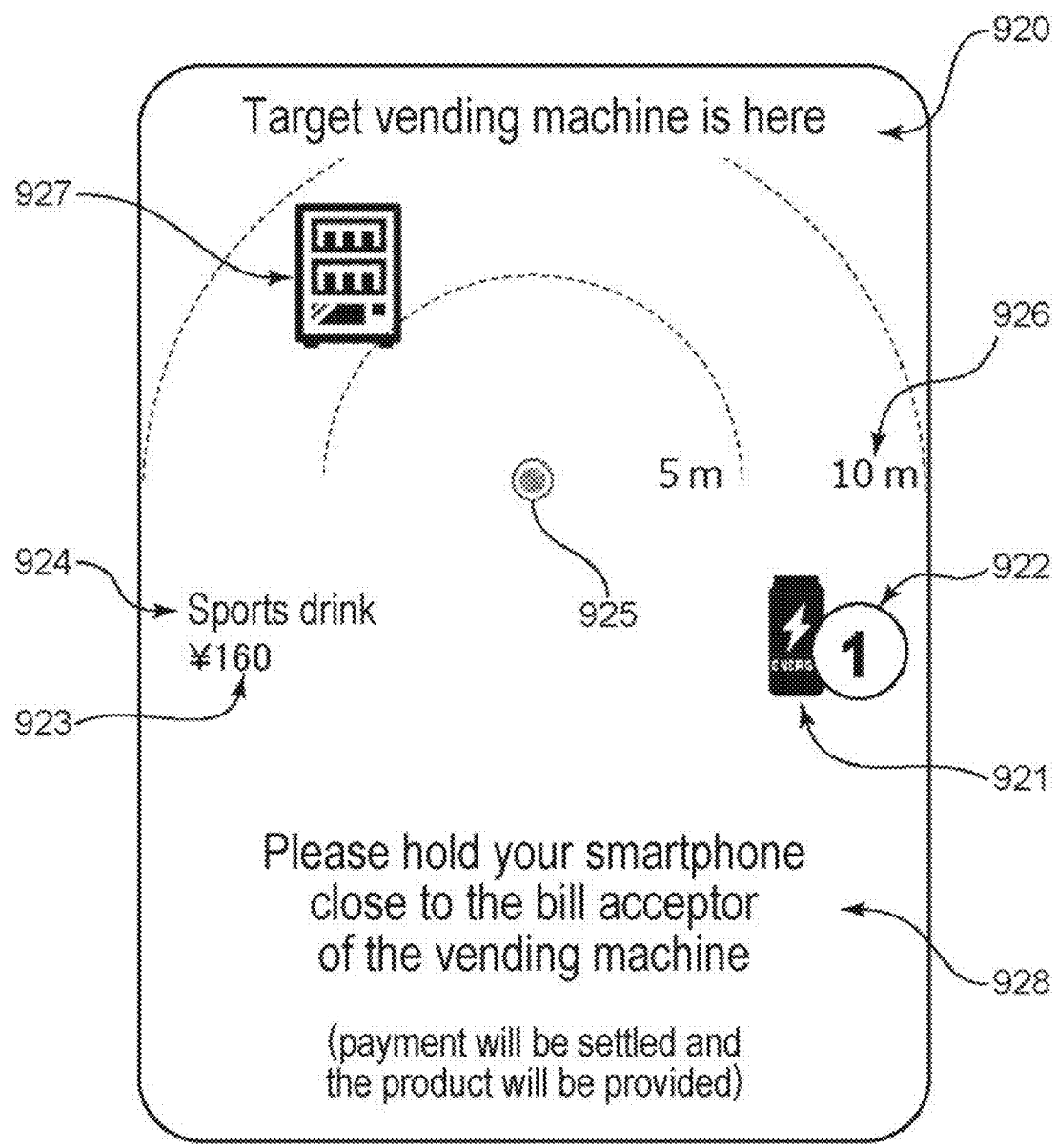

| BEACON ID | BEACON DISTANCE (m) | BEACON DIRECTION (DEGREES) | VENDING MACHINE ID | PRODUCT INFORMATION 1 (PRODUCT NAME, PRICE, QUANTITY, TEMPERATURE) | PRODUCT INFORMATION 2 (PRODUCT NAME, PRICE, QUANTITY, TEMPERATURE) | PRODUCT INFORMATION 3 (PRODUCT NAME, PRICE, QUANTITY, TEMPERATURE) |
|---|---|---|---|---|---|---|
| ID1 | 5.0 | 349 | VENDING MACHINE A | COFFEE 1, 130, 8, 5 | COFFEE 2, 160, 10, 5 | COFFEE 3, 160, 7, 6 |
| ID2 | 5.4 | 26 | VENDING MACHINE B | BEER 1, 250, 7, 6 | BEER 2, 250, 0, 6 | BEER 3, 300, 11, 13 |
| ID3 | 6.1 | 48 | VENDING MACHINE C | CARBONATED DRINK (COLD), 160, 12, 6 | GREEN TEA (COLD), 160, 11, 5 | SPORTS DRINK, 160, 13, 6 |

| USER ID | DATE AND TIME INFORMATION [YYYYMMDDHHMMSS(JST)] | SALES SITE ID | PURCHASED PRODUCT NAME |
|---|---|---|---|
| USR01 | 20200413121545 | CAFE A KADOMA BRANCH | CAPPUCCINO (HOT), ICE CREAM |
| | 20200414095340 | VENDING MACHINE A | GREEN TEA (COLD) |
| | 20200414120811 | RESTAURANT C MORISHOJI BRANCH | SPAGHETTI WITH CLAMS, CAFFE MOCHA (HOT), ICE CREAM |
| | 20200414223442 | CONVENIENCE STORE B GAMO BRANCH | SANDWICH, GREEN TEA (COLD) |
| | : | : | : |

| USER ID | NUMBER OF PURCHASES | PRODUCT NAME | PURCHASE DATE AND TIME |
|---|---|---|---|
| USR01 | 167 | GREEN TEA (COLD) | 20200414223442, 20200414095340, ... |
| | 122 | BOTTLED WATER (COLD) | 20200410113902, ... |
| | 88 | CARBONATED DRINK (COLD) | 20200411214133, ... |
| | 24 | CAFFE MOCHA (HOT) | 20200414120811, ... |
| | : | : | : |

| TEMPERATURE (CELSIUS) [°C] | HUMIDITY [%] | HEAT INDEX (WBGT) [°C] | SOLAR RADIATION [MJ/m²] | WEATHER TYPE |
|---|---|---|---|---|
| 28 | 75 | 29 | 3.1 | SUNNY |

| DATE AND TIME INFORMATION [YYYYMMDDHHMMSS(JST)] | WEATHER INFORMATION | | | | |
|---|---|---|---|---|---|
| | TEMPERATURE (CELSIUS) [°C] | HUMIDITY [%] | HEAT INDEX (WBGT) [°C] | SOLAR RADIATION [MJ/m2] | WEATHER TYPE |
| : | : | : | : | : | : |
| 20200414060000 | 26 | 75 | 27 | 0.1 | SUNNY |
| 20200414070000 | 26 | 77 | 27 | 0.5 | SUNNY |
| 20200414080000 | 27 | 79 | 28 | 1.2 | SUNNY |
| 20200414090000 | 28 | 81 | 29 | 2.1 | SUNNY |

| PRODUCT NAME | AVAILABLE FOR SALE | PAST PREFERENCE (NUMBER OF PURCHASES) | PAST PREFERENCE UNDER SIMILAR WEATHER CONDITION (NUMBER OF PURCHASES) | PRIORITY |
|---|---|---|---|---|
| COFFEE 1 | OK | 0 | 0 | 5 |
| COFFEE 2 | OK | 17 | 6 | 4 |
| COFFEE 3 | OK | 0 | 0 | 5 |
| BEER 1 | OK | 0 | 0 | 5 |
| BEER 2 | NG (SOLD OUT) | 2 | 0 | — |
| BEER 3 | NG (UNSUITABLE TEMPERATURE) | 0 | 0 | — |
| CARBONATED DRINK (COLD) | OK | 88 | 45 | 2 |
| GREEN TEA (COLD) | OK | 167 | 103 | 1 |
| SPORTS DRINK | OK | 20 | 16 | 3 |

| USER ID | MEASUREMENT DATE AND TIME [YYYYMMDDHHMMSS(JST)] | BIOLOGICAL INFORMATION ||||| |
|---|---|---|---|---|---|---|
| | | SYSTOLIC BLOOD PRESSURE [mmHg] | DIASTOLIC BLOOD PRESSURE [mmHg] | HEART RATE [BEATS/min] | BODY WATER PERCENTAGE [%] | BODY TEMPERATURE [°C] |
| USR01 | 20200414060000 | 124 | 79 | 76 | 57.0 | 36.2 |
| | 20200414070000 | 130 | 84 | 88 | 56.8 | 36.3 |
| | 20200414080000 | 135 | 83 | 83 | 56.4 | 36.5 |
| | 20200414090000 | 128 | 78 | 89 | 56.1 | 36.8 |
| | ⋮ | ⋮ | ⋮ | ⋮ | ⋮ | ⋮ |

| PRODUCT NAME | AVAILABLE FOR SALE | PAST PREFERENCE (NUMBER OF PURCHASES) | PAST PREFERENCE UNDER SIMILAR PHYSICAL CONDITION (NUMBER OF PURCHASES) | PRIORITY |
|---|---|---|---|---|
| COFFEE 1 | OK | 0 | 0 | 5 |
| COFFEE 2 | OK | 17 | 2 | 4 |
| COFFEE 3 | OK | 0 | 0 | 5 |
| BEER 1 | OK | 0 | 0 | 5 |
| BEER 2 | NG (SOLD OUT) | 2 | 0 | — |
| BEER 3 | NG (UNSUITABLE TEMPERATURE) | 0 | 0 | — |
| CARBONATED DRINK (COLD) | OK | 88 | 7 | 3 |
| GREEN TEA (COLD) | OK | 167 | 89 | 1 |
| SPORTS DRINK | OK | 20 | 14 | 2 |

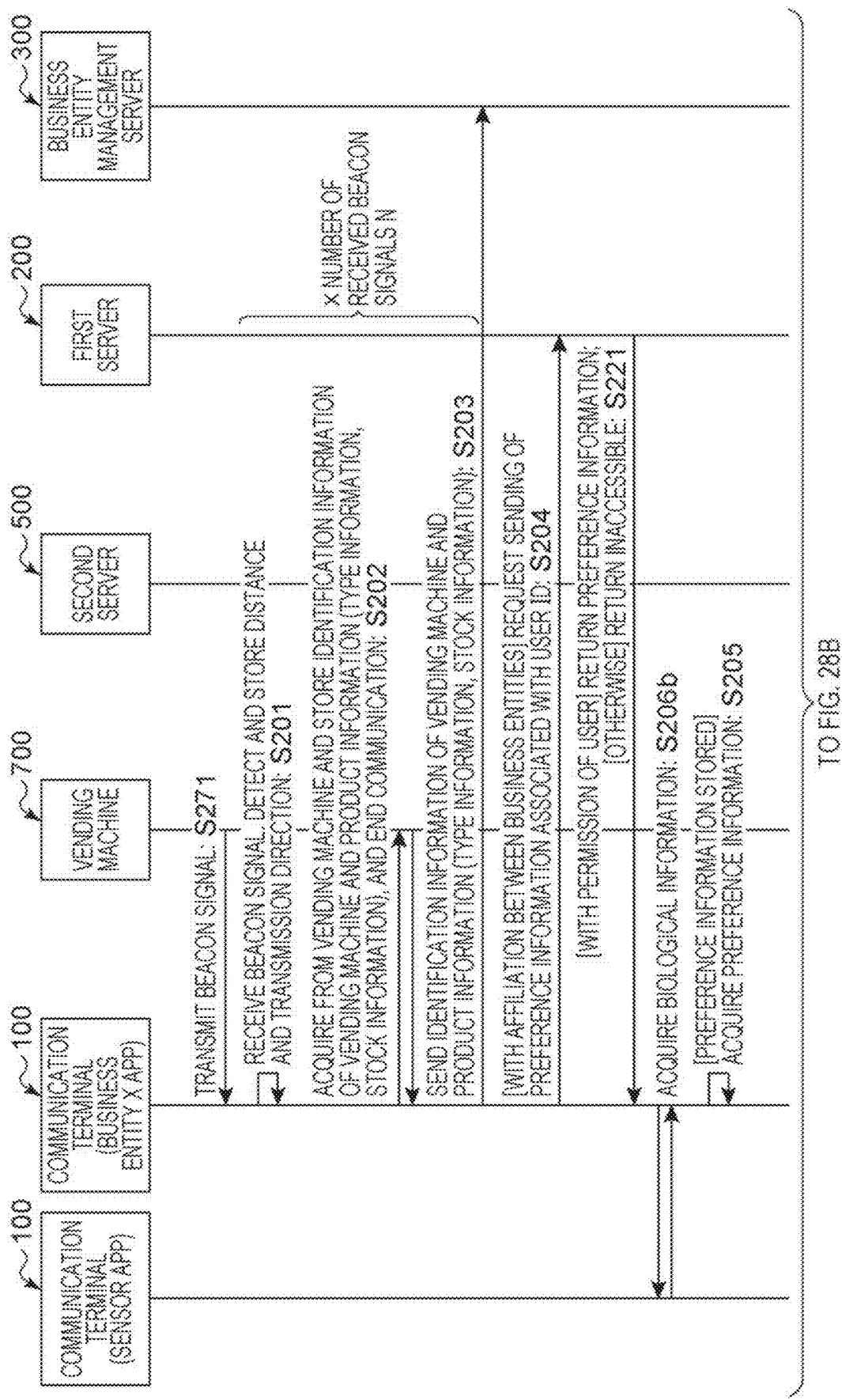

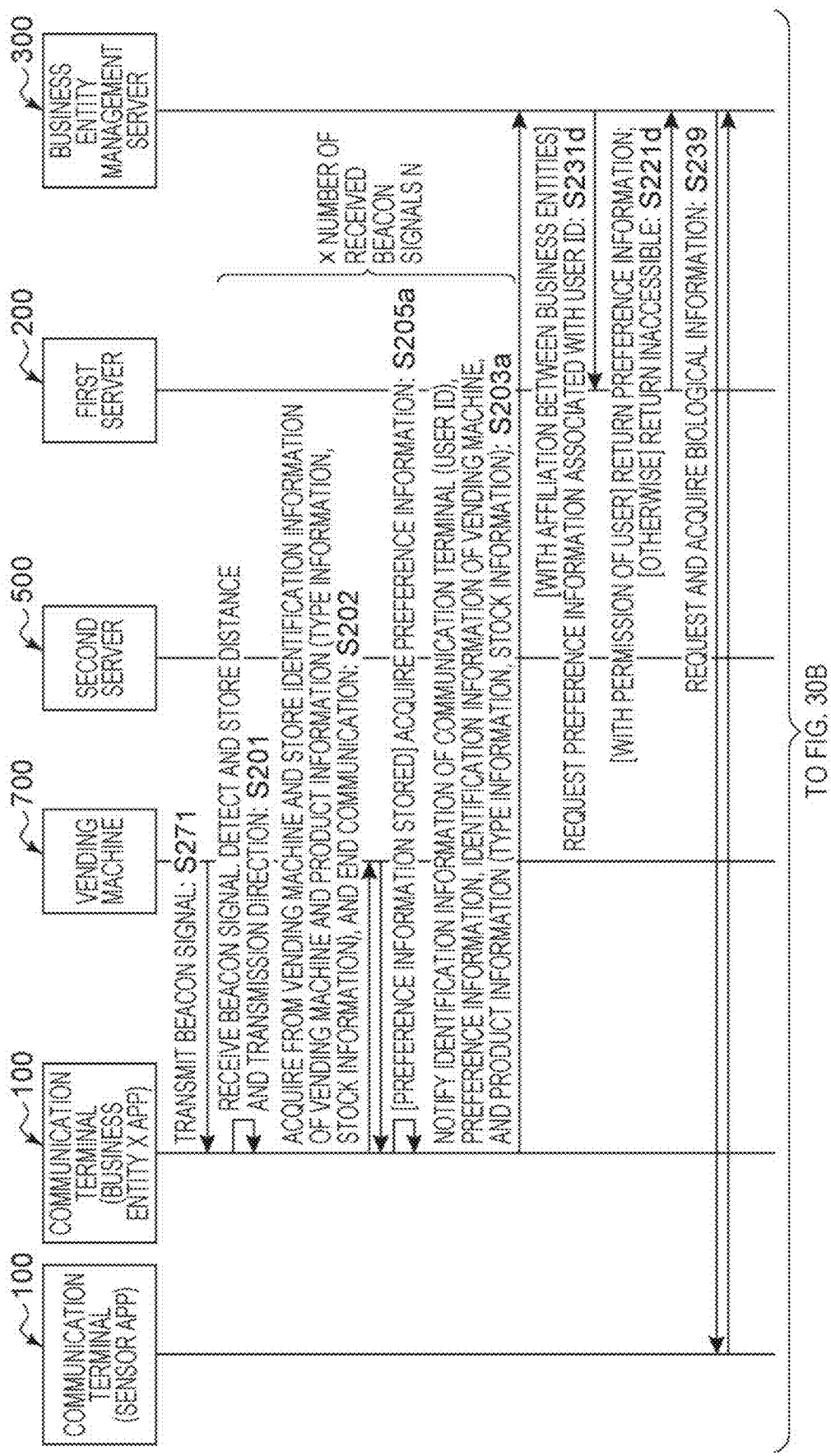

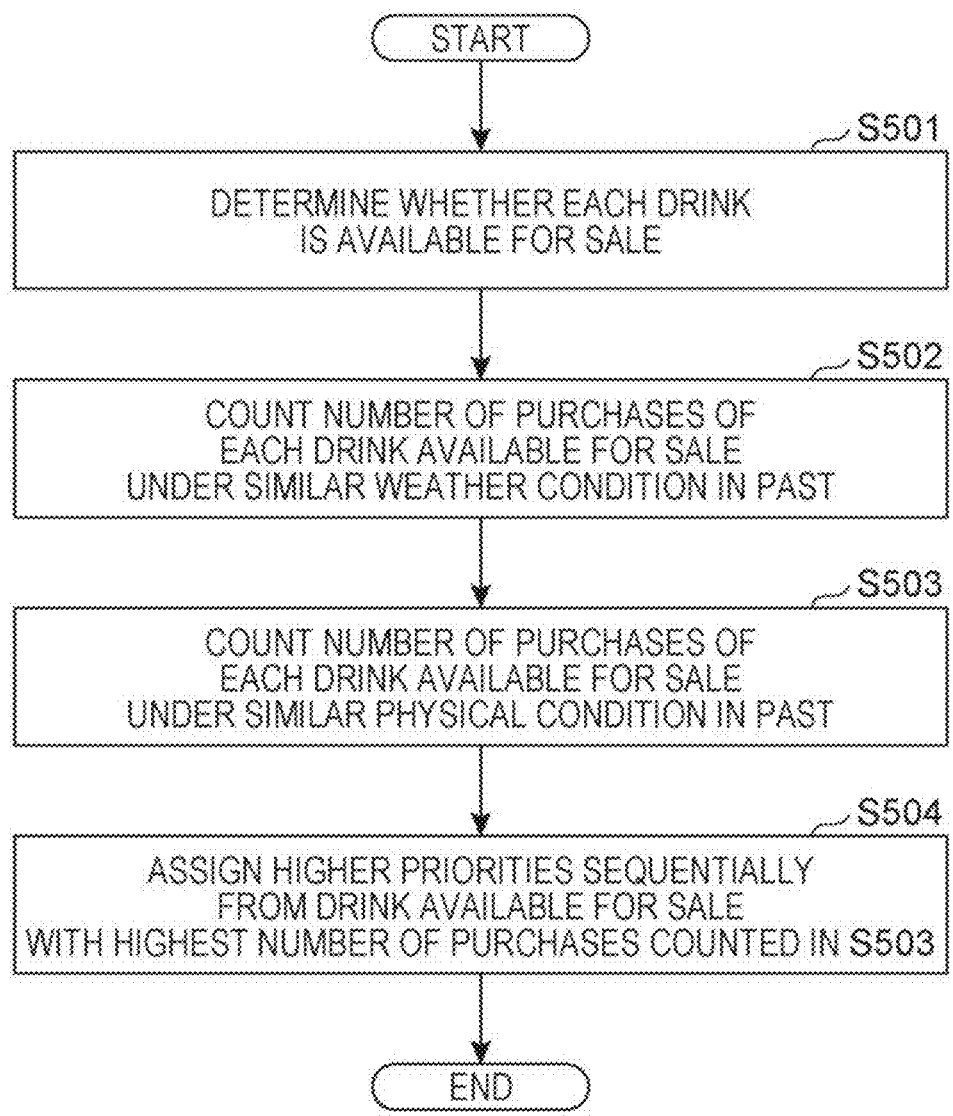

| PRODUCT NAME | AVAILABLE FOR SALE | PAST PREFERENCE (NUMBER OF PURCHASES) | PAST PREFERENCE UNDER SIMILAR WEATHER CONDITION (NUMBER OF PURCHASES) | PAST PREFERENCE UNDER SIMILAR PHYSICAL CONDITION (NUMBER OF PURCHASES) | PRIORITY |
|---|---|---|---|---|---|
| COFFEE 1 | OK | 0 | 0 | 0 | 5 |
| COFFEE 2 | OK | 17 | 6 | 2 | 4 |
| COFFEE 3 | OK | 0 | 0 | 0 | 5 |
| BEER 1 | OK | 0 | 0 | 0 | 5 |
| BEER 2 | NG (SOLD OUT) | 2 | 0 | 0 | — |
| BEER 3 | NG (UNSUITABLE TEMPERATURE) | 0 | 0 | 0 | — |
| CARBONATED DRINK (COLD) | OK | 88 | 45 | 7 | 3 |
| GREEN TEA (COLD) | OK | 167 | 103 | 89 | 1 |
| SPORTS DRINK | OK | 20 | 16 | 14 | 2 |

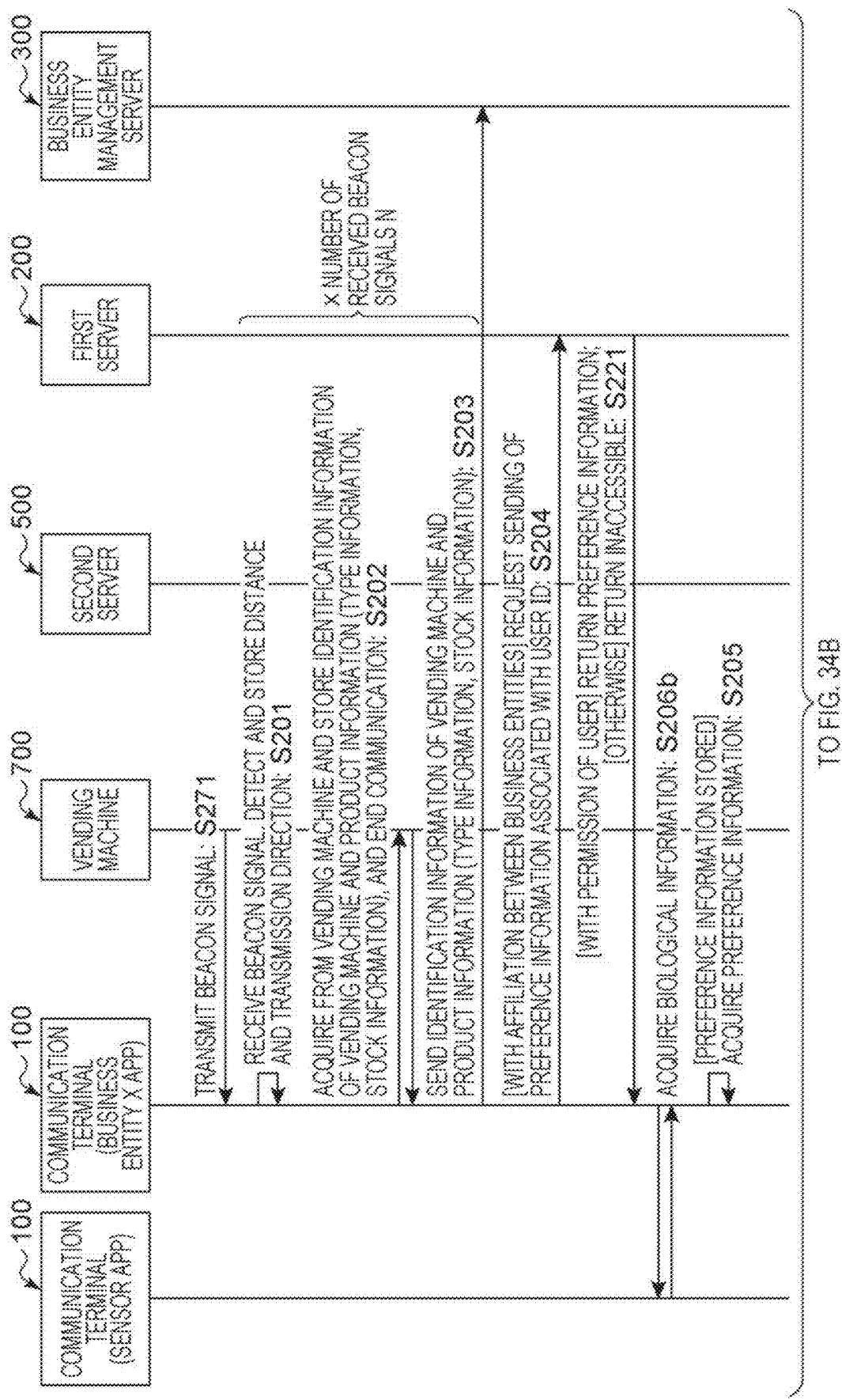

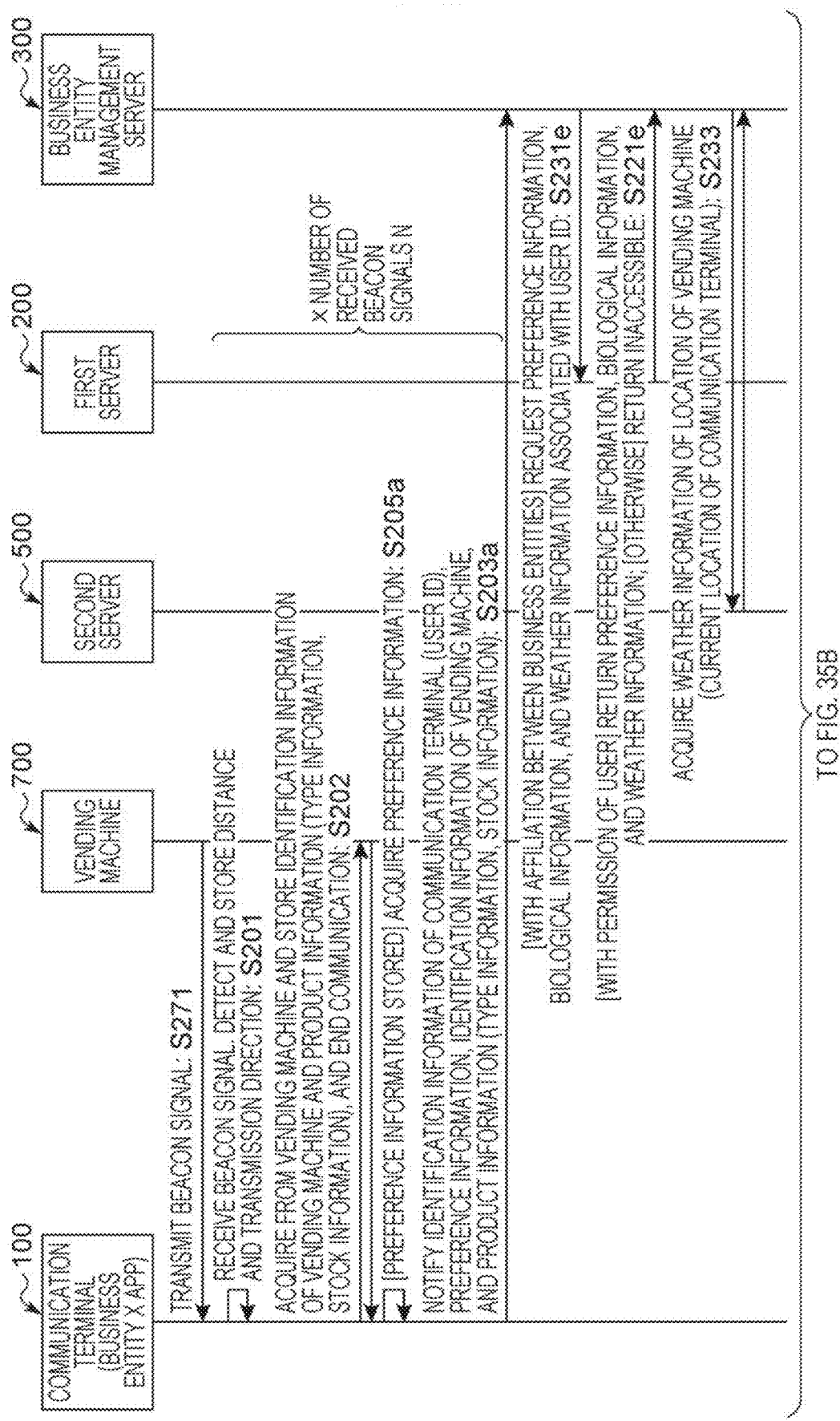

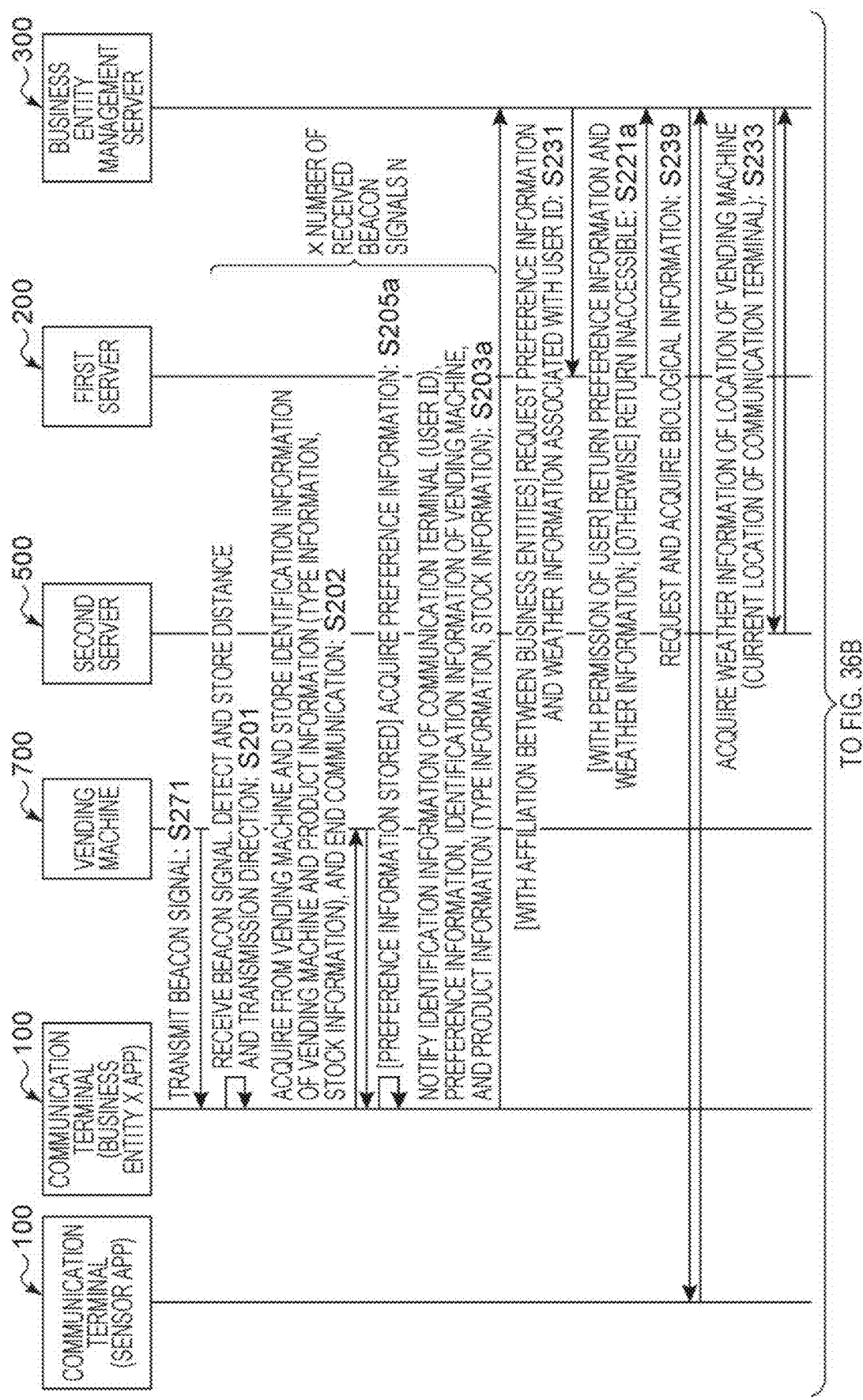

CONTROL METHOD, COMMUNICATION TERMINAL, NON-TRANSITORY COMPUTER-READABLE RECORDING MEDIUM, AND INFORMATION PROVIDING METHOD

BACKGROUND

1. Technical Field

The present disclosure relates to a method executed in a communication terminal, and the like.

2. Description of the Related Art

Japanese Unexamined Patent Application Publication No. 2017-174320 discloses a technique of displaying food and drink provided by a vending machine on a display of a mobile terminal to enable the food and drink provided by the vending machine to be purchased via the mobile terminal.

International Publication No. 2018/042668 discloses a product purchase assistance system including an acquiring unit that acquires a list of products sold by a plurality of vending machines within a predetermined range from a mobile terminal, and a display control unit that performs control for displaying product information on the products included in the list on a display of the mobile terminal.

Japanese Unexamined Patent Application Publication No. 2011-203952 discloses a vending machine that changes in real time products to be sold to products that match an external environment (such as the season or time) and a state of a purchaser (such as the gender, age group, or body temperature).

SUMMARY

One non-limiting and exemplary embodiment provides further improvement in the related art described above.

In one general aspect, the techniques disclosed here feature a method executed in a communication terminal, the communication terminal including a user ID for identifying a user of the communication terminal, the method including causing a computer of the communication terminal to perform a process including: acquiring, in response to receipt of a beacon signal from a vending machine of drinks, from the vending machine by using short-range wireless communication, i) identification information for identifying the vending machine, ii) type information indicating product names of a plurality of drinks stored in the vending machine, and iii) stock information indicating quantities of stock of the plurality of drinks stored in the vending machine; transmitting the user ID to a first server that securely manages personal information including preference information on drinks of the user of the communication terminal, wherein the preference information on drinks of the user includes information on goods purchased by the user at a sales site managed by a business operator affiliated with a management operator of the first server; acquiring, from the first server, the preference information on drinks of the user corresponding to the user ID, when it is confirmed at the first server that the acquisition of the preference information on drinks of the user is permitted by the user; acquiring current biological information of the user; generating a push notification screen, based on the identification information, the type information, the stock information, the preference information, and the biological information, wherein the push notification screen recommends at least one drink that matches a preference of the user indicated by the preference information in relation to a current physical condition of the user indicated by the biological information, from among the plurality of drinks stored in the vending machine indicated by the identification information; and displaying the push notification screen on a display of the communication terminal.

According to the aspect described above, further improvement can be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a table indicating a relationship between a beacon identifier (ID) and identification information for identifying a vending machine;

FIG. 5 is a diagram illustrating an example of a table indicating a relationship between a beacon ID and identification information of a vending machine;

FIG. 6 is a sequence diagram illustrating a process of short-range wireless communication using a beacon signal;

FIG. 8 is a diagram illustrating a display example of a push notification screen;

FIG. 9 is a diagram illustrating a display example of a push notification screen;

FIG. 15 is a diagram illustrating an example of a scene in which the user of the communication terminal acquires the purchased drink;

FIG. 16 is a diagram illustrating an example of a data configuration of information stored in a memory of the communication terminal when a beacon signal is received;

FIG. 17 is a diagram illustrating an example of a data configuration of purchase history information for each user stored in a memory of a first server;

FIG. 18 is a diagram illustrating an example of a data configuration of preference information included in personal information of the user stored in the memory of the first server;

FIG. 19 is a diagram illustrating an example of a data configuration of weather information of a current location of the communication terminal;

FIG. 20 is a diagram illustrating an example of a data configuration of a history of the weather information of the current location of the communication terminal;

FIG. 22 is a diagram illustrating an example of a work table used in the drink determination process;

FIG. 25 is a diagram illustrating an example of a biological information table;

FIG. 27 is a diagram illustrating an example of a work table used in the drink determination process illustrated in FIG. 26;

FIGS. 28A and 28B are a sequence diagram illustrating an example of an overview of a process performed in a vending machine management system in a fourth embodiment;

FIGS. 30A and 30B are a sequence diagram illustrating an example of an overview of a process performed in a vending machine management system in a sixth embodiment;

FIG. 32 is a flowchart illustrating an example of a drink determination process;

FIG. 33 is a diagram illustrating an example of a work table used in the drink determination process illustrated in FIG. 32;

FIGS. 34A and 34B are a sequence diagram illustrating an example of an overview of a process performed in a vending machine management system in an eighth embodiment;

FIGS. 35A and 35B are a sequence diagram illustrating an example of an overview of a process performed in a vending machine management system in a ninth embodiment; and FIGS. 36A and 36B are a sequence diagram illustrating an example of an overview of a process performed in a vending machine management system in a tenth embodiment.

DETAILED DESCRIPTIONS

Figure 1:
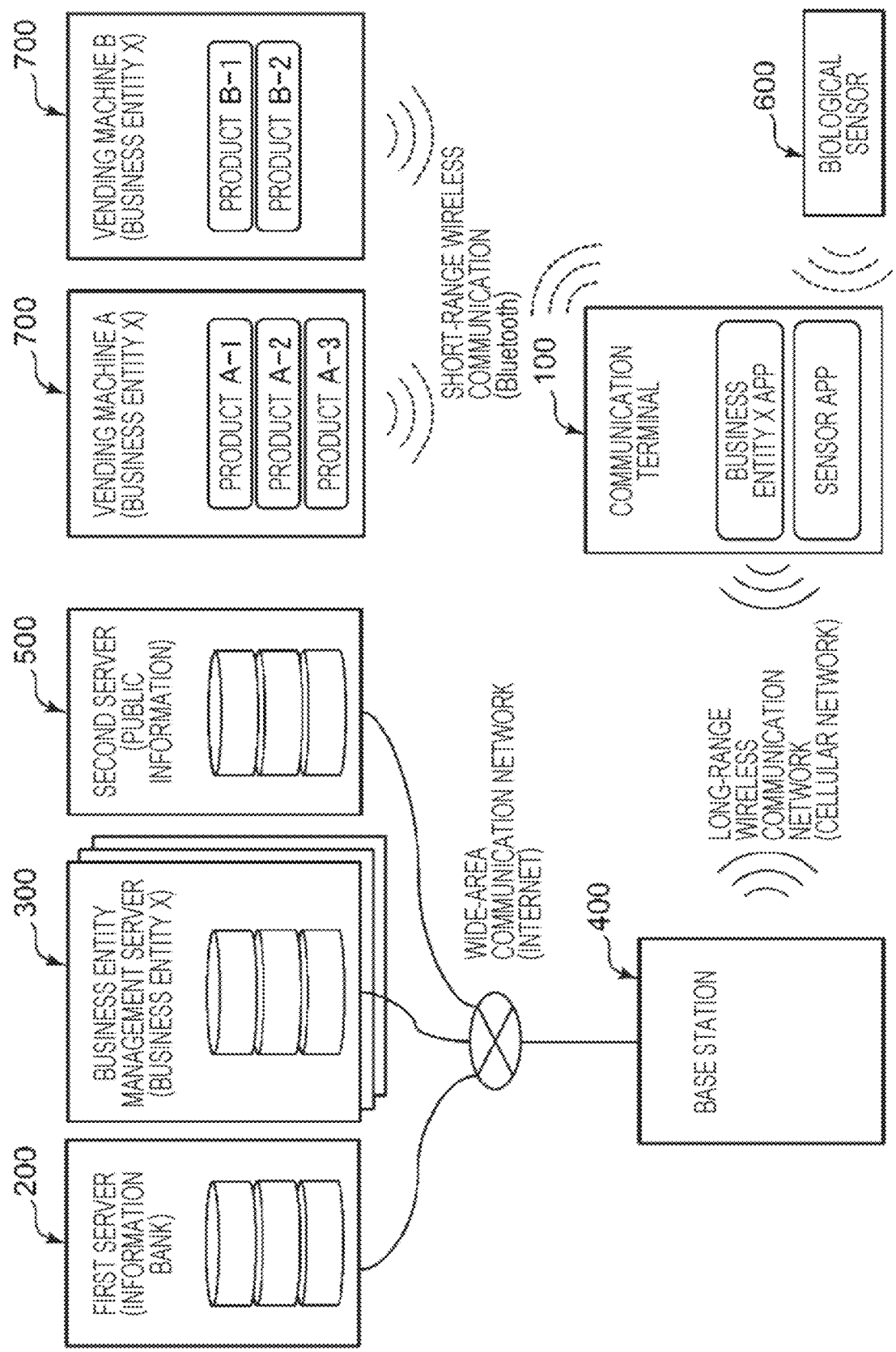
FIG. 1 is a diagram illustrating an example of an overview of an information infrastructure of a vending machine management system according to embodiments of the present disclosure.

Underlying Knowledge Forming Basis of the Present Disclosure

In the related art, a vending machine merely passively sells a product in response to an access from a user. For example, even if a vending machine sells a product desired by a user at a timing when the user passes in front of the vending machine, the product is not sold to the user unless the user accesses the vending machine.

In the related art described above, the vending machine merely passively sells a product in response to an access from a user. That is, the vending machine is unable to actively access the user.

The present disclosure has been made on the basis of such knowledge, and provides a technique for allowing a vending machine to actively access a user in response to a push notification and to recommend, to the user, a product which the user presumably desires at a timing when the user passes in front of the vending machine.

A method according to a first aspect of the present disclosure is a control method executed in a communication terminal, the communication terminal including a user ID for identifying a user of the communication terminal, the method including causing a computer of the communication terminal to perform a process including:

acquiring, in response to receipt of a beacon signal from a vending machine of drinks, from the vending machine by using short-range wireless communication, i) identification information for identifying the vending machine, ii) type information indicating product names of a plurality of drinks stored in the vending machine, and iii) stock information indicating quantities of stock of the plurality of drinks stored in the vending machine;

transmitting the user ID to a first server that securely manages personal information including preference information on drinks of the user of the communication terminal, wherein the preference information on drinks of the user includes information on goods purchased by the user at a sales site managed by a business operator affiliated with a management operator of the first server;

acquiring from the first server, the preference information on drinks of the user corresponding to the user ID, when it is confirmed at the first server that the acquisition of the preference information on drinks of the user is permitted by the user;

acquiring current biological information of the user;

generating a push notification screen, based on the identification information, the type information, the stock information, the preference information, and the biological information, wherein the push notification screen recommends at least one drink that matches a preference of the user indicated by the preference information in relation to a current physical condition of the user indicated by the biological information, from among the plurality of drinks stored in the vending machine indicated by the identification information; and displaying the push notification screen on a display of the communication terminal.

According to this aspect, the push notification screen that recommends at least one drink that matches the preference of the user is displayed on the display of the communication terminal of the user in response to the user merely passing in front of the vending machine, irrespective of a purchase intention of the user.

The "preference information on drinks of the user" is acquired from the first server having a function of a so-called information bank that securely manages personal information including this preference information on drinks of the user. The preference information on drinks of the user includes information on a product purchased by the user at a sales site managed by a business entity that has an affiliation with a managing business entity of the first server. Thus, at least one drink can be recommended that highly accurately matches the preference of the user based on a history of a larger number of orders placed in the past at not only the vending machine but also other sales sites such as retail stores, restaurants, and affiliated stores. The "preference information on drinks of the user" may be acquired from the first server in response to permission of the user being confirmed in the first server.

A purchase menu from the vending machine is not displayed but the push notification screen for displaying the purchase menu may be displayed. In this case, irksomeness caused by the purchase menu from the vending machine being displayed irrespective of the absence of the purchase intention of the user can be reduced.

The push notification screen is generated by taking into account the preference information on drinks of the user and the current physical condition of the user. Thus, a drink can be recommended that matches the preference of the user at a timing when the user passes in front of or is near the vending machine.

If the user displays the purchase menu according to their will when purchasing the recommended drink, the user takes the initiative in determining whether to display the purchase menu.

As described above, the preference information is acquired from the first server, such as an information bank, that securely manages the personal information including the preference information on drinks of the user. Thus, high security is ensured and leakage of the personal information can be prevented. If the preference information is used in accordance with the permission of the user, an accuracy of matching the preference of the user can be increased based on a history of a larger number of orders placed in past at other sales sites such as retail stores, restaurants, and affiliated stores as well as the information held by the vending machine or the business entity management server while ensuring the security.

Thus, a drink can be recommended that highly accurately matches the preference of the user at a timing when the user passes in front of or is near the vending machine while reducing irksomeness caused by the purchase menu of drinks being displayed on the display of the communication terminal against the intention of the user and preventing leakage of the personal information or the like.

In the method described above, the push notification screen may be used for displaying, on the display of the communication terminal, a purchase menu that allows the at least one drink to be purchased from among the plurality of drinks stored in the vending machine.

According to this aspect, a user who wishes to purchase a drink after viewing the push notification screen can use the push notification screen to display, on the display, the purchase menu that allows the user to purchase the at least one drink that matches the preference of the user. Thus, the user who wishes to purchase a drink after viewing the push notification screen can quickly purchase the at least one drink that matches the preference of the user.

In the method described above, the process may further include generating, when the push notification screen displayed on the display of the communication terminal is selected, an individual purchase menu for the user, based on the type information, the stock information, the preference information, and the biological information, wherein the individual purchase menu displays drinks that match the preference of the user indicated by the preference information in according to an order matching the preference of the user in relation to the current physical condition of the user indicated by the biological information from among the plurality of drinks stored in the vending machine indicated by the identification information; and displaying the individual purchase menu on the display of the communication terminal.

According to this aspect, by selecting the push notification screen, the user who wishes to purchase a drink after viewing the push notification screen can display, on the display, the individual purchase menu that displays drinks that match the preference of the user in according to an order matching the preference of the user in relation to the current physical condition of the user. Thus, the user who wishes to purchase a drink after viewing the push notification screen can browse the drinks that match the preference of the user under the physical condition of the user at that time in according to the order matching the preference of the user and can purchase any of the drinks.

In the method described above, the process may further include displaying, on the display on which the push notification screen is displayed, a direction indicating a transmission direction of the beacon signal transmitted from the vending machine.

According to this aspect, the direction indicating the transmission direction of the beacon signal transmitted from the vending machine of drinks is displayed on the display on which the push notification screen is displayed. Thus, the user of the communication terminal can easily know the direction in which the vending machine that sells the drink recommended in the push notification screen is present.

In the method described above, the process may further include displaying, on the display on which the individual purchase menu is displayed, a direction indicating a transmission direction of the beacon signal transmitted from the vending machine.

According to this aspect, the direction indicating the transmission direction of the beacon signal transmitted from the vending machine of drinks is displayed on the display on which the individual purchase menu is displayed. Thus, the user of the communication terminal can easily know the direction in which the vending machine storing the drinks displayed in the individual purchase menu is present.

In the method described above, the process may further include receiving a beacon signal from the vending machine; and erasing the display of the push notification screen after receipt of the beacon signal is not detected for a predetermined time.

According to this aspect, if receipt of a beacon signal from the vending machine is not detected for the predetermined time, the displayed push notification screen is erased. Thus, when the predetermined time elapses since the user moves to a place where the beacon signal is not receivable and the user presumably does not wish to purchase any drink from the vending machine, it can be avoided that the push notification screen that recommends a drink is kept uselessly displayed on the display.

In the method described above, the current biological information of the user may be stored in the first server and may be acquired from the first server.

According to this aspect, the current biological information of the user of the communication terminal is acquired from the first server that stores the personal information of the user. Thus, providing a configuration necessary for storing the current biological information of the user in the communication terminal can be omitted.

In the method described above, the current biological information of the user may be acquired from a biological sensor included in the communication terminal.

According to this aspect, the current biological information of the user of the communication terminal is acquired from the biological sensor included in the communication terminal. Thus, the current biological information of the user at the current location of the communication terminal can be acquired.

In the method described above, the current biological information of the user may be acquired, via the communication terminal, from a biological sensor capable of communicating with the communication terminal.

According to this aspect, the current biological information of the user of the communication terminal is acquired, via the communication terminal, from the biological sensor capable of communicating with the communication terminal. Thus, even if the biological sensor is located at a place away from the communication terminal, the current biological information of the user can be acquired.

In the method described above, the biological information may include information on at least one of a systolic blood pressure, a diastolic blood pressure, a heart rate, a body water percentage, or a body temperature.

According to this aspect, the push notification screen is generated by taking into account the preference information on the drinks of the user of the communication terminal and at least one of the systolic blood pressure, the diastolic blood pressure, the heart rate, the body water percentage, or the body temperature of the user. Thus, a drink can be recommended that matches the preference of the user suitable for at least one of the systolic blood pressure, the diastolic blood pressure, the heart rate, the body water percentage, or the body temperature when the user passes in front of the vending machine.

The present disclosure can also be implemented as a program that causes a computer to execute each characteristic configuration included in the method according to the first aspect described above, or as a communication terminal that operates based on this program. Obviously, such a computer program can be distributed via a non-transitory computer-readable recording medium such as a compact disc read-only memory (CD-ROM) or via a communication network such as the Internet.

A method according to a second aspect of the present disclosure is a control method executed in a communication terminal, the method including causing a computer of the communication terminal to perform a process including:

acquiring, in response to receipt of a first beacon signal from a first vending machine of drinks, from the first vending machine by using short-range wireless communication, i) first identification information for identifying the first vending machine, ii) first type information indicating product names of a first group of drinks stored in the first vending machine, and iii) first stock information indicating quantities of stock of the first group of drinks stored in the first vending machine;

acquiring, in response to receipt of a second beacon signal from a second vending machine of drinks, from the second vending machine by using short-range wireless communication, i) second identification information for identifying the second vending machine, ii) second type information indicating product names of a second group of drinks stored in the second vending machine, and iii) second stock information indicating quantities of stock of the second group of drinks stored in the second vending machine;

transmittin a user ID for identifying a user of the communication terminal to a first server that securely manages personal information including preference information on drinks of the user of the communication terminal, wherein the preference information on drinks of the user includes information on goods purchased by the user at a sales site managed by a business operator affiliated with a management operator of the first server;

acquiring, from the first server, the preference information on drinks of the user corresponding to the user ID, when it is confirmed at the first server that the acquisition of the preference information on drinks of the user is permitted by the user;

acquiring current biological information of the user;

generating a push notification screen, based on the first identification information, the first type information, the first stock information, the second identification information, the second type information, the second stock information, the preference information, and the biological information, wherein the push notification screen recommends at least one drink that matches a preference of the user indicated by the preference information in relation to a current physical condition of the user indicated by the biological information, from among the first group of drinks stored in the first vending machine indicated by the first identification information and the second group of drinks stored in the second vending machine indicated by the second identification information; and displaying the push notification screen on a display of the communication terminal.

According to this aspect, the push notification screen that recommends at least one drink that matches the preference of the user is displayed on the display of the communication terminal of the user in response to the user merely passing in front of the first vending machine and the second vending machine that respectively sell the first group of drinks and the second group of drinks and are installed adjacently to each other, irrespective of a purchase intention of the user.

A first purchase menu from the first vending machine of the first group of drinks and a second purchase menu from the second vending machine of the second group of drinks are not displayed but merely the push notification screen for recommending purchase is displayed. Thus, irksomeness caused by the first purchase menu and the second purchase menu being displayed irrespective of the absence of the purchase intention of the user can be reduced.

The push notification screen is generated by taking into account the preference information on drinks of the user and the current physical condition of the user. Thus, a drink can be recommended that matches the preference of the user at a timing when the user passes in front of or is near the first vending machine and the second vending machine from both the first group of drinks stored in the first vending machine and the second group of drinks stored in the second vending machine.

When the user purchases the recommended drink, the user displays the first purchase menu and the second purchase menu according to their will. Thus, the user takes the initiative in determining whether to display these purchase menus.

Thus, a drink can be recommended that matches the preference of the user at a timing when the user passes in front of or is near the first vending machine and the second vending machine that respectively sell the first group of drinks and the second group of drinks and are installed in proximity to each other, while reducing irksomeness caused by the purchase menu of drinks being displayed on the display of the communication terminal against the intention of the user.

In the method described above, the push notification screen may be used for displaying, on the display of the communication terminal, a purchase menu that allows the at least one drink to be purchased from among the first group of drinks stored in the first vending machine and the second group of drinks stored in the second vending machine.

According to this aspect, a user who wishes to purchase a drink after viewing the push notification screen can use the push notification screen to display, on the display, the purchase menu that allows the user to purchase the at least one drink that matches the preference of the user from among the first group of drinks stored in the first vending machine and the second group of drinks stored in the second vending machine. Thus, the user who wishes to purchase a drink after viewing the push notification screen can quickly purchase the at least one drink that matches the preference of the user without any effort to display the individual purchase menu from the vending machine.

In the method described above, the process may further include generating, when the push notification screen displayed on the display of the communication terminal is selected, an individual purchase menu for the user, based on the first type information, the first stock information, the second type information, the second stock information, the preference information, and the biological information, wherein the individual purchase menu displays drinks that match the preference of the user indicated by the preference information in according to an order matching the preference of the user in relation to the current physical condition of the user indicated by the biological information from among the first group of drinks stored in the first vending machine indicated by the first identification information and the second group of drinks stored in the second vending machine indicated by the second identification information; and displaying the individual purchase menu on the display of the communication terminal.

According to this aspect, by selecting the push notification screen, the user who wishes to purchase a drink after viewing the push notification screen can display, on the display, the individual purchase menu that displays drinks that match the preference of the user in according to an order matching the preference of the user in relation to the current physical condition of the user. Thus, the user who wishes to purchase a drink after viewing the push notification screen can purchase a drink that matches the preference of the user under the physical condition of the user at that time while being sensible of the order of the degree of matching the preference of the user.

In the method described above, the process may further include displaying, on the display on which the push notification screen is displayed, at least one of a first direction indicating a transmission direction of the first beacon signal transmitted from the first vending machine or a second direction indicating a transmission direction of the second beacon signal transmitted from the second vending machine.

According to this aspect, at least one of the first direction indicating the transmission direction of the first beacon signal transmitted from the first vending machine or the second direction indication indicating the transmission direction of the second beacon signal transmitted from the second vending machine is displayed on the display on which the push notification screen is displayed. Thus, the user of the communication terminal can easily know the direction in which at least one of the first vending machine or the second vending machine recommended in the push notification screen is present.

In the method described above, when one drink is displayed in the push notification screen, a direction indicating a transmission direction of a beacon signal transmitted from the vending machine storing the one drink may be displayed together with the one drink.

According to this aspect, the user can easily know the direction of the vending machine storing the drink recommended in the push notification screen.

In the method described above, the process may further include, when one drink is selected using the individual purchase menu displayed on the display, based on a transmission direction of the first beacon signal or the second beacon signal transmitted from one vending machine storing the one drink among the first vending machine and the second vending machine, displaying, on the display on which the individual purchase menu is displayed, a direction indicating the one vending machine.

According to this aspect, when one drink is selected using the individual purchase menu, the direction indication indicating the one vending machine storing the one drink among the first vending machine and the second vending machine is displayed on the display on which the individual purchase menu is displayed. Thus, the user of the communication terminal can easily grasp the direction in which the vending machine storing the one drink selected using the individual purchase menu is present.

The present disclosure can also be implemented as a program that causes a computer to execute each characteristic configuration included in the control method according to the second aspect described above, or as a communication terminal that operates based on this program. Obviously, such a computer program can be distributed via a non-transitory computer-readable recording medium such as a CD-ROM or via a communication network such as the Internet.

A method according to a third aspect of the present disclosure is an information providing method for a vending machine management system that manages stock information for a vending machine for drinks, the information providing method including:

acquiring, from a communication terminal via a network, i) a user ID for identifying a user of the communication terminal, ii) identification information for identifying the vending machine, iii) type information indicating product names of a plurality of drinks stored in the vending machine, and iv) the stock information indicating quantities of stock of the plurality of drinks stored in the vending machine, wherein ii) the identification information, iii) the type information, and iv) the stock information are acquired at the communication terminal from the vending machine of drinks by using short-range wireless communication in response to receipt of a beacon signal from the vending machine;

transmitting the user ID to a first server that securely manages personal information including preference information on drinks of the user of the communication terminal, wherein the preference information on drinks of the user includes information on goods purchased by the user at a sales site managed by a business operator affiliated with a management operator of the first server;

acquiring, from the first server, the preference information on drinks of the user corresponding to the user ID, when it is confirmed at the first server that the acquisition of the preference information on drinks of the user is permitted by the user;

acquiring current biological information of the user via a network;

generating information of a push notification screen, based on the identification information, the type information, the stock information, the preference information, and the biological information, wherein the push notification screen recommends at least one drink that matches a preference of the user indicated by the preference information in relation to a current physical condition of the user indicated by the biological information, from among the plurality of drinks stored in the vending machine indicated by the identification information; and outputting the information of the push notification screen to the communication terminal to display the push notification screen on a display of the communication terminal.

According to this aspect, the push notification screen that recommends at least one drink that matches the preference of the user is displayed on the display of the communication terminal of the user in response to the user merely passing in front of or being near the vending machine of drinks, irrespective of a purchase intention of the user.

The "preference information on drinks of the user" is acquired from the first server having a function of a so-called information bank that securely manages personal information including this preference information on drinks of the user. The preference information on drinks of the user includes information on a product purchased by the user at a sales site managed by a business entity that has an affiliation with a managing business entity of the first server. Thus, at least one drink can be recommended that highly accurately matches the preference of the user based on a history of a larger number of orders placed in the past at not only the vending machine but also other sales sites such as retail stores, restaurants, and affiliated stores. The "preference information on drinks of the user" may be acquired from the first server in response to permission of the user being confirmed in the first server.

A purchase menu from the vending machine of drinks is not displayed but the push notification screen for displaying the purchase menu may be displayed. In this case, irksomeness caused by the purchase menu from the vending machine being displayed irrespective of the absence of the purchase intention of the user can be reduced.

The push notification screen is generated by taking into account the preference information on drinks of the user and the current physical condition of the user. Thus, a drink can be recommended that matches the preference of the user at a timing when the user passes in front of or is near the vending machine.

When the user purchases the recommended drink, the user displays the purchase menu according to their will. Thus, the user takes the initiative in determining whether to display the purchase menu.

As described above, the preference information is acquired from the first server, such as an information bank, that securely manages the personal information including the preference information on drinks of the user. Thus, high security is ensured and leakage of the personal information can be prevented. If the preference information is used in accordance with the permission of the user, an accuracy of matching the preference of the user can be increased based on a history of a larger number of orders placed in past at other sales sites such as retail stores, restaurants, and affiliated stores as well as the information held by the vending machine or the business entity management server while ensuring the security.

Thus, a drink can be recommended that highly accurately matches the preference of the user at a timing when the user passes in front of or is near the vending machine while reducing irksomeness caused by the purchase menu of drinks being displayed on the display of the communication terminal against the intention of the user and preventing leakage of the personal information or the like.

In the method described above, the push notification screen may be used for displaying, on the display of the communication terminal, a purchase menu that allows the at least one drink to be purchased from among the plurality of drinks stored in the vending machine.

According to this aspect, a user who wishes to purchase a drink after viewing the push notification screen can use the push notification screen to display, on the display, the purchase menu that allows the user to purchase the at least one drink that matches the preference of the user. Thus, the user who wishes to purchase a drink after viewing the push notification screen can quickly purchase the at least one drink that matches the preference of the user.

The method described above may further include acquiring, from the communication terminal, information indicating that the push notification screen displayed on the display is selected; generating information of an individual purchase menu for the user, based on the type information, the stock information, the preference information, and the biological information, wherein the individual purchase menu for the user displays drinks that match the preference of the user indicated by the preference information in according to an order matching the preference of the user in relation to the current physical condition of the user indicated by the biological information from among the plurality of drinks stored in the vending machine indicated by the identification information; and outputting the information of the individual purchase menu to the communication terminal to display the individual purchase menu on the display of the communication terminal.

According to this aspect, by selecting the push notification screen, the user who wishes to purchase a drink after viewing the push notification screen can display, on the display, the individual purchase menu that displays drinks that match the preference of the user in according to an order matching the preference of the user in relation to the current physical condition of the user. Thus, the user who wishes to purchase a drink after viewing the push notification screen can purchase a drink that matches the preference of the user under the physical condition of the user at that time while being sensible of the order of the degree of matching the preference of the user.

In the method described above, the current biological information of the user may stored in the first server and may be acquired from the first server.

According to this aspect, the current biological information of the user of the communication terminal is acquired from the first server that stores the personal information of the user. Thus, providing a configuration necessary for storing the current biological information of the user in the communication terminal can be omitted.

In the method described above, the communication terminal may include a biological sensor, and the current biological information of the user may be acquired from the communication terminal including the biological sensor.

According to this aspect, the current biological information of the user of the communication terminal is acquired from the communication terminal including the biological sensor. Thus, the current biological information of the user at the current location of the communication terminal can be acquired.

In the method described above, the communication terminal may be capable of communicating with a biological sensor, and the current biological information of the user may be acquired from the biological sensor via the communication terminal.

According to this aspect, the current biological information of the user of the communication terminal is acquired, via the communication terminal, from the biological sensor capable of communicating with the communication terminal. Thus, even if the biological sensor is located at a place away from the communication terminal, the current biological information of the user can be acquired.

In the method described above, the biological information may include information on at least one of a systolic blood pressure, a diastolic blood pressure, a heart rate, a body water percentage, or a body temperature.

According to this aspect, the push notification screen is generated by taking into account the preference information on the drinks of the user of the communication terminal and at least one of the systolic blood pressure, the diastolic blood pressure, the heart rate, the body water percentage, or the body temperature of the user. Thus, a drink can be recommended that matches the preference of the user suitable for at least one of the systolic blood pressure, the diastolic blood pressure, the heart rate, the body water percentage, or the body temperature when the user passes in front of the vending machine.

EMBODIMENTS

It is expected that the Internet becomes further widespread in the future and various sensors become commonplace in our society. It is thus expected that not only information on states, activities, and the like of individuals but also information on the entire city including buildings, traffic networks, and the like are digitized to be usable in a computer system in our society. Digitized data on individuals (personal information) is accumulated in a cloud via a communication network, managed as big data in an information bank, and used for various purposes for individuals.

In Japan, such an advanced information society is called Society 5.0. The advanced information society is a society in which economic advancement and solution of social problems are expectedly brought by an information infrastructure (cyber-physical system) that highly integrates a real space (physical space) and a virtual space (cyberspace) together.

In Society 5.0, personal information such as preference information and biological information is centrally managed by a server of a personal-information managing business entity called an information bank after being anonymized so that the individuals are not to be specified by a third party. The personal information is updated at any time under the management of the information bank without intervention of manual input performed by a user of a terminal. When an individual makes a decision in various daily situations, big data including the accumulated personal information is analyzed, so that the individual can be informed of an option that is presumably optimal for the individual in the situation at that time.

As described in embodiments of the present disclosure, the application of the mechanism of an information bank is important for implementing the advanced information society of Society 5.0, and is different in concept from the mechanism of the information society of the related art. It is expected that implementation of a unified scheme, such as an information bank, that allows even a third party to register and/or acquire personal information based on permission of an individual will greatly increase opportunities of registering, acquiring, and using personal information. The unified scheme indicates that, for example, an application programming interface (API) for accessing data of the personal information is defined. This eliminates the complexity of exchanging personal information using schemes different for each service providing business entity, each sensor, and each device. Thus, it is expected that the utilization of data will progress both socially and industrially.

Overview of Information Infrastructure of Vending Machine Management System

A vending machine management system according to embodiments of the present disclosure is a system configured by taking into account Society 5.0, and is a system that manages stock information for vending machines of drinks and recommends, to a user, a drink that matches a preference of the user by using personal information managed by an information bank.

The vending machine management system according to the embodiments of the present disclosure will be described below with reference to the drawings. FIG. 1 is a diagram illustrating an example of an overview of an information infrastructure of a vending machine management system according to embodiments of the present disclosure.

An overview of the information infrastructure for implementing embodiments of the present disclosure will be described first with reference to FIG. 1. This vending machine management system includes roughly three groups of devices.

A first group of devices is a group of devices that serves as physical sales sites where a plurality of business entities sell products (goods), and includes vending machines 700 that sell products of individual business entities. FIG. 1 illustrates the vending machine 700 that sells products A-1, A-2, and A-3 of a business entity X and the vending machine 700 that sells products B-1 and B-2 of the business entity X.

A second group of devices is a group of devices carried by users, and includes a communication terminal 100 such as a smartphone or a tablet terminal and a biological sensor 600 such as a smartwatch. The communication terminal 100 can be connected to a wide-area communication network such as the Internet via a base station 400 by a long-range wireless communication network such as a cellular network called 4G or 5G, for example. The communication terminal 100 is capable of communicating with the vending machines 700 by short-range wireless communication such as Bluetooth (registered trademark).

The communication terminal 100 includes an application provided by each business entity and a sensor application installed thereon. FIG. 1 illustrates an example in which a business entity X application (also referred to as "business entity X app") provided by the business entity X and a sensor application (also referred to as "sensor app") are installed on the communication terminal 100. The business entity X application is an application for recommending a drink suitable for a user from among a plurality of drinks sold by the vending machines 700 managed by the business entity X, by using personal information of the user. The sensor application will be described later.

The biological sensor 600 periodically and continuously measures biological information of a user carrying the biological sensor 600. The biological information measured by the biological sensor 600 may include information on a systolic blood pressure, a diastolic blood pressure, a heart rate, a body water percentage, and a body temperature. These pieces of information may be directly measured or indirectly derived. These pieces of information may be measured not only by one sensor but also by a plurality of sensors such as a blood pressure sensor, a heart rate sensor, a bioelectrical impedance sensor, and a body temperature sensor. In this case, as for overlapping biological information, the measured biological information may be weighted in accordance with precisions of the sensors to acquire the biological information, or the biological information measured by one sensor selected by the user may be acquired. Alternatively, biological information measured by the most recently released sensor may be acquired as a representative value, based on the product number information of each sensor.

The biological information measured by the biological sensor 600 is sent from the biological sensor 600 to the communication terminal 100 by short-range wireless communication such as Bluetooth (registered trademark). The biological information may be stored and/or managed by the sensor application installed on the communication terminal 100. The biological sensor 600 may be included in the communication terminal 100.

The sensor application uploads the collected biological information and measurement date and time information indicating a measurement date and time of the biological information to a first server 200 in accordance with user account information. The user account information includes a user ID, a password, and the like. Consequently, the biological information is stored in the first server 200 in time series in association with the user ID and the measurement date and time information.

Figure 2:
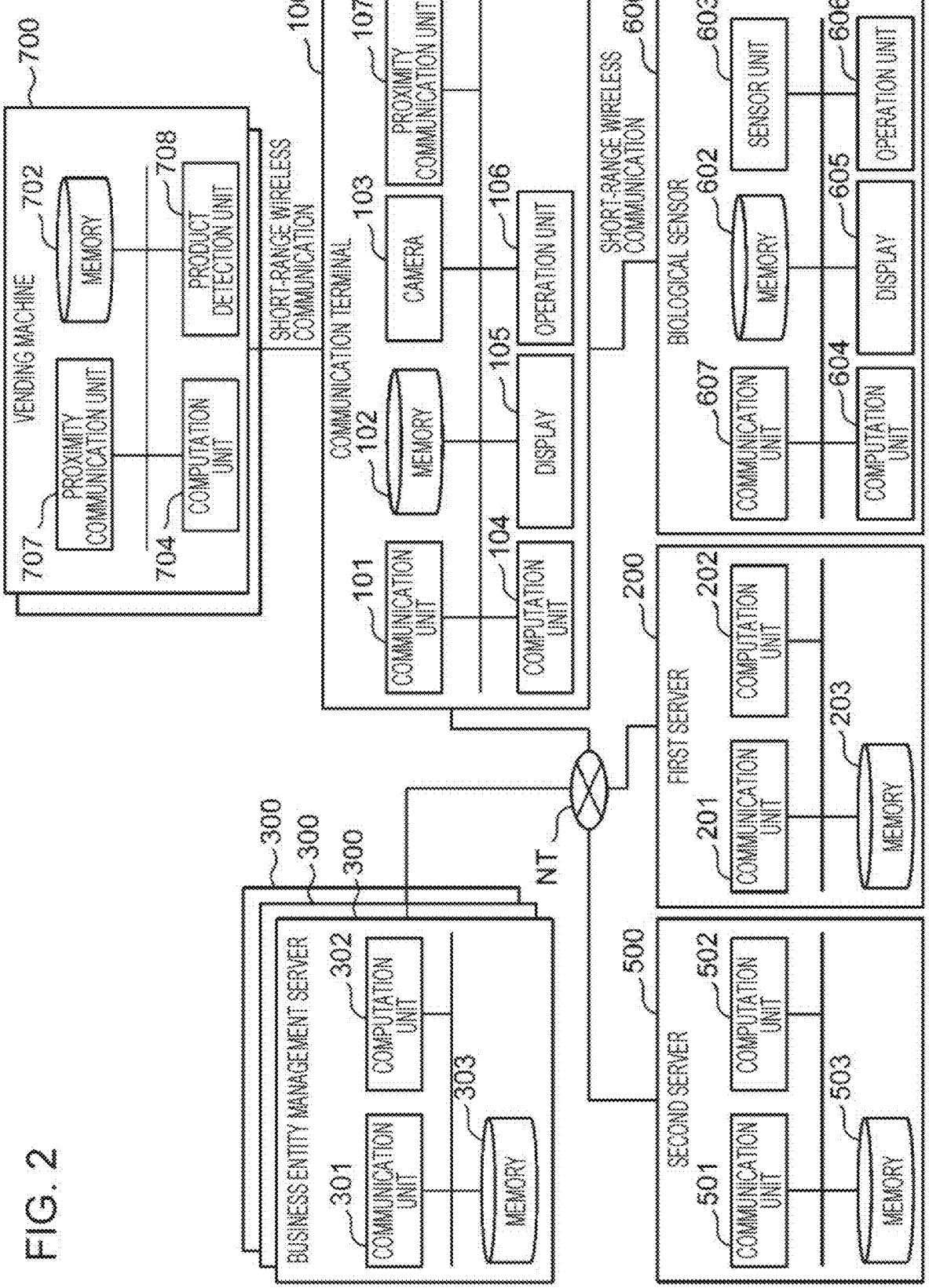
FIG. 2 is a diagram illustrating an example of a specific configuration of the vending machine management system according to the embodiments of the present disclosure.

The sensor application may store the biological information in a memory 102 (FIG. 2) of the communication terminal 100. The sensor application may authorize the business entity X application or an operating system (OS) of the communication terminal 100 to access the biological information stored in the memory 102 (FIG. 2). In this case, the biological information is uploaded to the first server 200 via the business entity X application or the OS.

A third group of devices is a group of servers that store and/or manage information used by a plurality of users via a wide-area communication network such as the Internet, and includes the first server 200, a business entity management server 300, and a second server 500.

The first server 200 is a personal information server that distributes personal information of a user to a plurality of locations, encrypts the distributed personal information, and stores the distributed encrypted personal information. The first server 200 manages personal information of a user by fragmenting, encrypting, and storing the personal information in a plurality of storage devices over a wide-area communication network. Thus, high security is ensured and leakage of the personal information is prevented.

The first server 200 has a function of returning, in response to an inquiry from a third party, necessary information in accordance with permission of the user. The first server 200 also has a function of securely sharing the personal information permitted by the user with the business entity permitted by the user. That is, the first server 200 has a function of an information bank.

The term "personal information" used herein broadly includes public or private information related to individuals. For example, the personal information includes at least one of a name, a date of birth, an address, an annual income, owned movable property/real estate information, physical information such as height/weight, genetic information, allergy information, medical information such as medical history/diagnosis chart, activity amount information such as number of steps/calorie consumption, meal history information, biological information such as heart rate/body temperature, product purchase history information through sales sites such as a vending machine/store/electronic-commerce (EC) site or through electronic settlement with credit cards/electronic money/cryptocurrency, movement history information indicating a history of location information of a current location of a communication terminal owned by a user, weather information of the location information, word information searched by a web search engine/artificial intelligence (AI) speaker, or text/video/audio information sent/received by mail/social networking service (SNS).

The first server 200 is not limited to a server managed directly by a business entity of an information bank and may be a server managed indirectly by the business entity of the information bank as in the case where the business entity of the information bank uses a cloud service platform in which personal information is securely managed by another business entity.

The business entity management server 300 is a server in which each business entity stores and/or manages data unique to the business entity. FIG. 1 illustrates a state in which the business entity X and two other entities each own or rent the business entity management server 300 and store and/or manage information on products of the business entity. In the description below, the business entity X is a business entity that sells drinks.

The second server 500 is a server that has a function of managing (storing) public information and returning necessary public information in response to an inquiry from a third party. For example, the public information includes weather information and traffic information.

Specific Configuration of Vending Machine Management System

A specific configuration of the vending machine management system according to the embodiments of the present disclosure will be described next. FIG. 2 is a diagram illustrating an example of a specific configuration of the vending machine management system according to the embodiments of the present disclosure. The vending machine management system illustrated in FIG. 2 includes the vending machines 700 managed by respective business entities, the communication terminal 100, the first server 200, the business entity management servers 300 managed by respective business entities, the second server 500, and the biological sensor 600 which are described in FIG. 1.

The communication terminal 100, the first server 200, the business entity management servers 300, and the second server 500 are connected to one another via a network NT to be able to communicate with one another. The network NT is a wide-area communication network including the Internet and a long-range wireless communication network such as a cellular network. In FIG. 2, the base station 400 illustrated in FIG. 1 is not illustrated for convenience of explanation. In the description below, the vending machines 700 are the vending machines 700 of drinks managed by the business entity X, and the business entity management servers 300 are the business entity management servers 300 managed by the business entity X.

Each of the vending machines 700 includes a memory 702, a product detection unit 708, a proximity communication unit 707, and a computation unit 704 that controls the memory 702, the product detection unit 708, and the proximity communication unit 707.

The memory 702 is a nonvolatile storage device such as a flash memory. The memory 702 stores information on the vending machine 700. The information on the vending machine 700 is input by a worker using an input device such as a touch panel (not illustrated) when the worker stores each drink in the vending machine 700, and is stored in the memory 702 by the computation unit 704.

Specifically, the information on the vending machine 700 includes identification information (second identification information) for identifying the vending machine 700 and product information on a plurality of drinks stored in the vending machine 700.

The identification information for identifying the vending machine 700 includes a business entity identifier (ID) and a vending machine ID. The business entity ID is an identifier of a business entity that manages the vending machine 700. The vending machine ID is an identifier of the vending machine 700.

The product information includes type information indicating types of the plurality of drinks stored in the vending machine 700, and stock information indicating quantities of stock of the plurality of drinks stored in the vending machine 700. The stock information includes price information indicating prices of the plurality of drinks stored in the vending machine 700, quantity information indicating quantities of the plurality of drinks, and temperature information indicating temperatures of the plurality of drinks.

Drinks can be classified by type, for example, coffee, black tea, green tea, carbonated drinks, sports drinks, and the like. Some drinks, however, belong to a plurality of types. This makes it difficult to classify drinks unconditionally by type. Thus, in the present embodiments, drinks are classified by product name. That is, in the present embodiments, the type information indicating the types of the drinks is information indicating the product names of the drinks.

The product detection unit 708 includes, for example, a processor such as a central processing unit (CPU) and a temperature sensor. The product detection unit 708 reads the product information from the memory 702. The product detection unit 708 also measures a temperature of each stored drink with the temperature sensor. The product detection unit 708 updates the temperature information included in the product information of each drink which is stored in the memory 702, with the information indicating the measured temperature of the drink.

The product detection unit 708 measures the temperature of each drink to control the temperature of each drink around a target temperature, which is 5° C. for cold-storage drinks and 55° C. for hot-storage drinks. If the temperature of the drink that has just stored does not reach the target temperature, the sale of this drink is not recommended. Thus, if the measured temperature of the drink is within a predetermined temperature range around the target temperature, the product detection unit 708 detects the drink as a product available for sale; otherwise, the product detection unit 708 detects the drink as a product not available for sale since the drink is in a preparation stage before the sale.

The proximity communication unit 707 includes, for example, a communication circuit that performs short-range wireless communication in accordance with the Bluetooth Low Energy (BLE) standard, which is part of the Bluetooth (registered trademark) standard. The proximity communication unit 707 may further include a communication circuit that performs short-range wireless communication in accordance with the Near Field Communication (NFC) standard. The computation unit 704 includes, for example, a processor such as a CPU.

The proximity communication unit 707 periodically transmits a beacon signal in the case of performing short-range wireless communication according to the BLE standard. In response to receipt of a signal indicating a connection request from the communication terminal 100 that is located in a short range and has received the beacon signal, the proximity communication unit 707 notifies the computation unit 704 of the receipt of the signal indicating the connection request. In response to receipt of the notification, the computation unit 704 reads the identification information for identifying the vending machine 700 from the memory 702 and further controls the product detection unit 708 to read the product information on drinks detected as products available for sale and drinks detected as products not available for sale from the memory 702. The computation unit 704 controls the proximity communication unit 707 to return the read identification information of the vending machine 700 and product information to the communication terminal 100 that has sent the signal indicating the connection request.

In response to receipt of information indicating drink purchase details from a proximity communication unit 107 of the communication terminal 100, the proximity communication unit 707 outputs the received information indicating the drink purchase details to the computation unit 704. The information indicating the drink purchase details includes, for example, a product name which is the type of the purchased drink, a quantity of purchase of the drink, and a total amount required to purchase the drink.

In response to acquisition of the information indicating the drink purchase details via the proximity communication unit 707, the computation unit 704 controls a transport mechanism (not illustrated) to transport the purchased drink indicated by the acquired information to a pick-up port as many times as the quantity of purchase indicated by the information.

A configuration of the communication terminal 100 will be described next. The communication terminal 100 includes the proximity communication unit 107, a communication unit 101, the memory 102, a camera 103, a computation unit 104, a display 105, and an operation unit 106.

Similarly to the proximity communication unit 707 of the vending machine 700, the proximity communication unit 107 includes, for example, a communication circuit that performs short-range wireless communication in accordance with the Bluetooth Low Energy (BLE) standard, which is part of the Bluetooth (registered trademark) standard. The proximity communication unit 107 may further include a communication circuit that performs short-range wireless communication in accordance with the Near Field Communication (NFC) standard.

In the case of performing short-range wireless communication according to the BLE standard, in response to receipt of a beacon signal transmitted from the vending machine 700, the proximity communication unit 107 returns a signal indicating a connection request to the vending machine 700. The proximity communication unit 107 receives the identification information of the vending machine 700 and the product information, which are returned from the proximity communication unit 707 of the vending machine 700 in response to the signal indicating the connection request. The proximity communication unit 107 outputs the received identification information and product information to the computation unit 104.

The proximity communication unit 107 receives various types of biological information measured by the biological sensor 600 from the biological sensor 600. The proximity communication unit 107 outputs the received biological information to the computation unit 104.

The communication unit 101 includes a communication circuit that connects the communication terminal 100 to the network NT. In response to receipt of information sent from the first server 200 and the second server 500, the communication unit 101 outputs the received information to the computation unit 104. The communication unit 101 sends the identification information of the vending machine 700 and the product information to the business entity management server 300 in association with each other under the control of the computation unit 104. The communication unit 101 also sends purchase information (described later) to the first server 200 under the control of the computation unit 104.

The memory 102 includes a nonvolatile storage device such as a flash memory. The memory 102 stores identification information (first identification information) for identifying the communication terminal 100. The identification information for identifying the communication terminal 100 includes a terminal identifier (ID) and a user identifier (ID). The terminal ID is an identifier of the communication terminal 100. The user ID is an identifier of a user of the communication terminal 100. The identification information for identifying the communication terminal 100 is stored in the memory 102 when the communication terminal 100 is purchased.

The camera 103 is an imaging device including a complementary metal-oxide semiconductor (CMOS) sensor or the like.

The computation unit 104 includes a processor such as a CPU. The computation unit 104 executes the OS of the communication terminal 100, the business entity X application, the sensor application, a quick response (QR) code (registered trademark) reader, a browser, and so on.

The computation unit 104 executes the business entity X application to perform processing below.

The computation unit 104 controls the proximity communication unit 107 to perform processing of acquiring identification information for identifying the vending machine 700 and product information including type information and stock information from the vending machine 700 by using short-range wireless communication, in response to receipt of a beacon signal transmitted from the vending machine 700 of drinks provided by the business entity X.

The computation unit 104 performs processing of acquiring preference information on drinks of the user of the communication terminal 100. The computation unit 104 performs processing of acquiring weather information of a current location of the communication terminal 100 via the network NT. The computation unit 104 performs processing of acquiring current biological information of the user of the communication terminal 100.

The computation unit 104 further performs processing of determining, based on the pieces of information acquired in the processing, at least one drink that matches a preference of the user of the communication terminal 100 from among a plurality of drinks stored in the vending machine 700 which is a transmission source of the beacon signal received by the proximity communication unit 107, and generating a push notification screen that recommends the determined at least one drink. The computation unit 104 also performs processing of generating an individual purchase menu based on order according to a degree of matching the preference of the user of the communication terminal 100.

The computation unit 104 executes the sensor application to acquire, via the proximity communication unit 107, various types of biological information continuously measured by the biological sensor 600. If the communication terminal 100 includes the biological sensor 600, the computation unit 104 executes the sensor application to acquire various types of biological information continuously measured by the biological sensor 600. The computation unit 104 uploads the biological information acquired from the biological sensor 600 and date and time information indicating the acquisition date and time of the biological information together with the user account information to the first server 200 via the communication unit 101.

The computation unit 104 may execute the sensor application to store the biological information and the date and time information in the memory 102. The sensor application may authorize the business entity X application or the OS of the communication terminal 100 to access the biological information stored in the memory 102. In this case, the business entity X application or the OS may upload the biological information to the first server 200.

The display 105 includes, for example, a liquid crystal display panel or an organic electroluminescence (EL) panel, and displays various images. For example, the display 105 displays the push notification screen described above, an individual purchase menu (described below) for the user of the communication terminal 100, and so on.

The operation unit 106 includes, for example, an input device such as a touch panel. For example, the operation unit 106 receives an operation of selecting and purchasing a drink desired by the user of the communication terminal 100 from the individual purchase menu for the user.

A configuration of the first server 200 will be described next. The first server 200 includes a communication unit 201, a computation unit 202, and a memory 203. The communication unit 201 includes a communication circuit that connects the first server 200 to the network NT. In response to a request from the communication terminal 100 or the business entity management server 300, the communication unit 201 returns personal information of each user under the control of the computation unit 202.

As described above, the first server 200 is not limited to a server managed directly by the business entity of the information bank and may be a server managed indirectly by the business entity of the information bank as in the case where the business entity of the information bank uses a cloud service platform in which personal information is securely managed by another business entity. However, for convenience of explanation, an example will be described herein in which the first server 200 is managed directly by the business entity of the information bank.

The computation unit 202 includes a processor such as a CPU. For example, the communication unit 201 receives a signal requesting acquisition of personal information on a user with permission. The user with permission is a user who has given, directly or indirectly via a trusted third party, permission to read their personal information stored in the first server 200 and requested by the communication terminal 100 or the business entity management server 300. In this case, in response to a request from the communication terminal 100 or the business entity management server 300, the computation unit 202 reads the personal information of the user with permission stored in the memory 203 and causes the communication unit 201 to return the personal information. The personal information to be read may be the entire personal information that is managed, or may be only information related to a requested particular item in the personal information managed (only part of the personal information).

The memory 203 includes a plurality of nonvolatile storage devices such as hard disk drives. The memory 203 stores personal information of one or more users. The personal information is stored in the plurality of storage devices after being distributed and encrypted.

The personal information stored in the memory 203 includes purchase history information, preference information, and biological information. The purchase history information is information indicating a purchase history of products such as drinks purchased by each user. The preference information is information indicating a preference of each user. The preference information is generated by the computation unit 202, based on the purchase history information stored in the memory 203. The biological information is information indicating a physical condition of each user. The biological information includes information on at least one of a systolic blood pressure, a diastolic blood pressure, a heart rate, a body water percentage, or a body temperature.

A configuration of the business entity management server 300 will be described next. There are one or more business entity management servers 300 that correspond to respective business entities. Each of the business entity management servers 300 includes a memory 303, a communication unit 301, and a computation unit 302.

The memory 303 includes a nonvolatile storage device such as a hard disk drive. The memory 303 stores, in association with identification information for identifying each of the plurality of vending machines 700 managed by the business entity X, product information on a plurality of drinks stored in the vending machine 700 and location information indicating an installed location of the vending machine 700. The product information includes type information indicating types of the plurality of drinks stored in each vending machine 700, and stock information indicating quantities of stock of the plurality of drinks stored in the vending machine 700. The stock information includes price information indicating prices of the plurality of drinks stored in the vending machine 700, quantity information indicating quantities of the plurality of drinks, and temperature information indicating temperatures of the plurality of drinks.

The communication unit 301 includes a communication circuit that connects the business entity management server 300 to the network NT. The communication unit 301 receives the identification information for identifying the vending machine 700 and the product information that are sent from the communication terminal 100, and outputs the received identification information of the vending machine 700 and product information to the computation unit 302.

The computation unit 302 includes a processor such as a CPU. Based on the identification information of the vending machine 700 and the product information that are sent from the communication terminal 100 and acquired via the communication unit 301, the computation unit 302 updates the product information of the vending machine 700 corresponding to the identification information and stored in the memory 303.

A configuration of the second server 500 will be described next. The second server 500 includes a memory 503, a communication unit 501, and a computation unit 502.

The memory 503 includes a plurality of nonvolatile storage devices such as hard disk drives. In the memory 503, a managing business entity of the second server 500 stores weather information of each region and date and time information indicating acquisition date and time of the weather information of the region, in association with each other. The weather information includes at least one of a temperature, a humidity, a heat index, a solar radiation, or a weather type.

The communication unit 501 includes a communication circuit that connects the second server 500 to the network NT. The communication unit 501 receives a signal requesting acquisition of weather information of a certain region, from the communication terminal 100 or the business entity management server 300. The communication unit 501 outputs the received signal requesting acquisition of the weather information to the computation unit 502. The communication unit 501 returns the weather information corresponding to the request under the control of the computation unit 502.

The computation unit 502 includes a processor such as a CPU. In response to acquisition of a signal requesting acquisition of weather information of a certain region via the communication unit 501, the computation unit 502 reads weather information associated with date and time information indicating the date and time that is the closest to the reception time of the signal, for example, from among pieces of weather information of the requested region stored in the memory 503, and causes the communication unit 501 to return the read weather information. The configuration is not limited to this. The computation unit 502 may read one or more pieces of weather information associated with date and time information indicating a past predetermined period from the reception time of the signal, for example, from among the pieces of weather information of the requested region stored in the memory 503, and cause the communication unit 501 to return the read one or more pieces of weather information.

Beacon Signal Used in Short-Range Wireless Communication

Figure 3:
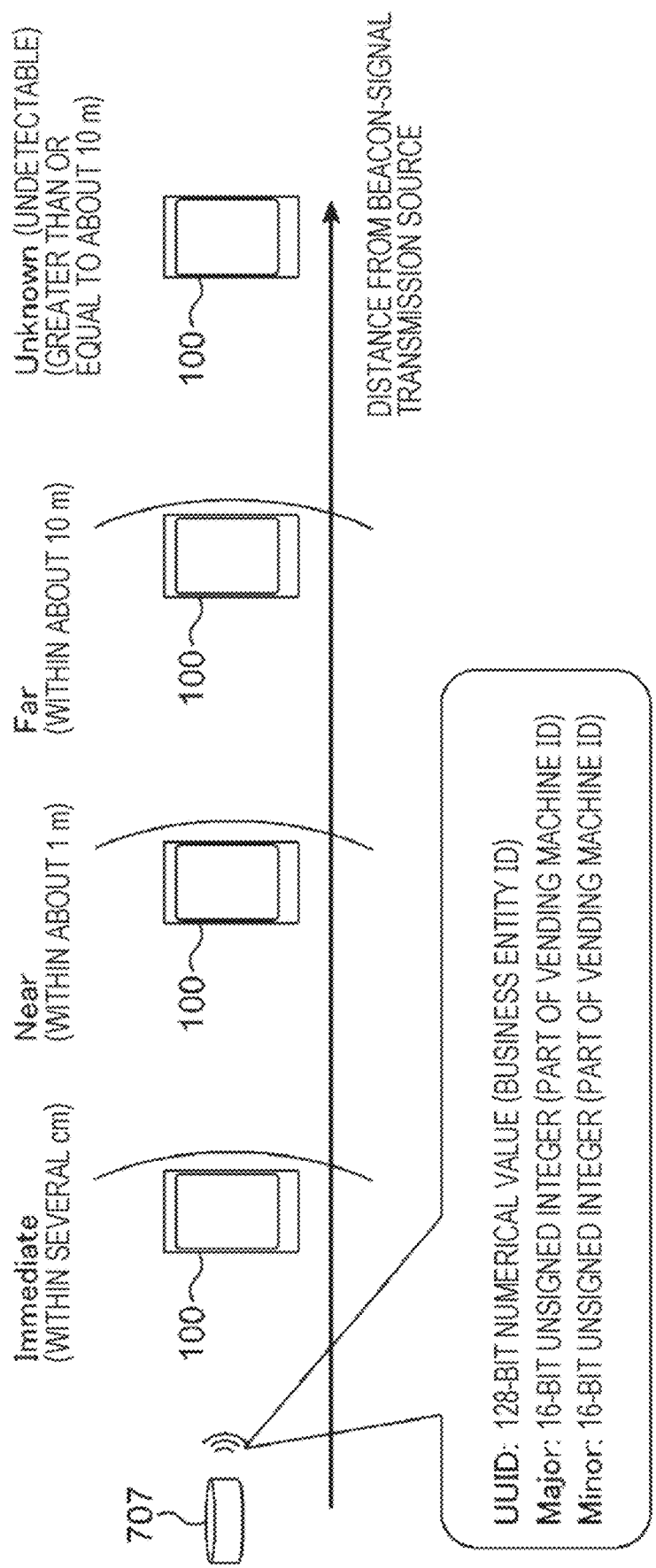
FIG. 3 is an explanatory diagram of a beacon signal used in short-range wireless communication performed between a communication terminal and a vending machine.

A beacon signal used in short-range wireless communication performed between the communication terminal 100 and the vending machine 700 will be described next with reference to FIG. 3. FIG. 3 is an explanatory diagram of a beacon signal used in short-range wireless communication performed between the communication terminal 100 and the vending machine 700.

As described above, short-range wireless communication using a beacon signal is performed between the proximity communication unit 107 of the communication terminal 100 and the proximity communication unit 707 of the vending machine 700 in accordance with the BLE (Bluetooth Low Energy) standard, which is part of the Bluetooth (registered trademark) standard.

The beacon signal is periodically transmitted from the proximity communication unit 707 of the vending machine 700. As illustrated in FIG. 3, in response to receipt of a beacon signal, the proximity communication unit 107 of the communication terminal 100 may represent the distance from the proximity communication unit 707 as roughly four types, which are immediate, near, far, and unknown, depending on a radio field intensity of the signal.

Specifically, the proximity communication unit 107 of the communication terminal 100 grasps that the distance from the proximity communication unit 707 is "immediate" based on the radio field intensity of the beacon signal received when the distance from the proximity communication unit 707 is within several centimeters. Likewise, the proximity communication unit 107 of the communication terminal 100 grasps that the distance from the proximity communication unit 707 is near/far based on the radio field intensity of the beacon signal received when the distance from the proximity communication unit 707 is within about 1 m/about 10 m, respectively.

When the distance from the proximity communication unit 707 is longer (for example, greater than or equal to about 10 m), the proximity communication unit 107 of the communication terminal 100 may fail to receive (detect) the beacon signal transmitted from the proximity communication unit 707. In this case, the proximity communication unit 107 of the communication terminal 100 grasps that the distance from the proximity communication unit 707 is unknown since the distance is too far for the beacon signal to reach the proximity communication unit 107.

However, the method by which the proximity communication unit 107 of the communication terminal 100 grasps the distance from the proximity communication unit 707 that has transmitted the beacon signal is not limited to this. For example, the proximity communication unit 107 of the communication terminal 100 may grasp the distance from the proximity communication unit 707 that has transmitted the beacon signal, based on a received signal strength indicator (RSSI) which is a measurement value of the radio field intensity of the beacon signal received from the proximity communication unit 707, or may grasp the distance using another method.

The beacon signal transmitted from the proximity communication unit 707 includes a beacon ID which is an identifier of the beacon signal. For example, in the iBeacon (registered trademark) standard of Apple Inc., the beacon ID includes a Universally Unique Identifier (UUID) which is 128 bits long, and major and minor values each of which is a 16-bit unsigned integer.

The UUID is an identifier for uniquely identifying an object on software. In this case, for example, a 128-bit numerical value indicating the business entity ID and a 32-bit numerical value indicating the vending machine ID are stored in the memory 702. The proximity communication unit 707 transmits a beacon signal in which the 128-bit numerical value indicating the business entity ID stored in the memory 702 is set as the UUID and the 32-bit numerical value indicating the vending machine ID stored in the memory 702 is set as the major and minor values.

FIG. 4 is a diagram illustrating an example of a table indicating a relationship between a beacon ID and identification information for identifying the vending machine 700. When the business entity X application is installed, a table 2010 indicating a relationship between a beacon ID and identification information for identifying the vending machine 700 illustrated in FIG. 4 is stored in the memory 102 of the communication terminal 100. In response to receipt of a beacon signal, the proximity communication unit 107 of the communication terminal 100 refers to the table 2010 stored in the memory 102 to acquire identification information for identifying the vending machine 700 associated with the beacon ID included in the received beacon signal.

For example, the UUID, the major value, and the minor value of the beacon ID included in the beacon signal received by the proximity communication unit 107 are "0000-0000-0000-000X", "0x1000", and "0x0000", respectively. In this case, the proximity communication unit 107 refers to the table 2010 illustrated in FIG. 4 to acquire identification information for identifying the vending machine 700 which is "business entity ID=X vending machine ID=0x00000000".

The beacon ID may comply with a frame type Eddystone-UID defined by the Eddystone (registered trademark) standard of Google Inc., for example. In this case, the beacon ID includes a frame type to which a fixed value 0 is set, a 10-byte namespace ID, and a 6-byte instance ID.

In this case, for example, a 10-byte value indicating the business entity ID and a 6-byte value indicating the vending machine ID are stored in the memory 702. The proximity communication unit 707 transmits a beacon signal in which the 10-byte value indicating the business entity ID stored in the memory 702 is set as the namespace ID and the 6-byte value indicating the vending machine ID stored in the memory 702 is set as the instance ID.

FIG. 5 is a diagram illustrating an example of a table indicating a relationship between a beacon ID and identification information of the vending machine 700. In this case, when the business entity X application is installed, a table 2011 indicating a relationship between a beacon ID and identification information of the vending machine 700 illustrated in FIG. 5 is stored in the memory 102 of the communication terminal 100. In response to receipt of a beacon signal, the proximity communication unit 107 of the communication terminal 100 refers to the table 2011 stored in the memory 102 to acquire identification information for identifying the vending machine 700 associated with the beacon ID included in the received beacon signal.

For example, the namespace ID and the instance ID of the beacon ID included in the beacon signal received by the proximity communication unit 107 are "X-1" and "000000", respectively. In this case, the proximity communication unit 107 refers to the table 2011 illustrated in FIG. 5 to acquire identification information of the vending machine 700 which is "business entity ID=X vending machine ID=000000".

Process of Short-Range Wireless Communication Using Beacon Signal

A process of short-range wireless communication using a beacon signal performed between the communication terminal 100 and the vending machine 700 will be described next with reference to FIG. 6. FIG. 6 is a sequence diagram illustrating a process of short-range wireless communication using a beacon signal.

In short-range wireless communication using a beacon signal performed between the communication terminal 100 and the vending machine 700, the proximity communication unit 707 of the vending machine 700 operates as a slave and the proximity communication unit 107 of the communication terminal 100 operates as a master.

Specifically, as illustrated in FIG. 6, the proximity communication unit 707 of the vending machine 700 periodically transmits a beacon signal (advertising) (step S701).

In response to receipt of the beacon signal (scanning), the proximity communication unit 107 of the communication terminal 100 detects a distance to the vending machine 700 that is the transmission source of the beacon signal and a transmission direction of the beacon signal as well as the beacon ID. The proximity communication unit 107 notifies the computation unit 104 of receipt of the beacon signal, and outputs information indicating the detected distance and transmission direction to the computation unit 104. Thus, in response to detection of the receipt of the beacon signal by the proximity communication unit 107, the computation unit 104 stores the information received from the proximity communication unit 107 in the memory 102 (step S101). Specifically, in step S101, the proximity communication unit 107 detects the transmission direction of the received beacon signal, based on specifications defined by Bluetooth (registered trademark) 5.1, for example.

The proximity communication unit 107 of the communication terminal 100 then selects the proximity communication unit 707 of the vending machine 700 identified by the beacon ID included in the beacon signal, as a connection destination (initiating) (step S102). The proximity communication unit 107 then sends a signal indicating a connection request (connect request) to the selected proximity communication unit 707 of the vending machine 700 (step S103).

In response to receipt of the signal indicating the connection request, the proximity communication unit 707 of the vending machine 700 establishes a connection to the communication terminal 100 that has sent the signal indicating the connection request, and notifies the computation unit 704 of the receipt. In response to this notification, the computation unit 704 controls the product detection unit 708 to read identification information for identifying the vending machine 700 and product information including type information and stock information from the memory 702. Hereinafter, for convenience of explanation, the identification information for identifying the vending machine 700 may be referred to as identification information of the vending machine 700. Under the control of the computation unit 704, the proximity communication unit 107 returns, as additional information, the identification information of the vending machines 700 and the product information that are read by the computation unit 704, to the proximity communication unit 107 of the communication terminal 100 that has sent the signal indicating the connection request (step S702). The identification information of the vending machine 700 and the product information are returned to the communication terminal 100 as the additional information in this example. However, the identification information is not necessarily sent because the vending machine 700 that is the connection destination is known at the time of connection.

In response to receipt of the additional information, the proximity communication unit 107 of the communication terminal 100 outputs the received additional information to the computation unit 104. The computation unit 104 stores the additional information received from the proximity communication unit 107 in the memory 102 (step S104). The proximity communication unit 107 then returns a signal indicating disconnection (disconnect) (step S105).

Thus, the proximity communication unit 107 of the communication terminal 100 ends the communication with the proximity communication unit 707. The proximity communication unit 707 of the vending machine 700 disconnects the connection with the proximity communication unit 107 of the communication terminal 100. The proximity communication unit 107 of the communication terminal 100 then returns to a state of waiting for receipt of a beacon signal transmitted from the proximity communication unit 707 of another vending machine 700.

Thereafter, each time the proximity communication unit 107 of the communication terminal 100 receives a beacon signal transmitted from the proximity communication unit 707 of another vending machine 700, processing of step S101 and subsequent steps is repeated if the product information of the vending machine 700 that has transmitted the beacon signal has not been acquired yet or if a predetermined time or more has elapsed since acquisition of the product information of the vending machine 700 that has transmitted the beacon signal. Thus, the computation unit 104 acquires, from each vending machine 700 located within a beacon signal receivable range, the identification information and the product information of the vending machine 700. The computation unit 104 also acquires, from the memory 102, information indicating a distance to each vending machine 700 which is the transmission source of a corresponding beacon signal received by the proximity communication unit 107 and a transmission direction of the beacon signal.

First Embodiment

Figure 7A:
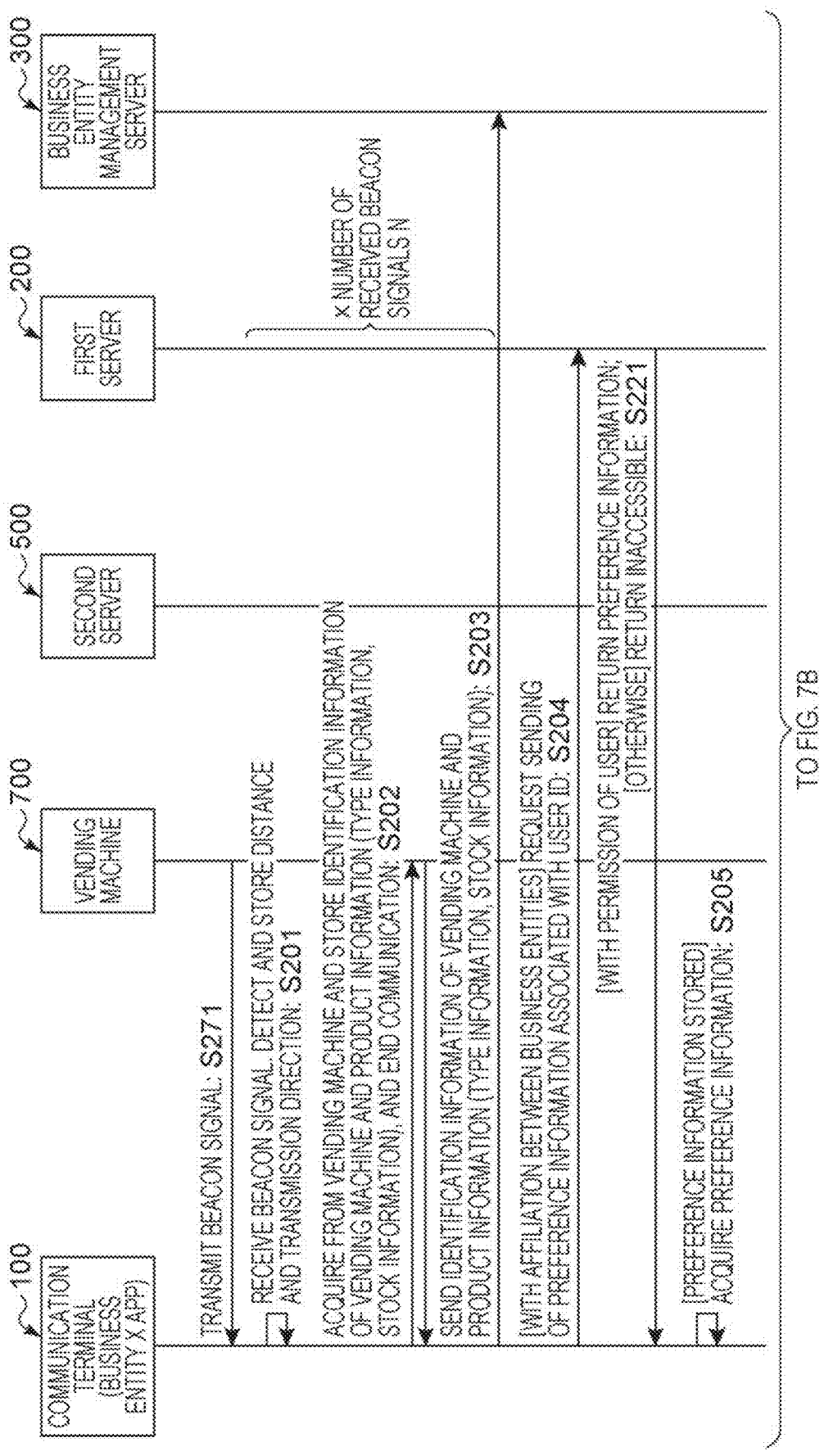
FIGS. 7A and 7B are a sequence diagram illustrating an example of an overview of a process performed in the vending machine management system in a first embodiment.
Figure 7B:
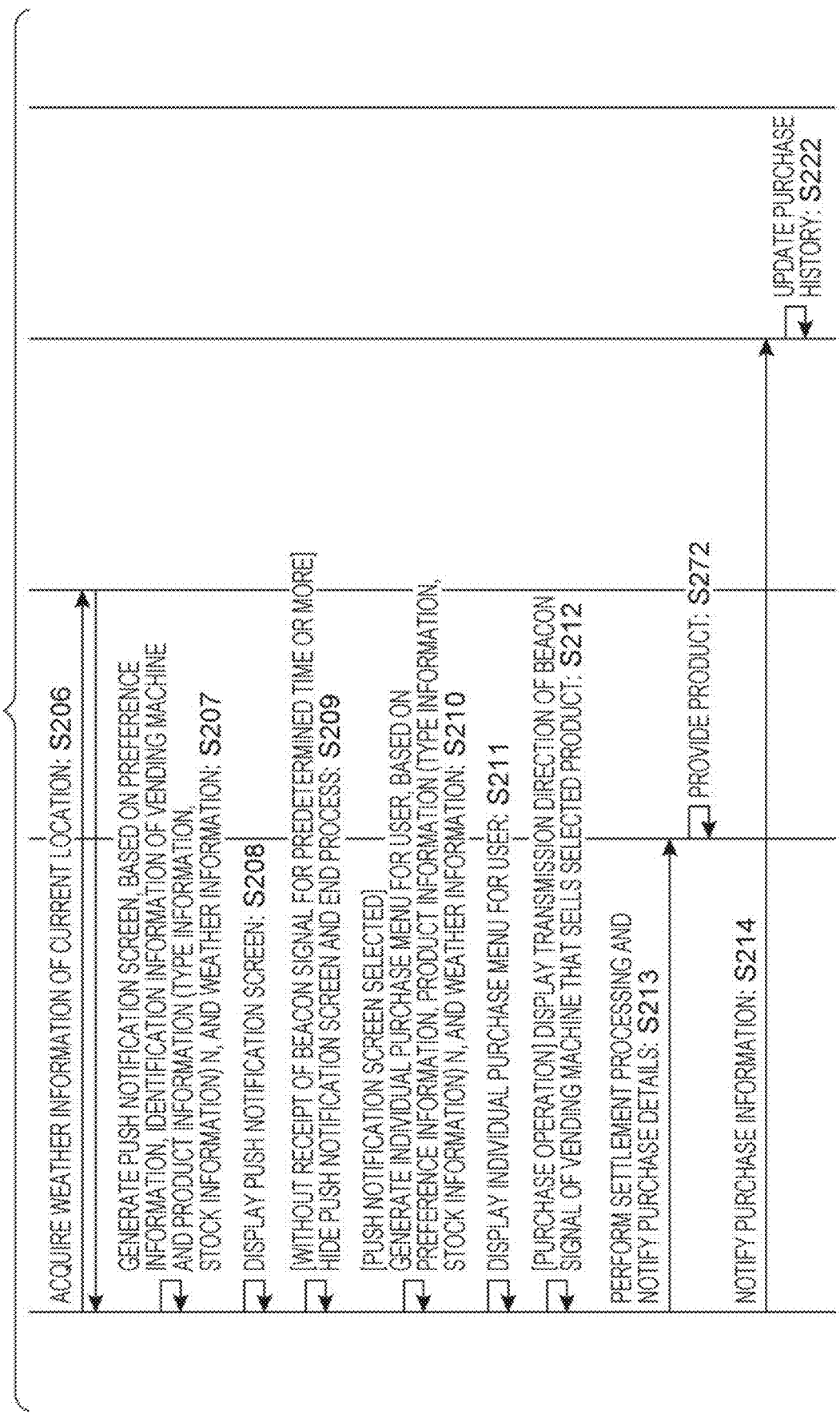

An overview of a process performed in the vending machine management system in a first embodiment of the present disclosure will be described next with reference to FIGS. 7A and 7B. FIGS. 7A and 7B are a sequence diagram illustrating an example of the overview of the process performed in the vending machine management system in the first embodiment.

As illustrated in FIG. 7A, the proximity communication unit 707 of each of the vending machines 700 included in the vending machine management system periodically transmits a beacon signal (step S271). This processing corresponds to step S701 illustrated in FIG. 6.

The business entity X application is executed in the communication terminal 100, so that the proximity communication unit 107 enters a state of waiting for receipt of a beacon signal. Consequently, the processing of step S101 and subsequent steps illustrated in FIG. 6 is performed. Specifically, in response to receipt of the beacon signal transmitted in step S271, the proximity communication unit 107 detects a distance to a transmission source of the beacon signal (which is the vending machine 700) and a transmission direction of the beacon signal as well as the beacon ID. The proximity communication unit 107 then notifies the computation unit 104 of the receipt of the beacon signal and outputs information indicating the detected beacon ID, distance, and transmission direction to the computation unit 104. Thus, in response to detection of the receipt of the beacon signal by the proximity communication unit 107, the computation unit 104 stores the information indicating the beacon ID, the distance, and the transmission direction acquired from the proximity communication unit 107 in the memory 102 (step S201). This processing corresponds to step S101 illustrated in FIG. 6.

Processing corresponding to the processing of step S102 and subsequent steps illustrated in FIG. 6 is performed next. Specifically, the proximity communication unit 107 of the communication terminal 100 performs short-range wireless communication with the proximity communication unit 707 of the vending machine 700 which is the transmission source of the beacon signal received in step S201. Thus, the proximity communication unit 107 acquires additional information that includes identification information for identifying the vending machine 700 and product information including type information and stock information. The proximity communication unit 107 outputs the acquired additional information to the computation unit 104, and ends the communication with the proximity communication unit 707 of the vending machine 700. The computation unit 104 stores the additional information acquired from the proximity communication unit 107 in the memory 102 (step S202).

The computation unit 104 then controls the communication unit 101 to send the identification information of the vending machine 700 and the product information that are acquired in step S202 to the business entity management server 300 (step S203). In response to this, in the business entity management server 300, based on the identification information of the vending machine 700 and the product information that are acquired via the communication unit 301, the computation unit 302 updates product information of the vending machine 700 corresponding to the identification information and stored in the memory 303.

In this way, each time the proximity communication unit 107 of the communication terminal 100 receives a beacon signal transmitted from the proximity communication unit 707 of the vending machine 700 from which the product information has not been acquired yet, the processing from step S201 to step S203 is repeated in response to the receipt.

In response to detecting that a plurality of beacon signals transmitted from the plurality of vending machines 700 are received by the proximity communication unit 107, the computation unit 104 may perform merely steps S201 and S202 at receipt of each of the beacon signals by the proximity communication unit 107 and may perform step S203 just once. Thus, the computation unit 104 may collectively send the pieces of identification information and the pieces of product information of the respective vending machines 700 acquired in each step S202 to the business entity management server 300 in single step S203.

Suppose that the business entity (business operator) X that provides the business entity X application has an affiliation with the managing business entity (management operator) of the first server 200 and that the business entity X is permitted to acquire personal information of each user stored in the first server 200. In this case ([with affiliation between business entities]), the computation unit 104 of the communication terminal 100 controls the communication unit 101 to send, to the first server 200, identification information (first identification information) for identifying the communication terminal 100 stored in the memory 102 and a signal requesting sending of preference information of the user identified by the user ID included in the identification information (step S204).

In the first server 200, in response to the communication unit 201 receiving the identification information for identifying the communication terminal 100 and the signal requesting sending of the preference information of the user, which are sent in step S204, the computation unit 202 performs processing of step S221 (step S221).

Specifically, in step S221, the computation unit 202 determines whether the user indicated by the user ID included in the identification information received by the communication unit 201 is a user with permission. If the computation unit 202 determines that the user is a user with permission ([with permission of user]), the computation unit 202 acquires the preference information included in the personal information of the user with permission from the memory 203 and causes the communication unit 201 to return the acquired preference information. On the other hand, if the computation unit 202 determines that the user is not a user with permission ([otherwise]), the computation unit 202 causes the communication unit 201 to return information indicating that the personal information is inaccessible. The returned information is received and output to the computation unit 104 by the communication unit 101 of the communication terminal 100.

If the computation unit 202 determines that the user is not a user with permission ([otherwise]), the computation unit 202 may cause the communication unit 201 to return a message for checking whether to permit reading of the personal information stored in the memory 203. Suppose that in response to this, the computation unit 202 acquires a reply indicating permission from the communication terminal 100 via the communication unit 201. In this case, the computation unit 202 may acquire, from the memory 203, the preference information included in the personal information of the user indicated by the user ID included in the received identification information, and cause the communication unit 201 to return the acquired information in step S221.

Suppose that the preference information of the user of the communication terminal 100 is stored in the memory 102 of the communication terminal 100. In this case ([preference information stored]), after performing step S204, the computation unit 104 acquires the preference information of the user of the communication terminal 100 stored in the memory 102 within a range not overlapping the preference information returned in step S221 (step S205).

The computation unit 104 controls the communication unit 101 to send a signal requesting acquisition of weather information of the current location of the communication terminal 100 to the second server 500. The computation unit 104 acquires, via the communication unit 101, the weather information of the current location of the communication terminal 100 returned from the second server 500 in response to the sent signal. The computation unit 104 stores the acquired weather information in the memory 102 in time series in association with date and time information indicating the acquisition date and time of the weather information (step S206). Thereafter, the computation unit 104 repeats step S206 periodically (for example, every hour).

Specifically, in step S206, the computation unit 104 sends a signal requesting acquisition of weather information of the current location of the communication terminal 100, including location information indicating the current location of the communication terminal 100. In response to receipt of the signal requesting acquisition of the weather information of the current location of the communication terminal 100 via the communication unit 501, the computation unit 502 of the second server 500 acquires the location information included in the signal. The computation unit 502 reads, from the memory 503, weather information associated with date and time information indicating, for example, the most recent date and time from among pieces of weather information of the region including the location indicated by the acquired location information, and causes the communication unit 501 to return the read weather information.

In step S206, the computation unit 104 may send the signal requesting acquisition of weather information of the current location of the communication terminal 100, including the location information of any one of the vending machines 700 acquired in step S202. Thus, in step S206, the computation unit 104 may acquire weather information corresponding to an installed location of the vending machine 700 located near the current location of the communication terminal 100, as the weather information of the current location of the communication terminal 100.

The location information of any one of the vending machines 700 acquired in step S202 may be acquired in the following manner, for example. The computation unit 104 may send a signal requesting the location information of any one of the vending machines 700 to the business entity management server 300, together with the identification information of the any one of the vending machines 700 acquired in step S202. In the business entity management server 300, in response to acquiring, via the communication unit 301, the identification information included in the signal requesting the location information of the any one of the vending machines 700, the computation unit 302 may acquire, from the memory 303, the location information that indicates the installed location of the any one of the vending machines 700 and is associated with the identification information, and cause the communication unit 301 to return the acquired location information.

The acquisition method is not limited to this. The computation unit 502 may read one or more pieces of weather information associated with date and time information indicating a past predetermined period from the reception time of the signal, for example, from among the pieces of weather information, stored in the memory 503, of the region including the location indicated by the location information included in the signal received by the communication unit 501, and cause the communication unit 501 to return the read one or more pieces of weather information.

In the first server 200, a history of the weather information of the current location of the communication terminal 100 stored in the memory 102 of the communication terminal 100 owned by the user with permission may be managed as the personal information of the user with permission.

Specifically, the computation unit 104 of the communication terminal 100 may send the date and time information and the weather information stored in the memory 102 in time series in step S206 to the first server 200 in association with the user ID of the user of the communication terminal 100. In response to this, in the first server 200, if the computation unit 202 determines that the user indicated by the user ID sent from the communication terminal 100 is a user with permission in the same manner as in step S221, the computation unit 202 may store the user ID, the date and time information, and the weather information that are sent from the communication terminal 100 in the memory 203 in time series, as the history of the weather information of the current location of the communication terminal 100 owned by the user with permission.

Alternatively, the first server 200 may manage a history of the location information indicating the current location of the communication terminal 100 owned by the user with permission, as the personal information of the user with permission in the same manner. In this case, in step S221, the computation unit 104 may acquire, as the personal information, the history of the location information together with the preference information of the user with permission. The computation unit 104 may trace back to the past the history of the current location of the communication terminal 100 indicated by the acquired history of the location information, and acquire the weather information of the surrounding region at the time of purchase of a drink by the user with permission from the second server 500, as the history of the weather information of the current location of the communication terminal 100.

The computation unit 104 then generates a push notification screen, based on each combination of the identification information of the vending machines 700 and the type information and the stock information included in the product information, the preference information, and the weather information that are acquired in the preceding steps (step S207). Each combination of the identification information of the vending machines 700 and the type information and the stock information included in the product information is the combination acquired in step S202 each time a beacon signal is received. The preference information is the preference information returned and acquired via the communication unit 101 in step S221 and the preference information acquired in step S205. The weather information is the weather information acquired in step S206 and the history of the weather information of the current location of the communication terminal 100 stored in the memory 102.

The computation unit 104 then displays the push notification screen generated in step S207 on the display 105 of the communication terminal 100 (step S208). The computation unit 104 may display the push notification screen on the display 105 and may also drive a vibration generator (not illustrated) built in the communication terminal 100 to allow the user of the communication terminal 100 to easily notice the push notification. The computation unit 104 may display the push notification screen on the display 105 and may also reproduce a sound reporting receipt of the push notification from a speaker (not illustrated) built in the communication terminal 100 to allow the user of the communication terminal 100 to easily notice the push notification.

As described above, in response to receipt of a beacon signal by the proximity communication unit 107, the communication terminal 100 performs the processing of step S201 and subsequent steps, so that the push notification screen is automatically displayed in step S208.

If receipt of a beacon signal by the proximity communication unit 107 is not detected for a predetermined time or more since the push notification screen is displayed in step S208 ([without receipt of beacon signal for predetermined time or more]), the computation unit 104 performs processing of hiding the displayed push notification screen to hide the push notification screen. The computation unit 104 then ends the process (step S209). After ending the process, the computation unit 104 returns to a state of waiting for receipt of a beacon signal by the proximity communication unit 107.

On the other hand, if the user performs an operation (for example, a touch operation) of selecting the push notification screen by using the operation unit 106 ([push notification screen selected]), the computation unit 104 generates an individual purchase menu for the user of the communication terminal 100, based on the type information and the stock information included in the product information, the preference information, and the weather information that are used in step S207 (step S210).

The computation unit 104 then displays the individual purchase menu for the user of the communication terminal 100 generated in step S210 on the display 105 of the communication terminal 100 (step S211).

Suppose that the user of the communication terminal 100 then selects a drink to be purchased from among drinks included in the individual purchase menu displayed in step S211 and performs a purchase operation of the selected drink, by using the operation unit 106. In this case ([purchase operation]), the computation unit 104 reads, from the memory 102, information indicating the transmission direction of the beacon signal transmitted by the vending machine 700 that sells the drink selected as the drink to be purchased. The computation unit 104 displays a direction indication indicating the transmission direction of the beacon signal indicated by the read information on the display 105 of the communication terminal 100 (step S212). After the drink to be purchased is confirmed, the computation unit 104 may re-scan the beacon signal transmitted by the proximity communication unit 707 of the vending machine 700 storing the drink, and display a direction indication indicating the transmission direction of the beacon signal on the display 105 of the communication terminal 100.

The user of the communication terminal 100 then moves to the vending machine 700 that sells the drink to be purchased and performs a predetermined payment operation using the communication terminal 100. In response to the payment operation, the computation unit 104 performs predetermined settlement processing and controls the proximity communication unit 107 to send information indicating drink purchase details to the vending machine 700 (step S213). The information indicating the drink purchase details includes, for example, a product name which is the type of the drink to be purchased, a quantity of purchase of the drink, and a total amount required to purchase the drink.

In the predetermined settlement processing, for example, the computation unit 104 subtracts an amount equivalent to the total amount required to purchase the drink from electronic money balance data stored in the memory 102. The computation unit 104 also controls the proximity communication unit 107 to send electronic money corresponding to the total amount required to purchase the drink, to the vending machine 700 that sells the drink selected as the drink to be purchased.

Alternatively, in the predetermined settlement processing, the computation unit 104 may control the communication unit 101 to send information indicating the drink purchase details and information on a credit card or electronic money input through the payment operation or stored in advance in the memory 102 to the business entity management server 300 that manages the vending machine 700 that sells the drink selected as the drink to be purchased, and request the business entity management server 300 to perform the settlement processing according to the purchase details.

Alternatively, in the predetermined settlement processing, the computation unit 104 may control the proximity communication unit 107 to send information indicating the drink purchase details and information on a credit card input through the payment operation or stored in advance in the memory 102 to the vending machine 700 that sells the drink selected as the drink to be purchased, and request the vending machine 700 to perform the settlement processing according to the purchase details.

In the vending machine 700, according to the information indicating the drink purchase details sent in step S213 and acquired via the proximity communication unit 707, the computation unit 704 causes the drink having the product name indicated by the information to be transported to the pick-up port as many times as the quantity of purchase indicated by the information. Consequently, the drink purchased by the user is provided to the user (step S272).

After step S213, the computation unit 104 of the communication terminal 100 controls the communication unit 101 to send the purchase information of the drink to the first server 200 (step S214). The purchase information of the drink includes the user ID of the user of the communication terminal 100, the date and time information indicating the purchase date and time of the drink by the user, the identification information for identifying the vending machine 700 from which the user purchased the drink, and the type information indicating the type of the drink purchased by the user.

In the first server 200, in response to the communication unit 201 receiving the purchase information sent in step S214, if the user indicated by the user ID included in the purchase information received by the communication unit 201 is a user with permission, the computation unit 202 updates the purchase history information of the user with permission stored in the memory 203 based on the purchase information (step S222).

Method of Recommending and Purchasing Drink

Figure 10:
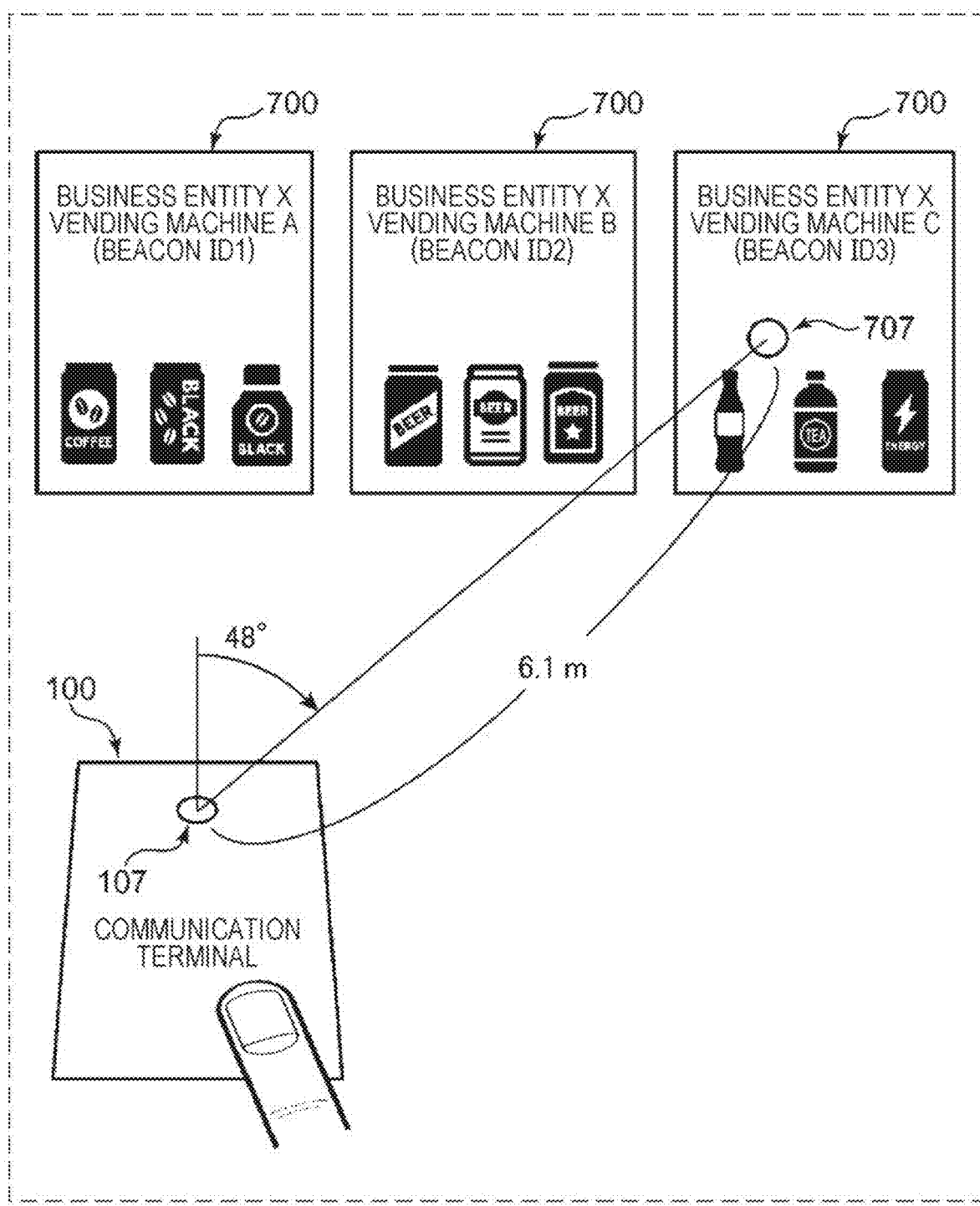
FIG. 10 is a diagram illustrating an example of a relationship between a location of the communication terminal and a location of the vending machine.
Figure 11:
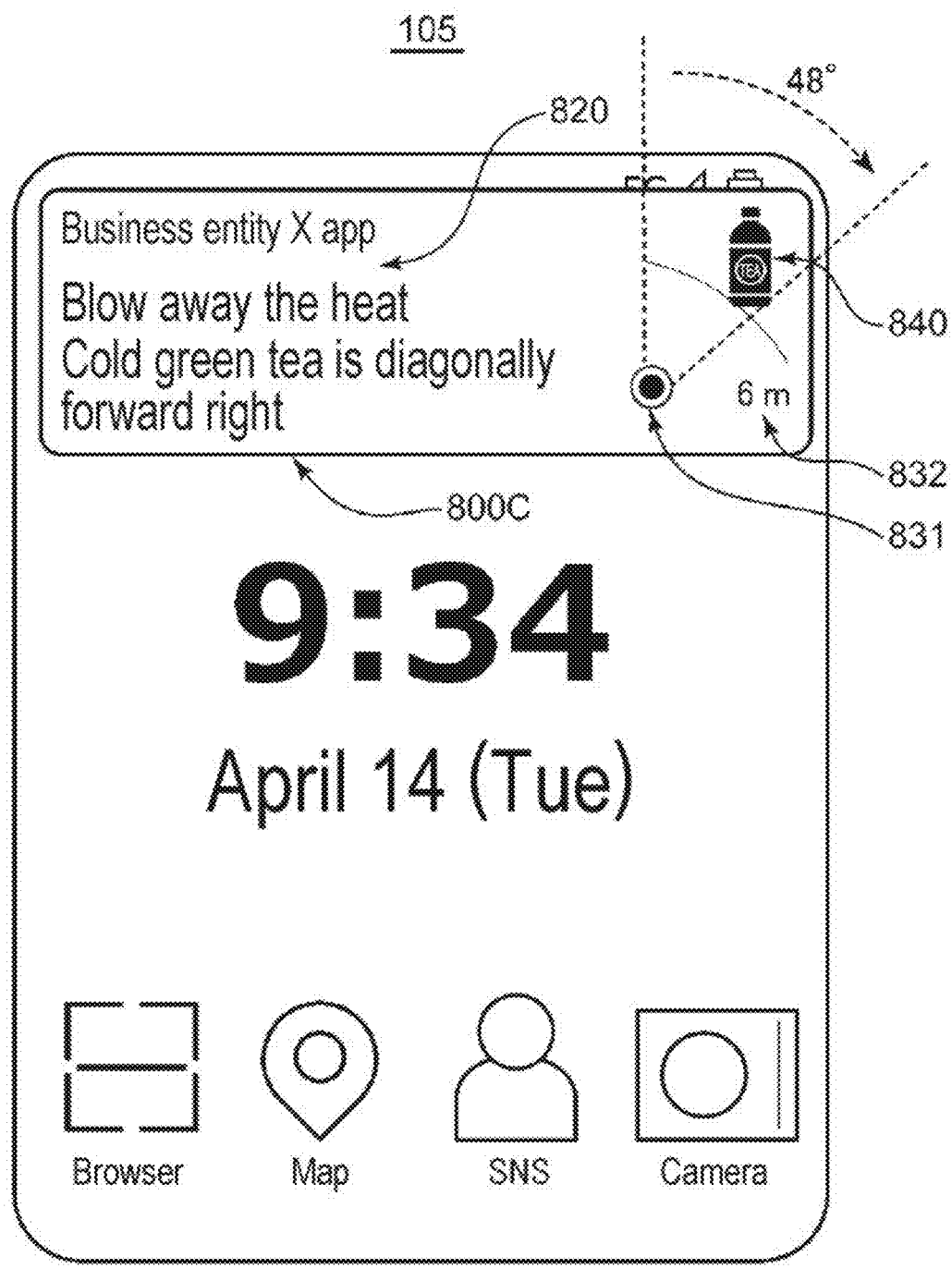
FIG. 11 is a diagram illustrating a display example of a push notification screen.

A method of recommending a drink to the user of the communication terminal 100 and a method of allowing the user to purchase a drink will be described below with reference to each processing (FIGS. 7A and 7B) performed in the vending machine management system described above. In the description, details of the push notification screen and the individual purchase menu for the user of the communication terminal 100 will be described. FIG. 8 is a diagram illustrating a display example of a push notification screen 800A. FIG. 9 is a diagram illustrating a display example of a push notification screen 800B. FIG. 10 is a diagram illustrating an example of a relationship between a location of the communication terminal 100 and a location of the vending machine 700. FIG. 11 is a diagram illustrating a display example of a push notification screen 800C.

Suppose that after launching the business entity X application installed on the communication terminal 100, the user carrying the communication terminal 100 passes in front of or is near the vending machine 700 managed by the business entity X. In this case, the communication terminal 100 receives a beacon signal transmitted from the vending machine 700, and performs the processing from step S201 to step S208 illustrated in FIGS. 7A and 7B. As a result, the push notification screen is displayed on the display 105.

Specifically, in step S208, the computation unit 104 displays the push notification screen 800A imitating the vending machine 700 at an uppermost portion of the display 105 of the communication terminal 100 as illustrated in FIG. 8, for example.

In response to the user performing an operation of sliding the push notification screen 800A downward with a finger or an operation of touching (selecting) the push notification screen 800A with a finger, the computation unit 104 displays the detailed push notification screen 800B on the display 105 as illustrated in FIG. 9. In step S208, the computation unit 104 may display the detailed push notification screen 800B illustrated in FIG. 9 on the display 105 without displaying the push notification screen 800A illustrated in FIG. 8.

The push notification screen 800B includes a message 820 and an icon image 840. The message 820 is a message that recommends one drink determined to match a preference of the user of the communication terminal 100 from among a plurality of drinks stored in the vending machines 700 that are the transmission sources of the respective beacon signals and are indicated by the respective pieces of identification information acquired in step S202 (FIG. 7A) each time a beacon signal is received. The icon image 840 is an image representing the one drink. In this manner, a drink that matches the preference of the user of the communication terminal 100 is recommended to the user who is in the vicinity of the vending machine 700.

In the push notification screen 800B, an image 830 is displayed as a direction indication indicating the transmission direction of the beacon signal transmitted by the vending machine 700 storing the recommended drink, based on the information indicating the transmission direction of the beacon signal stored in the memory 102 in step S201 (FIG. 7A). Thus, the user of the communication terminal 100 can grasp the direction in which the vending machine 700 storing the recommended drink is present.

In the push notification screen 800B, a message may be displayed that recommends a plurality of drinks determined to match the preference of the user of the communication terminal 100 from among the plurality of drinks stored in the vending machines 700 that are the transmission sources of the respective beacon signals. Similarly to the image 830, direction indications each indicating the transmission direction of the beacon signal transmitted by a corresponding one of the vending machines 700 storing the plurality of recommended drinks may be displayed in the push notification screen 800B based on the information indicating the transmission directions of the beacon signals stored in the memory 102 in step S201 (FIG. 7A).

Alternatively, suppose that the proximity communication unit 107 of the communication terminal 100 receives a beacon signal transmitted by the proximity communication unit 707 of the vending machine 700 located at a location that is 6.1 m away from the proximity communication unit 107 in a direction rotated clockwise by 48 degrees from the front direction of the communication terminal 100, as illustrated in FIG. 10, for example. In this case, in step S208, the computation unit 104 may display the push notification screen 800C illustrated in FIG. 11 on the display 105.

The push notification screen 800C includes the message 820 identical to that in the push notification screen 800B illustrated in FIG. 9. In the push notification screen 800C illustrated in FIG. 11, an image different from the image 830 illustrated in FIG. 9 is displayed as the direction indication.

Specifically, the computation unit 104 displays an image 831 indicating the current location of the communication terminal 100 and displays the icon image 840 indicating the product recommended in step S207 in a direction rotated clockwise by 48 degrees from the front direction of the image 831, by using the information indicating the transmission direction of the beacon signal stored in the memory 102 in step S201 (FIG. 7A). The computation unit 104 further displays an image 832 indicating the distance from the current location of the communication terminal 100 by using the information indicating the distance to the vending machine 700 that is the transmission source of the beacon signal stored in the memory 102 in step S201 (FIG. 7A). In this specific example, since the distance to the vending machine 700 that is the transmission source of the beacon signal is 6.1 m (FIG. 10), the computation unit 104 displays the image 832 representing a distance of 6 m from the current location of the communication terminal 100, which is a rough indication of the distance, as illustrated in FIG. 11.

Hereinafter, the push notification screens 800A to 800C described above are collectively referred to as the push notification screen 800. Suppose that after the push notification screen 800 is displayed on the display 105, the user of the communication terminal 100 moves and a predetermined time or more has elapsed during which the proximity communication unit 107 of the communication terminal 100 fails to receive the beacon signal from the vending machine 700. In this case, step S209 (FIG. 7B) is performed, and the push notification screen 800 is hidden. Thus, the push notification screen 800 that recommends a drink being kept uselessly displayed on the display 105 of the communication terminal 100 of the user who presumably does not wish to purchase the drink is avoided.

However, the trigger of hiding the push notification screen 800 is not limited to this. When the user of the communication terminal 100 performs, using the operation unit 106, an operation (for example, a swipe operation) in an area of the display 105 where the push notification screen 800 is displayed, the computation unit 104 may perform the processing of hiding the displayed push notification screen 800 to hide the push notification screen 800. Alternatively, when the user does not perform any operation on the push notification screen 800 for a predetermined time or more since the display of the push notification screen 800, the computation unit 104 performs the processing of hiding the displayed push notification screen 800 to hide the push notification screen 800, or the computation unit 104 may perform processing of displaying an indication such as "timeout" over the push notification screen 800 to invalidate the push notification screen 800.

The user who wishes to purchase a drink after viewing the push notification screen 800 performs an operation (for example, a touch operation) of selecting the push notification screen 800 by using the operation unit 106. In this case, steps S210 and S211 (FIG. 7B) are performed. Consequently, the individual purchase menu for the user is displayed on the display 105.

Figure 12:
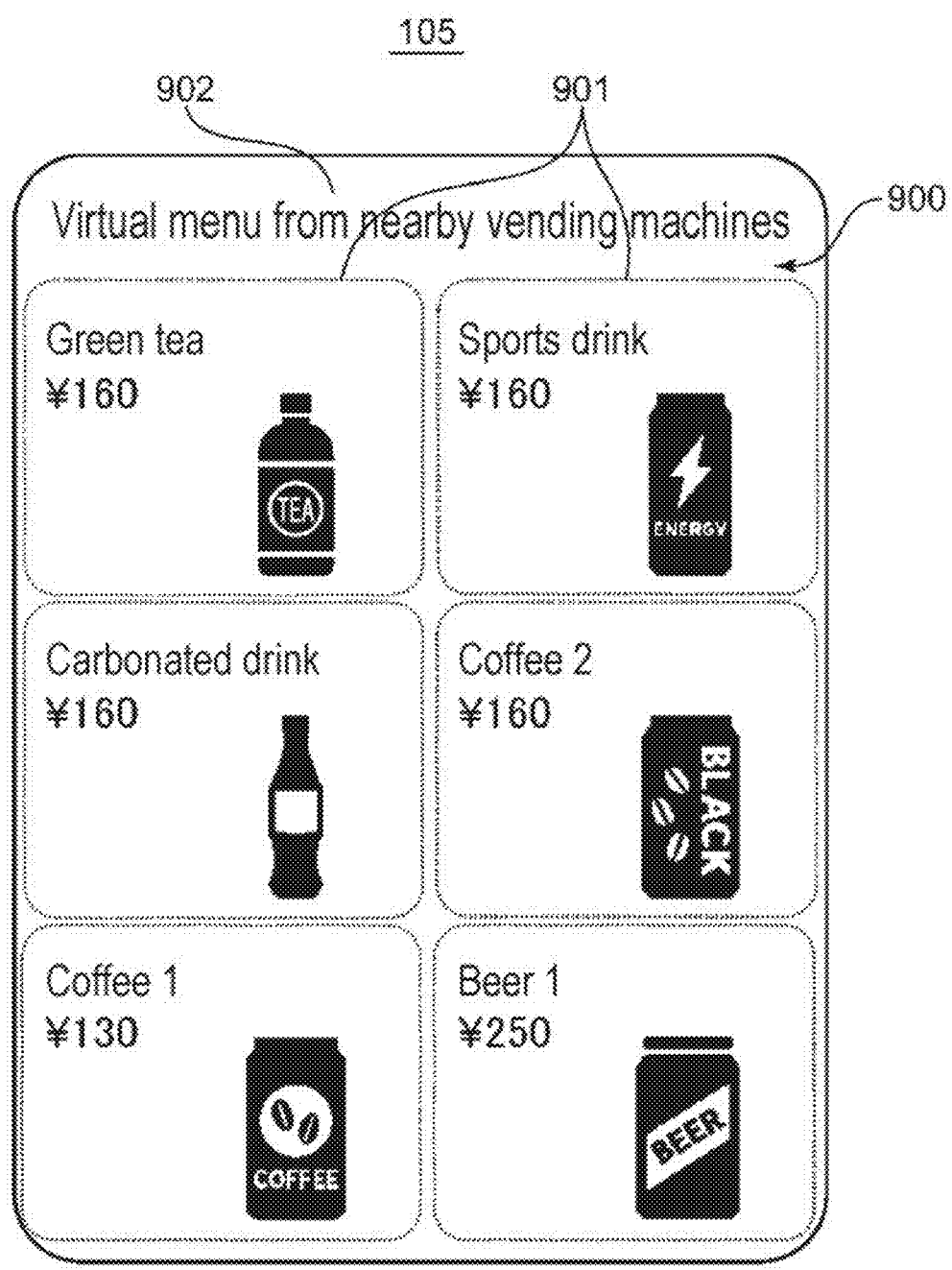
FIG. 12 is a diagram illustrating a display example of an individual purchase menu.

FIG. 12 is a diagram illustrating a display example of an individual purchase menu 900. Specifically, in step S211 (FIG. 7B), the computation unit 104 displays the individual purchase menu 900 for the user on the display 105 as illustrated in FIG. 12, for example. The individual purchase menu 900 for the user includes a plurality of tile objects 901 arranged in a matrix and a title 902.

One tile object 901 corresponds to one drink that is determined to match the preference of the user of the communication terminal 100 from among a plurality of drinks stored in the vending machines 700 that are transmission sources of the respective beacon signals and are indicated by the respective pieces of identification information acquired in step S202 (FIG. 7A) each time a beacon signal is received. Each of the tile objects 901 includes a product name that is the type of the drink, a price of the drink, and an image of the drink.

Similarly to the image 830 included in the push notification screen 800 illustrated in FIG. 9, for example, a direction indication indicating the transmission direction of the beacon signal transmitted by the corresponding vending machine 700 storing the drink may be displayed in each of the tile objects 901, based on the information indicating the transmission direction of the beacon signal stored in the memory 102 in step S201 (FIG. 7A).

The tile objects 901 are arranged in order according to a degree of matching the preference of the user of the communication terminal 100. For example, the tile objects 901 are arranged from the left end to the right end sequentially from the tile object 901 corresponding to a drink having the highest ranking in the order. After one of the tile objects 901 is arranged at the right end, the tile objects 901 are arranged from the left end to the right end in the next row below. The example of the individual purchase menu 900 in FIG. 12 indicates that a drink with the product name "green tea" represented by the tile object 901 arranged at the left end in the uppermost row has the highest ranking in the order, and a drink with the product name "beer 1" represented by the tile object 901 arranged at the right end in the lowermost row has the lowest ranking in the order.

The arrangement order of the tile objects 901 according to the rankings described herein is an example, and the present disclosure is not limited to this example. In accordance with the rankings in the order, the tile objects 901 may be arranged from the right end to the left end in the same row, may be arranged from the lowermost row to the uppermost row, or may be arranged in a combination thereof.

For example, a plurality of objects representing a plurality of drinks may be arranged in a line horizontally, vertically, or on an arc line, and only some of the objects may be displayed on the display 105. In this case, the object representing the drink having the highest ranking in the order may be arranged to be displayed at the center initially, and the object representing the drink having the next highest ranking may be arranged to be displayed next to the object representing the drink having the highest ranking in the order. In this example, the objects may be arranged so that the ranking in the order becomes lower as the position becomes closer to the right, the objects may be arranged so that the ranking in the order becomes lower as the position becomes closer to the left, or the ranking of the drink represented by the object may become lower as the distance of the object from the object representing the drink having the highest ranking in the order increases.

As described above, the individual purchase menu 900 for the user is not an individual purchase menu specific for one vending machine 700 but is a menu obtained by integrating, as one purchase menu, drinks that are determined to match the preference of the user of the communication terminal 100 from among a plurality of drinks stored in all the vending machines 700 that are transmission sources of the beacon signals received by the communication terminal 100. Thus, the title 902 indicates that the individual purchase menu 900 is an integrated purchase menu of a plurality of drinks sold by the nearby vending machines 700, such as "virtual menu from nearby vending machines" illustrated in FIG. 12, for example.

In response to the user performing a scroll operation in the individual purchase menu 900 for the user by using the operation unit 106, the displayed tile objects 901 are changed accordingly. Thus, the tile objects 901 corresponding to other drinks that are not displayed at a time are displayed. As described above, the user can browse the tile objects 901 corresponding to all the drinks included in the individual purchase menu 900 for the user by performing a scroll operation.

Figure 13:
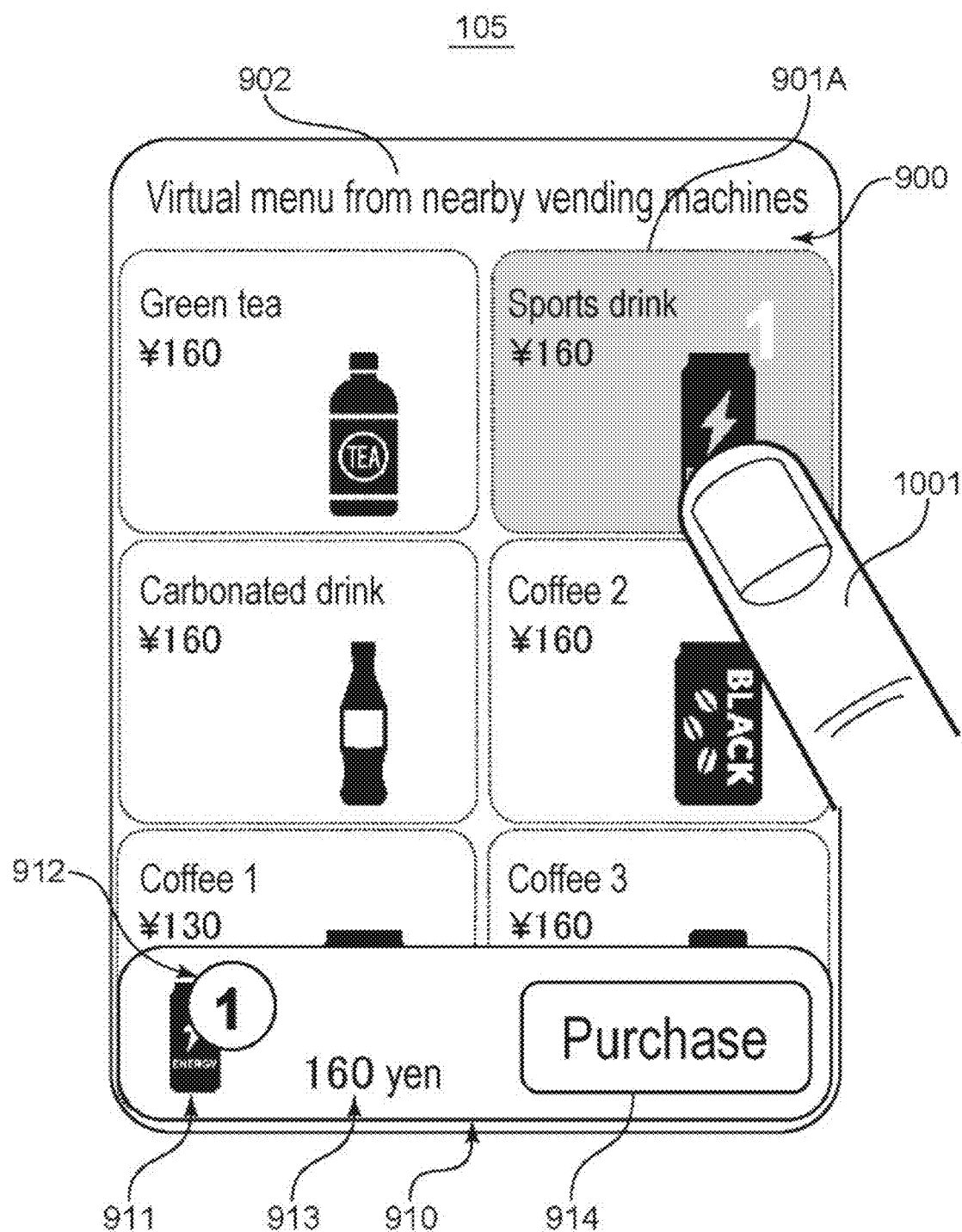
FIG. 13 is a diagram illustrating an example of a scene in which a user of the communication terminal selects a drink to be purchased from the individual purchase menu.

The user who has decided on the drink to be purchased after viewing the individual purchase menu 900 performs a purchase operation for the drink to be purchased. FIG. 13 is a diagram illustrating an example of a scene in which the user of the communication terminal 100 selects a drink to be purchased from the individual purchase menu 900. Specifically, as illustrated in FIG. 13, the user can select a drink to be purchased by performing a touch operation on the tile object 901 representing the drink to be purchased by using a pointing body 1001 such as a finger.

In response to the tile object 901 representing the drink to be purchased being selected, the computation unit 104 changes a color and/or a pattern of the selected tile object 901. The computation unit 104 also displays "1" indicating the quantity of purchase of the drink represented by the tile object 901, at a predetermined position (for example, an upper right portion) of the tile object 901. Each time the tile object 901 is selected by the user, the computation unit 104 counts up the quantity of purchase displayed over the tile object 901 by one and displays the resulting quantity of purchase.

In response to at least one tile object 901 being selected, the computation unit 104 displays a purchase operation screen 910 at, for example, a lowermost portion of the display 105. The purchase operation screen 910 includes an image 911 representing the drink to be purchased selected by the user, a quantity of purchase 912 of the drink to be purchased, a total amount 913 required to purchase as many drinks to be purchased as the quantity of purchase 912, and a purchase button 914 for confirming purchase of the drink. As described above, since the image of the drink to be purchased, the quantity of purchase, and the total amount required for purchase are displayed in the purchase operation screen 910, the user can efficiently check the purchase details.

In the purchase operation screen 910, a direction indication indicating the transmission direction of the beacon signal transmitted by the vending machine 700 storing the drink to be purchased may be displayed based on the information stored in the memory 102 in step S201 (FIG. 7A), similarly to the image 830 included in the push notification screen 800 illustrated in FIG. 9, for example.

Figure 14:
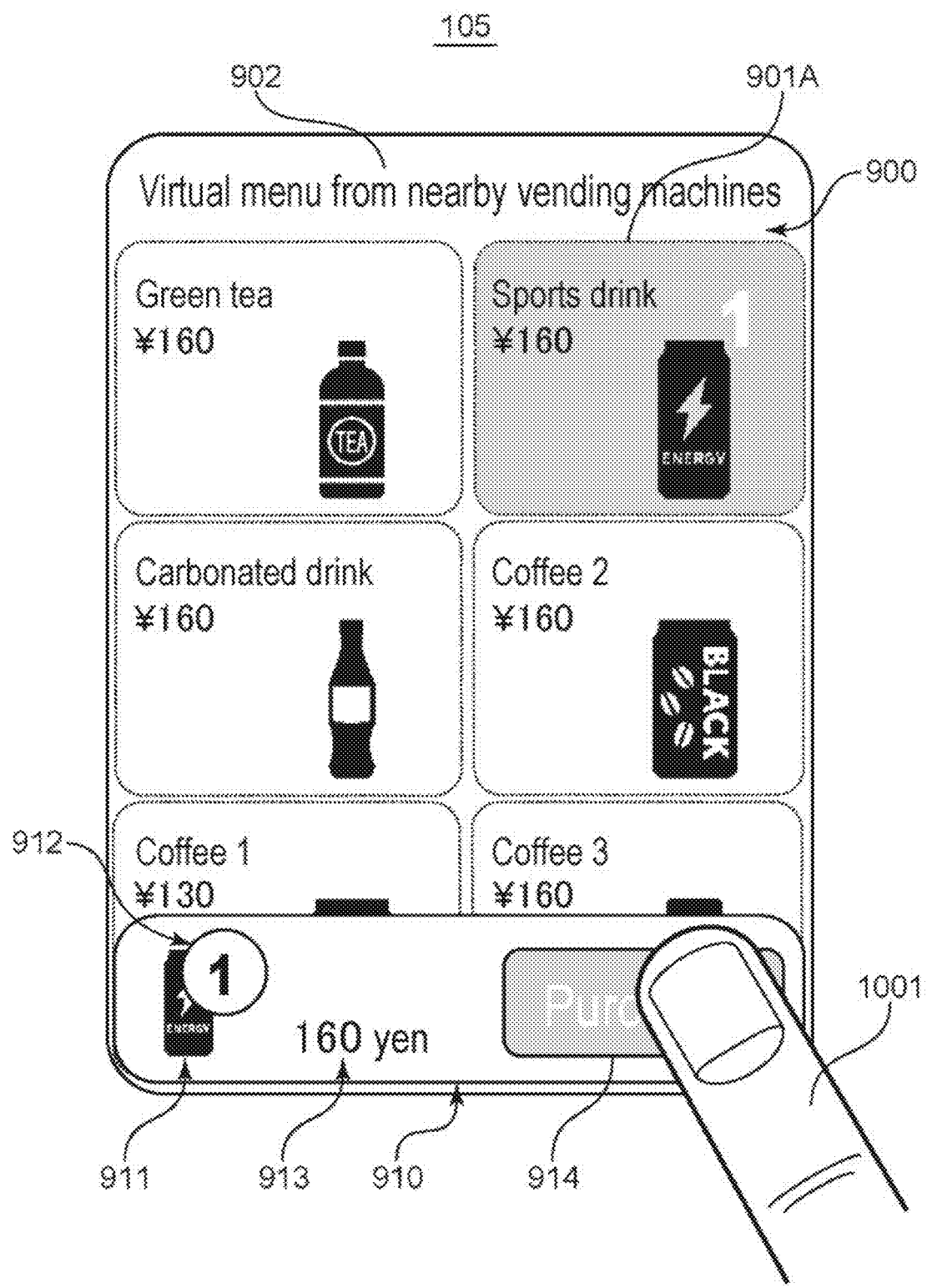
FIG. 14 is a diagram illustrating an example of a scene in which the user of the communication terminal confirms purchase of the drink.

FIG. 14 is a diagram illustrating an example of a scene in which the user of the communication terminal 100 confirms purchase of the drink. As illustrated in FIG. 14, the user who has confirmed that there is no problem in the purchase details in the purchase operation screen 910 performs a touch operation on the purchase button 914 by using the pointing body 1001 such as a finger. While a touch operation on the purchase button 914 is continued, the computation unit 104 changes a color and/or a pattern of the purchase button 914.

When the user releases the pointing body 1001 from the purchase button 914, the purchase operation of the drink to be purchased is completed, and step S212 (FIG. 7B) is performed. Consequently, a direction indication indicating the transmission direction of the beacon signal transmitted by the vending machine 700 (hereinafter, referred to as a vending machine with the purchase target) that sells the drink selected as the drink to be purchased is displayed on the display 105.

FIG. 15 is a diagram illustrating an example of a scene in which the user of the communication terminal 100 acquires the purchased drink. Specifically, in step S212, the computation unit 104 displays a payment guidance screen 920 for guiding a method for paying for the purchased drink on the display 105 as illustrated in FIG. 15.

As in the push notification screen 800C illustrated in FIG. 11, a direction indication indicating the transmission direction of the beacon signal transmitted by the vending machine with the purchase target is displayed in the payment guidance screen 920.

Specifically, the computation unit 104 displays an image 925 indicating the current location of the communication terminal 100. By using the information that indicates the transmission direction of the beacon signal transmitted by the vending machine with the purchase target and is stored in the memory 102 in step S201 (FIG. 7A), the computation unit 104 also displays an icon image 927 representing the vending machine 700 in the transmission direction indicated by the information with respect to the front direction of the image 925.

By using the information that indicates the distance to the vending machine with the purchase target and is stored in the memory 102 in step S201 (FIG. 7A), the computation unit 104 further displays an image 926 indicating the distance from the current location of the communication terminal 100. Thus, the user can easily move to the vending machine with the purchase target by viewing the direction indication displayed in the payment guidance screen 920 to acquire the drink to be purchased.

The payment guidance screen 920 includes a type 924 of the drink to be purchased, an image 921 of the drink, a quantity of purchase 922 of the drink, and a total amount 923 required to purchase as many drinks to be purchased as the quantity of purchase 922. The payment guidance screen 920 also includes a message 928 for guiding a method of a payment operation performed using the communication terminal 100 at the vending machine with the purchase target.

The user moves to the vending machine with the purchase target while viewing the direction indication displayed in the payment guidance screen 920. In accordance with the message 928 displayed in the payment guidance screen 920, the user performs a payment operation at the vending machine with the purchase target by using the communication terminal 100. In response to the payment operation, step S213 (FIG. 7B) is performed in the communication terminal 100 and step S272 (FIG. 7B) is performed in the vending machine with the purchase target. Consequently, the drink purchased by the user is provided to the user.

As a result of step S214 (FIG. 7B) being performed, the purchase information of the drink is sent to the first server

200. Thus, step S222 (FIG. 7B) is performed. As a result, when the user of the communication terminal 100 is a user with permission, the purchase history information of the user stored in the memory 203 of the first server 200 is updated based on the purchase information sent in step S214.

Data Configurations

Data configurations of the information used in each step illustrated in FIGS. 7A and 7B will be described next.

FIG. 16 is a diagram illustrating an example of a data configuration of information 2100 stored in the memory 102 of the communication terminal 100 at the time of receipt of a beacon signal. The information 2100 illustrated in FIG. 16 is stored in the memory 102 in steps S201 and S202.

A field "beacon ID" is a field indicating the beacon ID included in the beacon signal received in step S201 (see FIGS. 4 and 5 for the data structure of the beacon ID). A field "beacon distance" is a field indicating the distance from the communication terminal 100 to the vending machine 700 that is the transmission source of the beacon signal received in step S201. A field "beacon direction" is a field indicating the transmission direction of the beacon signal received in step S201.

A field "vending machine ID" is a field indicating the vending machine ID included in the identification information for identifying the vending machine 700, which is acquired in step S202 from the vending machine 700 that has transmitted the beacon signal received in step S201. Fields "product information 1" to "product information 3" are fields indicating pieces of product information, on respective drinks stored in the vending machines 700, which are included in the additional information acquired in step S202 from the vending machine 700 that has transmitted the beacon signal received in step S201.

For example, in step S201, a beacon signal (first beacon signal) with a beacon ID "ID1" is received. Thus, in a first record of the information 2100 illustrated in FIG. 16, "ID1" is stored in the field "beacon ID". In step S201, the distance to the vending machine 700 (first vending machine) that is the transmission source of the beacon signal is detected to be "5.0 (m)", and the transmission direction of the beacon signal is also detected to be a direction rotated clockwise by "349 (degrees)" with respect to the front direction of the proximity communication unit 107 of the communication terminal 100. Thus, in the first record, "5.0" and "349" are stored in the fields "beacon distance" and "beacon direction", respectively.

In step S202, "vending machine A" (first identification information) is acquired as the vending machine ID from the vending machine 700 that is the transmission source of the beacon signal received in step S201. Thus, in the first record in FIG. 16, "vending machine A" is stored in the field "vending machine ID".

Three types of drinks (first group of drinks) are stored in the vending machine 700. Product information including type information (first type information) indicating that the product name is "coffee 1" and stock information (first stock information) indicating that the price is "130", the quantity is "8", and the temperature is "5"; product information including type information indicating that the product name is "coffee 2" and stock information indicating that the price is "160", the quantity is "10", and the temperature is "5", and product information including type information indicating that the product name is "coffee 3" and stock information indicating that the price is "160", the quantity is "7", and the temperature is "6" are acquired from the vending machine 700. Thus, "coffee 1, 130, 8, 5", "coffee 2, 160, 10, 5", and "coffee 3, 160, 7, 6" are stored in the fields "product information 1", "product information 2", and "product information 3", respectively.

The information 2100 illustrated in FIG. 16 further indicates that a record having the field "beacon ID" with "ID2" and a record having the field "beacon ID" with "ID3" are stored since beacon signals having the beacon IDs "ID2" and "ID3" are received, respectively.

For example, "vending machine B" (second identification information) is acquired as the vending machine ID from the vending machine 700 (second vending machine) that is the transmission source of the beacon signal (second beacon signal) with the beacon ID "ID2". Thus, "vending machine B" is stored in the field "vending machine ID" of the record in which the field "beacon ID" is "ID2".

Three types of drinks (second group of drinks) are stored in the vending machine 700. Product information including type information (second type information) indicating that the product name is "beer 1" and stock information (second stock information) indicating that the price is "250", the quantity is "7", and the temperature is "6"; product information including type information indicating that the product name is "beer 2" and stock information indicating that the price is "250", the quantity is "0", and the temperature is "6"; and product information including type information indicating that the product name is "beer 3" and stock information indicating that the price is "300", the quantity is "11", and the temperature is "13" are acquired from the vending machine 700. Thus, "beer 1, 250, 7, 6", "beer 2, 250, 0, 6", and "beer 3, 300, 11, 13" are stored in the fields "product information 1", "product information 2", and "product information 3", respectively.

FIG. 17 is a diagram illustrating an example of a data configuration of purchase history information 2110 for each user stored in the memory 203 of the first server 200. The purchase history information 2110 illustrated in FIG. 17 is stored in the memory 203 in time series in step S222 illustrated in FIG. 7B.

A field "user ID" is a field indicating a user ID of a user who purchased a product. A field "date and time information" is a field indicating the date and time when the user purchased the drink. A field "sales site ID" is a field indicating an identifier of a sales site where the user purchased the product, such as a vending machine ID. A field "purchased product name" is a field indicating the product name of the product purchased by the user.

For example, a second record of the purchase history information 2110 illustrated in FIG. 17 indicates an example in which, purchase information in which the user ID is "USR01", the date and time information is "20200414095340", the vending machine ID is "vending machines A", and the type information is "green tea (cold)" is received in step S222 (FIG. 7B) performed in response to purchase of a drink by the user and "USR01", "20200414095340", "vending machines A", and "green tea (cold)" are stored in the fields "user ID", "date and time information", "sales site ID", and "purchased product name", respectively.

The purchase history information 2110 may be updated when the user purchases a product at sales sites including stores managed by business entities that have an affiliation with the managing business entity of the first server 200, such as retail stores (including manned stores and unmanned stores) such as convenience stores or supermarkets, eateries such as restaurants and cafes, vending machines, and e-commerce (EC) sites for electronic transactions. Alternatively, the purchase history information 2110 may be updated when the user purchases a product through an electronic payment service free from direct involvement of cash, such as through a credit card, a debit card, electronic money, or cryptocurrency used by the user. Specifically, when information on purchase of a product by the user is sent from an information communication terminal such as a personal computer installed in the store to the first server 200 via the network NT (FIG. 2), the same processing as step S222 may be performed, so that the purchase history information 2110 stored in the memory 203 may be updated based on the information on the purchase of the product.

For example, a first record of the purchase history information 2110 illustrated in FIG. 17 is a record stored in the memory 203 as the purchase history information 2110 in response to the user identified by the user ID "USR01" purchasing hot cappuccino and ice cream indicated by the purchased product name "cappuccino (hot), ice cream" at 12:15:45 on Apr. 13, 2020 indicated by the date and time information "20200413121545" at a sales site identified by the sales site ID "cafe A Kadoma branch".

FIG. 18 is a diagram illustrating an example of a data configuration of preference information 2120 included in personal information of a user stored in the memory 203 of the first server 200. The preference information 2120 illustrated in FIG. 18 is generated by the computation unit 202 based on the purchase history information (FIG. 17) of a user with permission in a past predetermined period stored in the memory 203 of the first server 200, and is returned to the communication terminal 100 of the user with permission in step S221 illustrated in FIG. 7A.

A field "user ID" is a field indicating a user ID included in the identification information for identifying the communication terminal 100 received in step S204. A field "number of purchases" is a field indicating the number of times the user indicated by the user ID has purchased a product having the product name indicated in a field "product name" in the past predetermined period. The field "product name" is a field indicating the product name of the product purchased by the user indicated by the user ID. A field "purchase date and time" is a field indicating a history of the purchase date and time of the product having the product name indicated in the field "product name".

For example, the computation unit 202 generates the preference information 2120 of the user with permission, based on the purchase history information (FIG. 17) of the user with permission in the past predetermined period in the following manner. If the user indicated by the user ID included in the identification information for identifying the communication terminal 100 received in step S204 is a user with permission, the computation unit 202 acquires the purchase history information (FIG. 17) of the user with permission in the past predetermined period stored in the memory 203. The past predetermined period is determined to be a fixed period such as five years in the past from the present, for example. However, the past predetermined period is not limited to a fixed period. For example, information indicating the past predetermined period may be sent together with the signal requesting sending of the preference information of the user in step S204 (FIG. 7A).

The computation unit 202 refers to the field "purchased product name" of the acquired purchase history information (FIG. 17) of the user with permission in the past predetermined period, and extracts the product names sequentially from the product name with the highest number of purchases. For each of the extracted product names, the computation unit 202 stores the user ID of the user with permission in the field "user ID", the number of purchases of the product having the extracted product name in the field "number of purchases", and the extracted product name in the field "product name". The computation unit 202 acquires the date and time information stored in the field "date and time information" from the records including the extracted product name in the field "purchased product name" in the acquired purchase history information (FIG. 17) of the user with permission in the past predetermined period, and stores the dates and times indicated by the acquired pieces of date and time information in the field "purchase date and time" in descending order (from the most recent date to the past). This order is not limited to descending order, and may be ascending order or random order.

For example, suppose that the product name most frequently stored in the field "purchased product name" of the purchase history information (FIG. 17) of the user with permission having the user ID "USR01" in the past predetermined period is "green tea (cold)" and the number of records including this product name in the field "purchased product name" is "167". That is, the number of purchases of the drink having this product name is "167" times.

In this case, as illustrated in a first record of the preference information 2120 illustrated in FIG. 18, "USR01", "167", and "green tea (cold)" are stored in the fields "user ID", "number of purchases", and "product name", respectively. The date and time information stored in the field "date and time information" is acquired from 167 records including the product name "green tea (cold)" in the field "purchased product name" in the purchase history information (FIG. 17) of the user with permission having the user ID "USR01" in the past predetermined period. 167 dates and times such as "20200414223442, 20200414095340, . . . " indicated by the acquired pieces of date and time information are stored in descending order in the field "purchase date and time" of the first record of the preference information 2120 illustrated in FIG. 18.

FIG. 19 is a diagram illustrating an example of a data configuration of weather information 2200 of a current location of the communication terminal 100. The weather information 2200 of the current location of the communication terminal 100 illustrated in FIG. 19 is acquired from the second server 500 in step S206 illustrated in FIG. 7B.

A field "temperature (Celsius)" is a field indicating a temperature of the current location of the communication terminal 100 in degrees Celsius. Fields "humidity", "a heat index (wet-bulb globe temperature: WBGT)", "solar radiation", and "weather type" are fields indicating a humidity, a heat index (WBGT), a solar radiation, and a weather type at the current location of the communication terminal 100, respectively. The solar radiation is, for example, an integrated value of solar radiation at the current location of the communication terminal 100 in the most recent one hour, and the unit thereof is megajoules per square meter (MJ/m$^2$).

For example, suppose that when step S206 illustrated in FIG. 7B is performed, the memory 503 of the second server 500 stores weather information indicating that the temperature is "28° C.", the humidity is "75%", the heat index is "29° C.", the solar radiation is "3.1 MJ/m$^2$", and the weather type is "sunny" in association with date and time information indicating the date and time closest to the execution time of step S206, as weather information of a region including the current location of the communication terminal 100 at the execution time of step S206.

In this case, in step S206, the weather information 2200 illustrated in FIG. 19 in which "28 (° C.)", "75(%)", "29 (° C.)", "3.1 (MJ/m$^2$)", and "sunny" are respectively stored in the fields "temperature (Celsius)", "humidity", "heat index (WBGT)", "solar radiation", and "weather type" is acquired from the second server 500.

The weather information stored in the memory 503 of the second server 500 is not limited this, and may include at least one or more of the fields "temperature (Celsius)", "humidity", "heat index (WBGT)", "solar radiation", or "weather type".

FIG. 20 is a diagram illustrating an example of a data configuration of a history 2210 of the weather information of the current location of the communication terminal 100. As described above, the computation unit 104 periodically performs step S206, and stores the weather information acquired from the second server 500 and the date and time information indicating the acquisition date and time in association with each other in the memory 102 in time series, as the history 2210 of the weather information of the current location of the communication terminal 100 as illustrated in FIG. 20.

A field "date and time information" is a field for storing date and time information indicating the acquisition date and time of the weather information from the second server 500. A field "weather information" is a field for storing the weather information acquired from the second server 500. Similarly to the weather information 2200 illustrated in FIG. 19, the field "weather information" includes subfields "temperature (Celsius)", "humidity", "heat index (WBGT)", "solar radiation", and "weather type" for respectively storing the temperature, the humidity, the heat index, the solar radiation, and the weather type included in the weather information.

For example, the history 2210 of the weather information of the current location of the communication terminal 100 illustrated in FIG. 20 indicates an example in which step S206 is performed every hour from 6:00:00 on Apr. 14, 2020 indicated by the date and time information "20200414060000" to 9:00:00 on Apr. 14, 2020 indicated by the date and time information "20200414090000", and the date and time information indicating the date and time when each step S206 is performed and the weather information acquired in corresponding step S206 are stored in the memory 102 in time series.

As described above, the history 2210 of the weather information of the current location of the communication terminal 100 stored in the memory 102 may be sent to the first server 200, and may be managed as personal information of the user of the communication terminal 100 in the first server 200.

Process of Determining at Least One Drink that Matches Preference of User

A drink determination process of determining at least one drink that matches a preference of the user of the communication terminal 100, is recommended in the push notification screen 800, and is displayed in the individual purchase menu 900 for the user will be described next by using a specific example. The drink determination process is performed when the push notification screen 800 is generated, and a result of the drink determination process is used when the individual purchase menu 900 for the user is generated.

In the present embodiment, in the drink determination process, at least one drink that matches the preference, indicated by the preference information, of the user of the communication terminal 100 is determined in relation to the weather, indicated by the weather information, at the current location of the communication terminal 100 from among a plurality of drinks stored in the vending machines 700 that are transmission sources of respective beacon signals received by the proximity communication unit 107, by using each combination of the identification information of each of the vending machines 700 that are the transmission sources and the type information and the stock information included in the product information, the preference information, and the weather information that are acquired prior to the drink determination process.

Figure 21:
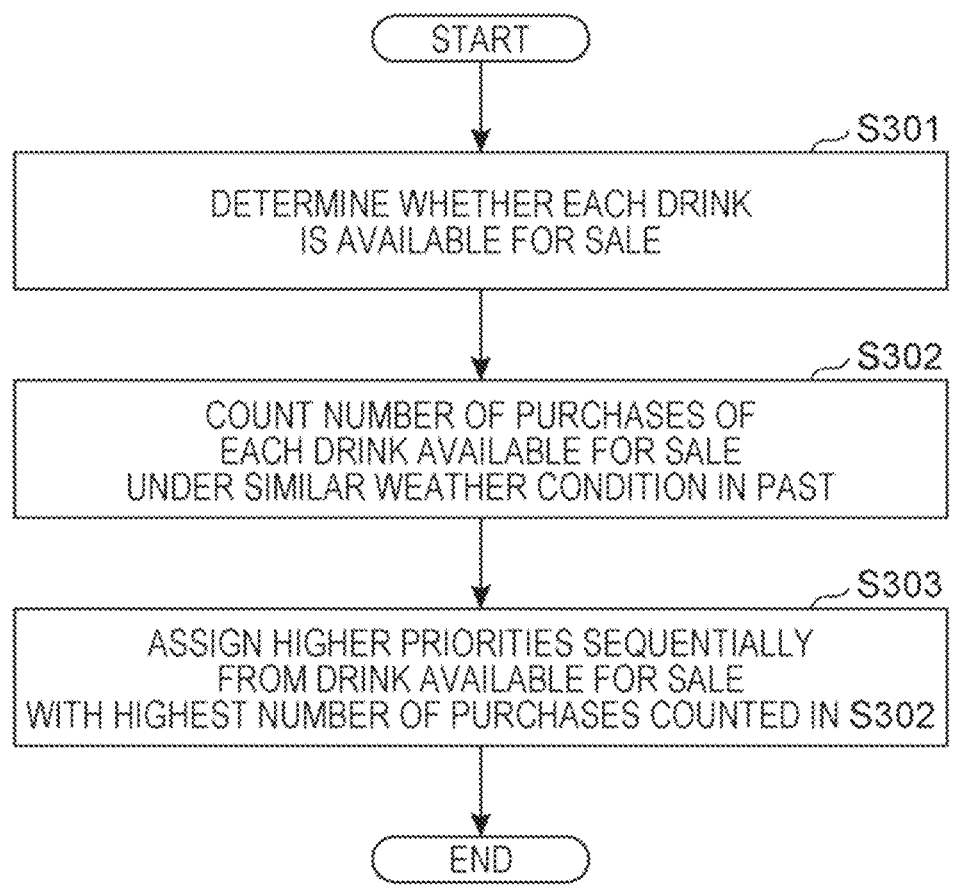
FIG. 21 is a flowchart illustrating a drink determination process.

FIG. 21 is a flowchart illustrating an example of the drink determination process. FIG. 22 is a diagram illustrating an example of a work table 2400 used in the drink determination process.

Suppose that in this specific example, the product information included in the information 2100 illustrated in FIG. 16, the preference information 2120 illustrated in FIG. 18, the weather information 2200 illustrated in FIG. 19, and the history 2210 of the weather information illustrated in FIG. 20 are acquired prior to the drink determination process.

As illustrated in FIG. 21, the computation unit 104 first refers to each piece of product information (FIG. 16) acquired prior to the drink determination process, and determines whether a drink corresponding to the piece of product information is available for sale, based on the type information and the stock information included in the piece of product information. The computation unit 104 then stores a result of the determination in the work table 2400 illustrated in FIG. 22 (step S301). Thus, drinks determined to be not available for sale can be excluded from drinks recommended to the user.

Specifically, in step S301, the computation unit 104 determines that a drink corresponding to a piece of product information in which the quantity information included in the stock information indicates a quantity "0" is a drink that is sold out and thus is not available for sale. The computation unit 104 also determines that a drink corresponding to a piece of product information in which the temperature indicated by the temperature information included in the stock information is out of the predetermined temperature range in which the drink is providable to users is a drink that has an unsuitable temperature and thus is not available for sale. In this specific example, the predetermined temperature range for cold drinks is higher than or equal to 4° C. and lower than or equal to 7° C. In this specific example (FIG. 16), hot drinks are not handled. However, the predetermined temperature range for hot drinks is higher than or equal to 53° C. and lower than or equal to 57° C.

In the example of FIG. 16, in the record with the beacon ID "ID2", the drink corresponding to the piece of product information in which the quantity indicated by the quantity information included in the stock information is "0" and the product name indicated by the type information is "beer 2" is determined to be a drink not available for sale. In the record with the beacon ID "ID2", the drink corresponding to the piece of product information in which the temperature indicated by the temperature information included in the stock information is "13" and the product name indicated by the type information is "beer 3" is determined to be a drink not available for sale. The drinks corresponding to the seven pieces of product information excluding these two pieces of product information are determined to be drinks available for sale.

As illustrated in FIG. 22, the computation unit 104 refers to each piece of product information (FIG. 16) acquired prior to the drink determination process, and stores the product name (for example, coffee 1) indicated by the type information included in the product information in the field "product name" of the work table 2400 illustrated in FIG.

22. The computation unit 104 then stores a result of the determination obtained in step S301 in a field "available for sale" of the work table 2400.

"OK" in the field "available for sale" in FIG. 22 indicates that the drink with the product name (for example, coffee 2) indicated by the field "product name" corresponding to the field "available for sale" is determined to be a drink available for sale. "NG (sold out)" in the field "available for sale" in FIG. 22 indicates that the drink with the product name (for example, beer 2) indicated by the field "product name" corresponding to the field "available for sale" is determined to be sold out and thus is a drink not available for sale. "NG (unsuitable temperature)" in the field "available for sale" in FIG. 22 indicates that the drink with the product name (for example, beer 3) indicated by the field "product name" corresponding to the field "available for sale" is determined to have an unsuitable temperature and thus is a drink not available for sale.

Next, based on the product information (FIG. 16) on the drinks determined to be available for sale in step S301 and the preference information 2120 (FIG. 18), the weather information 2200 (FIG. 19), and the history 2210 of the weather information (FIG. 20) that have been acquired prior to the drink determination process, the computation unit 104 counts the number of times (hereinafter, referred to as the number of purchases under the similar weather) the user of the communication terminal 100 has purchased each of the drinks determined to be available for sale in step S301 in the past under a weather condition similar to the current weather condition among the number of purchases of the drink (step S302).

Specifically, in step S302, the computation unit 104 refers to each record of the preference information 2120 (FIG. 18) acquired prior to the drink determination process, and acquires the product name (for example, green tea (cold)) of each drink stored in the field "product name" and the number of purchases (for example, 167) indicated by the field "number of purchases". Then, in the work table 2400 illustrated in FIG. 22, the computation unit 104 stores the acquired number of purchases (for example, 167) in a field "past preference (number of purchases)" in a record in which the acquired product name (for example, green tea (cold)) of the drink is stored in the field "product name".

In the work table 2400 illustrated in FIG. 22, the computation unit 104 stores "0" in the field "past preference (number of purchases)" in a record in which a product name that is not acquired from the preference information 2120 (FIG. 18) is stored in the field "product name". Thus, it is possible to grasp that the user does not like the drink with the product name that is not acquired from the preference information 2120 (FIG. 18).

The computation unit 104 then determines that weather information satisfying all of three conditions 1) to 3) below that use the weather information 2200 (FIG. 19) acquired prior to the drink determination process among the history 2210 (FIG. 20) of the weather information acquired prior to the drink determination process is weather information (hereinafter, referred to as similar weather information) indicating a weather condition similar to the current weather condition. The computation unit 104 then acquires date and time information (hereinafter, referred to as similar weather date and time information) associated with the similar weather information from the history 2210 (FIG. 20) of the weather information.

Condition 1): The temperature indicated by the field "temperature (Celsius)" is within ±5° C. from the temperature indicated by the field "temperature (Celsius)" of the weather information 2200.

Condition 2): The humidity indicated by the field "humidity" is within ±20% from the humidity indicated by the field "humidity" of the weather information 2200.

Condition 3): The heat index indicated by the field "heat index (WBGT)" is within ±5° C. from the heat index indicated by the field "heat index (WBGT)" of the weather information 2200.

For example, four pieces of weather information included in the history 2210 of the weather information illustrated in FIG. 20 satisfy all of the above-described three conditions 1) to 3) that use the weather information 2200 illustrated in FIG. 19. Thus, the computation unit 104 determines that the four pieces of weather information are the similar weather information, and acquires four pieces of date and time information "20200414060000", "20200414070000", "20200414080000", and "20200414090000" associated with the respective four pieces of weather information included in the history 2210 of the weather information illustrated in FIG. 20, as the similar weather date and time information.

The conditions for determining the similar weather information are not limited to the three conditions 1) to 3) described above, and may be one or more conditions that use one or more values indicated by one or more fields among the fields "temperature (Celsius)", "humidity", "heat index (WBGT)", "solar radiation", or "weather type" included in the weather information 2200 (FIG. 19) acquired prior to the drink determination process. For example, the similar weather information and the similar weather date and time information may be acquired by using the condition 3) of the heat index (WBGT).

In step S302, the computation unit 104 then refers to the preference information 2120 (FIG. 18) acquired prior to the drink determination process, and counts the number of times each drink determined to be available for sale in step S301 has been purchased within a predetermined time from the date and time indicated by the similar weather date and time information, as the number of purchases of the drink under the similar weather. In this specific example, the predetermined time is one hour.

Specifically, in the preference information 2120 illustrated in FIG. 18, the computation unit 104 refers to the field "purchase date and time" of a record in which the product name (for example, green tea (cold)) of each drink determined to be available for sale in step S301 is written in the field "product name". The computation unit 104 then counts, as the number of purchases of each drink under the similar weather, the number of dates and times in the field "purchase date and time" of the drink included in a period between dates and times (for example, from 5:00:00 on Apr. 14, 2020 to 7:00:00 on Apr. 14, 2020) that are within the predetermined time from the date and time (for example, 6:00:00 on Apr. 14, 2020) indicated by each similar weather date and time information among the dates and times (for example, 20200414223442, 20200414095340, . . . ) stored in the field "purchase date and time" to which a reference is made.

In the work table 2400 illustrated in FIG. 22, the computation unit 104 then stores the counted number of purchases under the similar weather (for example, 103) in the field "past preference under similar weather condition (number of purchases)" of a record in which the product name (for example, green tea (cold)) of the drink is stored in the field "product name".

The computation unit 104 then assigns higher priorities to the drinks determined to be available for sale in step S301 in descending order of the number of purchases of the drink under the similar weather counted in step S302 by assuming that the drink for which the number of purchases under the similar weather is larger is more likely to match the preference of the user of the communication terminal 100 in relation to the weather at the current location of the communication terminal 100 (step S303).

For example, suppose that as a result of steps S301 and S302, the product name indicated by the type information included in each piece of product information illustrated in FIG. 16, the determination result obtained in step S301, the number of purchases of each drink determined to be available for sale in step S301, and the number of purchases of each drink under the similar weather counted in step S302 are stored in the fields "product name", "available for sale", "past preference (number of purchases)", and "past preference under similar weather condition (number of purchases)" of each record of the work table 2400, respectively, as illustrated in FIG. 22.

In this case, in step S303, the computation unit 104 assigns the highest priority "1" to the drink of which the product name is "green tea (cold)" and of which the number of purchases under the similar weather stored in the field "past preference under similar weather condition (number of purchases)" is the largest, i.e., "103". The computation unit 104 then stores the assigned priority "1" in the field "priority" of the record corresponding to the drink in the work table 2400.

The computation unit 104 then assigns the priority "2", which is the next highest priority of the priority "1", to the drink of which the product name is "carbonated drink (cold)" and of which the number of purchases under the similar weather stored in the field "past preference under similar weather condition (number of purchases)" is the next largest, i.e., "45". The computation unit 104 then stores the assigned priority "2" in the field "priority" of the record corresponding to the drink in the work table 2400.

Likewise, the priority "3" is assigned to the drink with the product name "sports drink", and the priority "4" is assigned to the drink with the product name "coffee 2". The computation unit 104 assigns the next priority (in this specific example, "5") to the drinks which are determined to be available for sale (for example, the drinks with the product names "coffee 1", "coffee 3", and "beer 1") and of which the number of purchases under the similar weather counted in step S302 is "0".

The computation unit 104 does not assign priorities to the drinks determined to be not available for sale in step S301 (for example, the drinks with the product names "beer 2" and "beer 3"). Thus, the computation unit 104 stores "-" indicating that the drink is not recommended to the user in the field "priority" of each record corresponding to the drink not available for sale in the work table 2400.

In the first embodiment, in step S207 (FIG. 7B), the computation unit 104 performs the drink determination process of step S301 to step S303. The computation unit 104 then generates a message that recommends a drink corresponding to a record in which "1" is stored in the field "priority" of the work table 2400 illustrated in FIG. 22, as the message 820 of the push notification screens 800B and 800C illustrated in FIGS. 9 and 11, respectively. The computation unit 104 also generates a product image representing the drink corresponding to the record in which "1" is stored in the field "priority" of the work table 2400 illustrated in FIG. 22, as the icon image 840 of the push notification screens 800B and 800C illustrated in FIGS. 9 and 11, respectively.

In step S210 (FIG. 7B), with reference to the work table 2400 illustrated in FIG. 22, which is obtained by performing steps S301 to S303 of step S207 (FIG. 7B), the computation unit 104 generates the individual purchase menu 900 for the user, in which the tile objects 901 (such as FIG. 12) representing the drinks corresponding to the respective records in which the priorities are stored in the field "priority" are arranged according to the stored priorities.

Second Embodiment

A second embodiment of the present disclosure will be described below. In the first embodiment, an example has been described in which the business entity X application in the communication terminal 100 generates the push notification screen 800 and the individual purchase menu 900 for the user of the communication terminal 100, and notifies the first server 200 of the purchase information of the drink by the user.

The second embodiment is different from the first embodiment in that the business entity management server 300 that provides the business entity X application generates the push notification screen 800 and the individual purchase menu 900 for the user of the communication terminal 100 and notifies the first server 200 of the purchase information of the drink by the user.

In the second embodiment, the history 2210 (FIG. 20) of the weather information of the current location of the communication terminal 100 owned by a user with permission is managed as personal information of the user with permission in the first server 200.

Figure 23A:
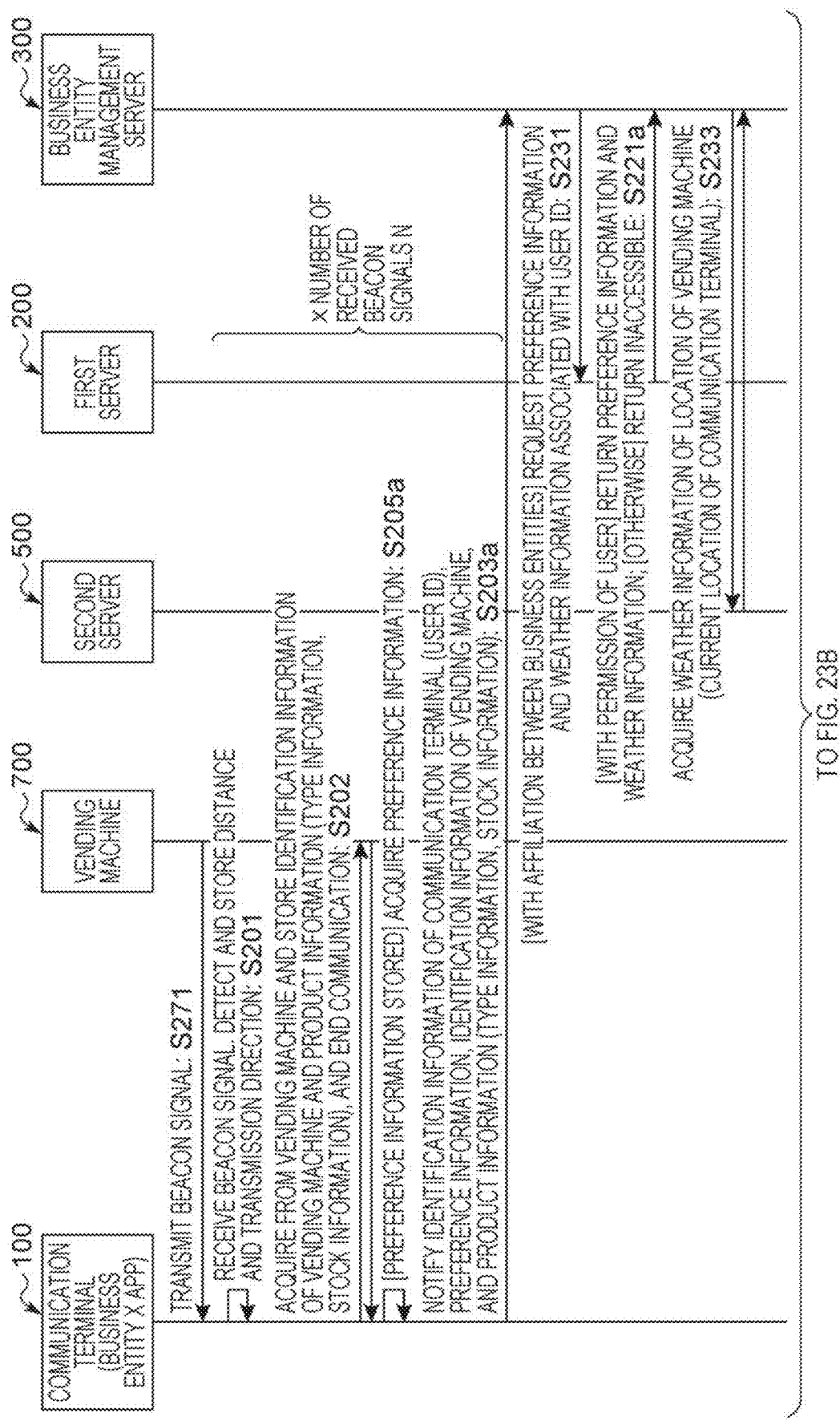
FIGS. 23A and 23B are a sequence diagram illustrating an example of an overview of a process performed in a vending machine management system in a second embodiment.
Figure 23B:
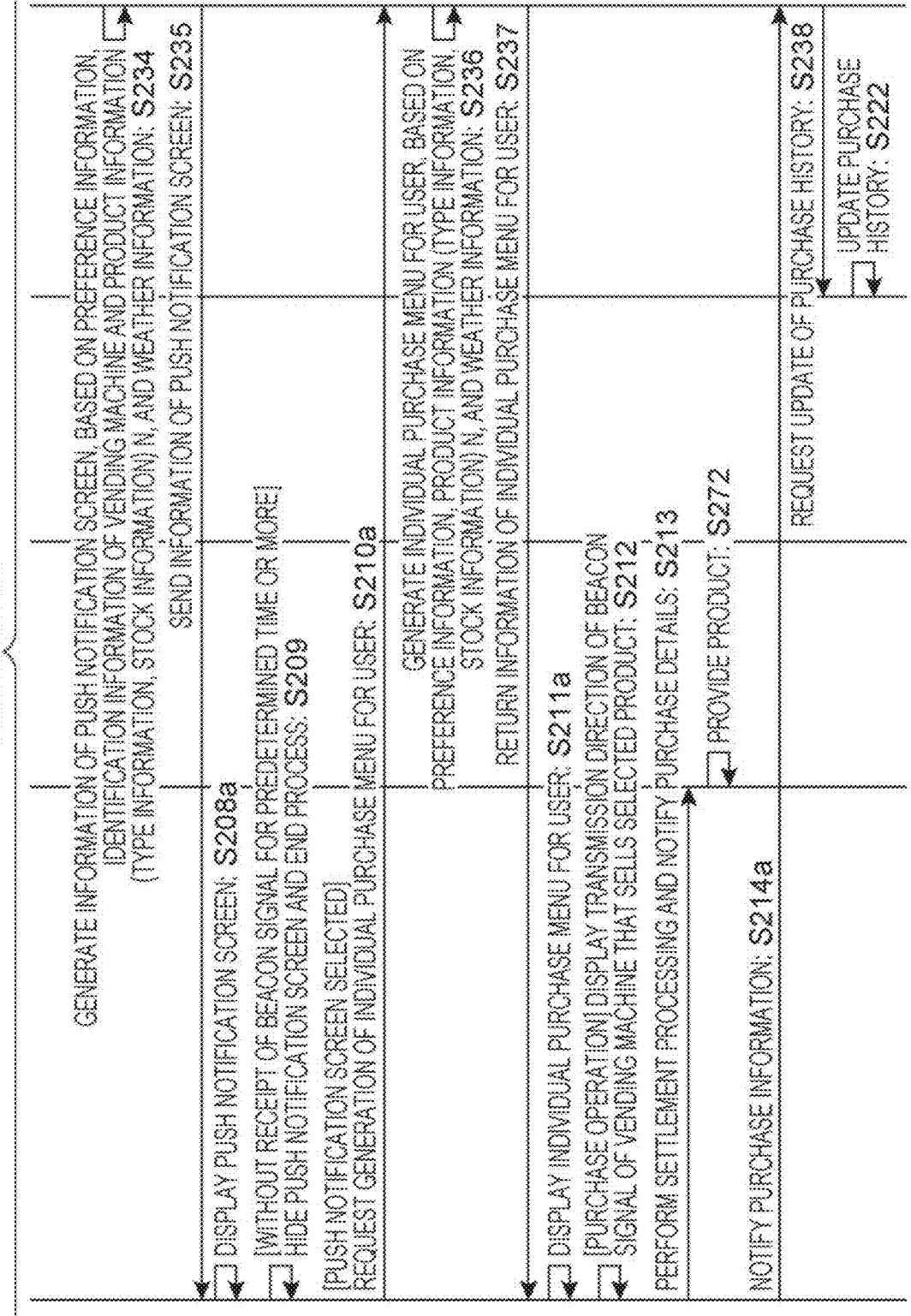

An overview of a process performed in the vending machine management system in the second embodiment will be described below. In the description below, a description of processing having the same details as those of the first embodiment is omitted as appropriate. FIGS. 23A and 23B are a sequence diagram illustrating an example of the overview of the process performed in the vending machine management system in the second embodiment.

As illustrated in FIG. 23A, the proximity communication unit 707 of each of the vending machines 700 included in the vending machine management system periodically transmits a beacon signal (step S271) as in the first embodiment.

The business entity X application is executed in the communication terminal 100, so that step S201 is performed as in the first embodiment. Thus, information indicating the distance to the vending machine 700 that is the transmission source of the beacon signal and the transmission direction of the beacon signal as well as the beacon ID are stored in the memory 102. Step S202 is performed, so that the identification information for identifying the vending machine 700 and the product information including the type information and the stock information are stored in the memory 102.

After step S202, if the preference information of the user of the communication terminal 100 is stored in the memory 102 ([preference information stored]), the computation unit 104 acquires the preference information of the user of the communication terminal 100 stored in the memory 102 (step S205a).

The computation unit 104 then controls the communication unit 101 to send, to the business entity management server 300, pieces of information stored in the memory 102, i.e., the identification information for identifying the communication terminal 100 including the user ID, the information that indicates the distance to each vending machine 700 which is the transmission source of the beacon signal and the transmission direction of the beacon signal and that is acquired in step S201, the preference information acquired in step S205a, and the identification information of the vending machine 700 which is the transmission source of the beacon signal and the product information that are acquired in step S202 (step S203a).

In response to this, in the business entity management server 300, based on the identification information of the vending machine 700 and the product information acquired via the communication unit 301, the computation unit 302 updates the product information of the vending machine 700 corresponding to the identification information and stored in the memory 303.

In this way, each time the proximity communication unit 107 of the communication terminal 100 receives a beacon signal transmitted from the proximity communication unit 707 of the vending machine 700, the processing from step S201 to step S203a is repeated in response to the receipt.

In response to detecting that a plurality of beacon signals transmitted from the plurality of vending machines 700 are received by the proximity communication unit 107, the computation unit 104 may repeatedly perform merely steps S201 and S202 at receipt of each of the beacon signals by the proximity communication unit 107 and may perform steps S205a and S203a just once. Thus, the computation unit 104 may collectively send the identification information for identifying the communication terminal 100 including the user ID, the preference information acquired in step S205a, and the pieces of information acquired in steps S201 and S202 to the business entity management server 300 in single step S203a.

Suppose that the business entity X that provides the business entity X application has an affiliation with the managing business entity of the first server 200 and that the business entity X is permitted to acquire personal information of each user stored in the first server 200. In this case ([with affiliation between business entities]), the computation unit 302 of the business entity management server 300 controls the communication unit 301 to send, to the first server 200, a signal requesting the preference information of the user identified by the user ID included in the identification information and the history 2210 (FIG. 20) of the weather information of the current location of the communication terminal 100 owned by the user, together with the identification information for identifying the communication terminal 100 acquired from the communication terminal 100 (step S231).

In the first server 200, in response to the communication unit 201 receiving the identification information for identifying the communication terminal 100 and the signal requesting the preference information of the user and the history 2210 (FIG. 20) of the weather information that are sent in step S231, the computation unit 202 performs step S221a (step S221a).

Specifically, in step S221a, if the computation unit 202 determines that the user indicated by the user ID included in the identification information received by the communication unit 201 is a user with permission ([with permission of user]), the computation unit 202 controls the communication unit 201 to return the preference information of the user with permission and the history 2210 (FIG. 20) of the weather information that are acquired from the memory 203 to the business entity management server 300. On the other hand, if the computation unit 202 determines that the user is not a user with permission ([otherwise]), the computation unit 202 controls the communication unit 201 to return information indicating that the personal information is inaccessible to the business entity management server 300. The returned information is received and output to the computation unit 302 by the communication unit 301 of the business entity management server 300.

If the computation unit 202 determines that the user is not a user with permission ([otherwise]), the computation unit 202 may control the communication unit 201 to send a message for checking whether to permit the business entity management server 300 to read the personal information, to the communication terminal 100 indicated by the identification information acquired from the business entity management server 300. Suppose that in response to this, the computation unit 202 acquires a reply indicating permission from the communication terminal 100 via the communication unit 201. In this case, the computation unit 202 may acquire, from the memory 203, the preference information included in the personal information of the user indicated by the user ID included in the received identification information and the history 2210 (FIG. 20) of the weather information in step S221a. The computation unit 202 then may cause the communication unit 201 to return the acquired information to the business entity management server 300.

Next, the computation unit 302 performs step S233 to acquire the weather information of the current location of the communication terminal 100 (or the installed location of the target vending machine) (step S233).

Specifically, in step S233, the computation unit 302 acquires, from the memory 303, location information that indicates a location where any one of the vending machines 700 is installed and that is associated with the identification information of the one of the vending machines 700 received from the communication terminal 100. Thus, the computation unit 302 acquires the location information indicating the installed location of the one of the vending machines 700 located near the communication terminal 100, as the location information indicating the current location of the communication terminal 100.

The computation unit 302 then controls the communication unit 301 to send, together with the acquired location information, a signal requesting weather information of a region including the location indicated by the location information to the second server 500. If the weather information of the region including the installed location of the one of the vending machines 700 is returned from the second server 500 in response to this, the computation unit 302 acquires the returned weather information as the weather information of the current location of the communication terminal 100 via the communication unit 301.

In step S233, the computation unit 302 may control the communication unit 301 to send, together with the location information of the current location of the communication terminal 100, a signal requesting weather information of a region including the location indicated by the location information to the second server 500. Thus, the computation unit 302 may directly acquire the weather information of the current location of the communication terminal 100 from the second server 500. In step S203a, the computation unit 104 may control the communication unit 101 to send the location information of the current location of the communication terminal 100 to the business entity management server 300 together with the identification information for identifying the communication terminal 100 including the user ID and so on. The computation unit 302 may acquire the sent location information of the current location of the communication terminal 100 via the communication unit 301.

As in the first embodiment, in response to receipt of the signal requesting the weather information of the current location of the communication terminal 100 via the communication unit 501, the computation unit 502 of the second server 500 reads, from the memory 503, weather information associated with date and time information indicating the most recent date and time, for example, from among pieces of weather information of the region including the location indicated by the location information included in the signal, and causes the communication unit 501 to return the read weather information. The acquisition method is not limited to this. The computation unit 502 may read one or more pieces of weather information associated with date and time information indicating a past predetermined period from the reception time of the signal, for example, from among the pieces of weather information, stored in the memory 503, of the region including the location indicated by the location information included in the signal received by the communication unit 501, and cause the communication unit 501 to return the read one or more pieces of weather information.

Next, the computation unit 302 generates the push notification screen 800, based on each combination of the identification information of the vending machines 700 and the type information and the stock information included in the product information, the preference information, and the weather information that are acquired in the preceding steps (step S234). Each combination of the identification information of the vending machines 700 and the type information and the stock information included in the product information is a combination sent and acquired via the communication unit 301 in step S203a. The preference information is the preference information sent and acquired via the communication unit 301 in step S203a and the preference information returned and acquired via the communication unit 301 in step S221a. The weather information is the history 2210 (FIG. 20) of the weather information returned and acquired via the communication unit 301 in step S221a and the weather information acquired in step S233.

In the second embodiment, in step S234, the computation unit 302 performs the drink determination process (steps S301 to S303 (FIG. 21)) by using each combination of the identification information of the vending machine 700 and the type information and the stock information included in the product information, the preference information, and the weather information. Thus, the computation unit 302 generates a message that recommends a drink corresponding to a record in which "1" is stored in the field "priority" of the work table 2400 (FIG. 22), as the message 820 of the push notification screens 800B and 800C illustrated in FIGS. 9 and 11, respectively. The computation unit 302 also generates a product image representing the drink corresponding to the record in which "1" is stored in the field "priority" of the work table 2400 (FIG. 22), as the icon image 840 of the push notification screens 800B and 800C illustrated in FIGS. 9 and 11, respectively.

Next, the computation unit 302 controls the communication unit 301 to send information representing the push notification screen 800 generated in step S234 to the communication terminal 100 (step S235).

On the other hand, in the communication terminal 100, in response to acquiring, via the communication unit 101, the information representing the push notification screen 800 sent in step S235, the computation unit 104 displays the push notification screen 800 represented by the acquired information on the display 105 of the communication terminal 100 (step S208a). The computation unit 104 may display the push notification screen 800 on the display 105 and may drive a vibration generator (not illustrated) built in the communication terminal 100 to allow the user of the communication terminal 100 to easily notice the push notification. The computation unit 104 may display the push notification screen 800 on the display 105 and reproduce a sound reporting receipt of the push notification from a speaker (not illustrated) built in the communication terminal 100 to allow the user of the communication terminal 100 to easily notice the push notification.

If receipt of a beacon signal by the proximity communication unit 107 is not detected for a predetermined time or more since the push notification screen 800 is displayed in step S208a, ([without receipt of beacon signal for predetermined time or more]), the computation unit 104 performs processing of hiding the displayed push notification screen 800 to hide the push notification screen 800. The computation unit 104 then ends the process (step S209). After ending the process, the computation unit 104 returns to a state of waiting for receipt of a beacon signal by the proximity communication unit 107.

On the other hand, if the user performs an operation (for example, a touch operation) of selecting the push notification screen 800 by using the operation unit 106 ([push notification screen selected]), the computation unit 104 controls the communication unit 101 to send a signal requesting generation of the individual purchase menu 900 for the user of the communication terminal 100 to the business entity management server 300 (step S210a). The signal requesting generation of the individual purchase menu 900 for the user is received and output to the computation unit 302 by the communication unit 301 of the business entity management server 300.

In response to acquiring, via the communication unit 301, the signal requesting generation of the individual purchase menu 900 for the user of the communication terminal 100 sent in step S210a, the computation unit 302 generates the individual purchase menu 900 for the user of the communication terminal 100, based on the type information and the stock information included in the product information, the preference information, and the weather information that are used in step S234 (step S236).

In the second embodiment, in step S236, the computation unit 302 refers to the work table 2400 (FIG. 22) obtained by performing the drink determination process (steps S301 to S303 (FIG. 21)) in step S234 by using the type information and stock information included in the product information described above, the preference information, and the weather information. The computation unit 302 then generates the individual purchase menu 900 in which the tile objects 901 (such as FIG. 12) representing the drinks corresponding to the respective records in which the priorities are stored in the field "priority" are arranged according to the stored priorities.

Next, the computation unit 302 controls the communication unit 301 to send information representing the individual purchase menu 900 for the user of the communication terminal 100, generated in step S236, to the communication terminal 100 (step S237).

In the communication terminal 100, in response to acquiring, via the communication unit 101, the information representing the individual purchase menu 900 for the user of the communication terminal 100 sent in step S237, the computation unit 104 displays the individual purchase menu 900 for the user of the communication terminal 100 represented by the acquired information on the display 105 of the communication terminal 100 (step S211a).

After step S211a, as in the first embodiment, steps S212, S213, and S272 are performed, so that the drink purchased by the user is provided to the user.

After step S213, the computation unit 104 of the communication terminal 100 controls the communication unit 101 to send the purchase information of the drink to the business entity management server 300 (step S214a). Thus, in the business entity management server 300, the purchase information of the drink sent in step S214a is received and output to the computation unit 302 by the communication unit 301. The purchase information of the drink includes the user ID of the user of the communication terminal 100, the date and time information indicating the purchase date and time of the drink by the user, the identification information for identifying the vending machine 700 from which the user purchased the drink, and the type information indicating the type of the drink purchased by the user.

In response to acquiring the purchase information of the drink from the communication unit 301, the computation unit 302 of the business entity management server 300 causes the communication unit 301 to send a signal requesting update of the purchase history information of the user of the communication terminal 100 to the first server 200 together with the acquired purchase information of the drink (step S238). In response to this, step S222 is performed in the first server 200 as in the first embodiment, and if the user of the communication terminal 100 is a user with permission, the purchase history information of the user with permission stored in the memory 203 is updated.

Third Embodiment

A third embodiment of the present disclosure will be described below. In the first embodiment, an example has been described in which the business entity X application in the communication terminal 100 generates the push notification screen 800 and the individual purchase menu 900 for the user, based on each combination of the identification information of each of the vending machines 700 that are the transmission sources of respective beacon signals received by the proximity communication unit 107 and the type information and the stock information included in the product information, the preference information of the user of the communication terminal 100, and the weather information of the current location of the communication terminal 100.

The third embodiment is different from the first embodiment in that the business entity X application in the communication terminal 100 generates the push notification screen 800 and the individual purchase menu 900 for the user, based on each combination of the identification information of each of the vending machines 700 that are the transmission sources of respective beacon signals received by the proximity communication unit 107 and the type information and the stock information included in the product information, the preference information of the user of the communication terminal 100, and biological information of the user.

Thus, in the third embodiment, each combination of the identification information of each of the vending machines 700 that are the transmission sources of the respective beacon signals received by the proximity communication unit 107 and the type information and the stock information included in the product information, the preference information of the user of the communication terminal 100, and the biological information of the user, which are acquired prior to the drink determination process, are used in the drink determination process performed when the push notification screen 800 is generated. In the drink determination process, at least one drink that matches a preference of the user indicated by the preference information is determined, in relation to the current physical condition of the user of the communication terminal 100 indicated by the biological information, from among a plurality of drinks stored in the vending machines 700 that are the transmission sources of the respective beacon signals received by the communication terminal 100.

Figure 24A:
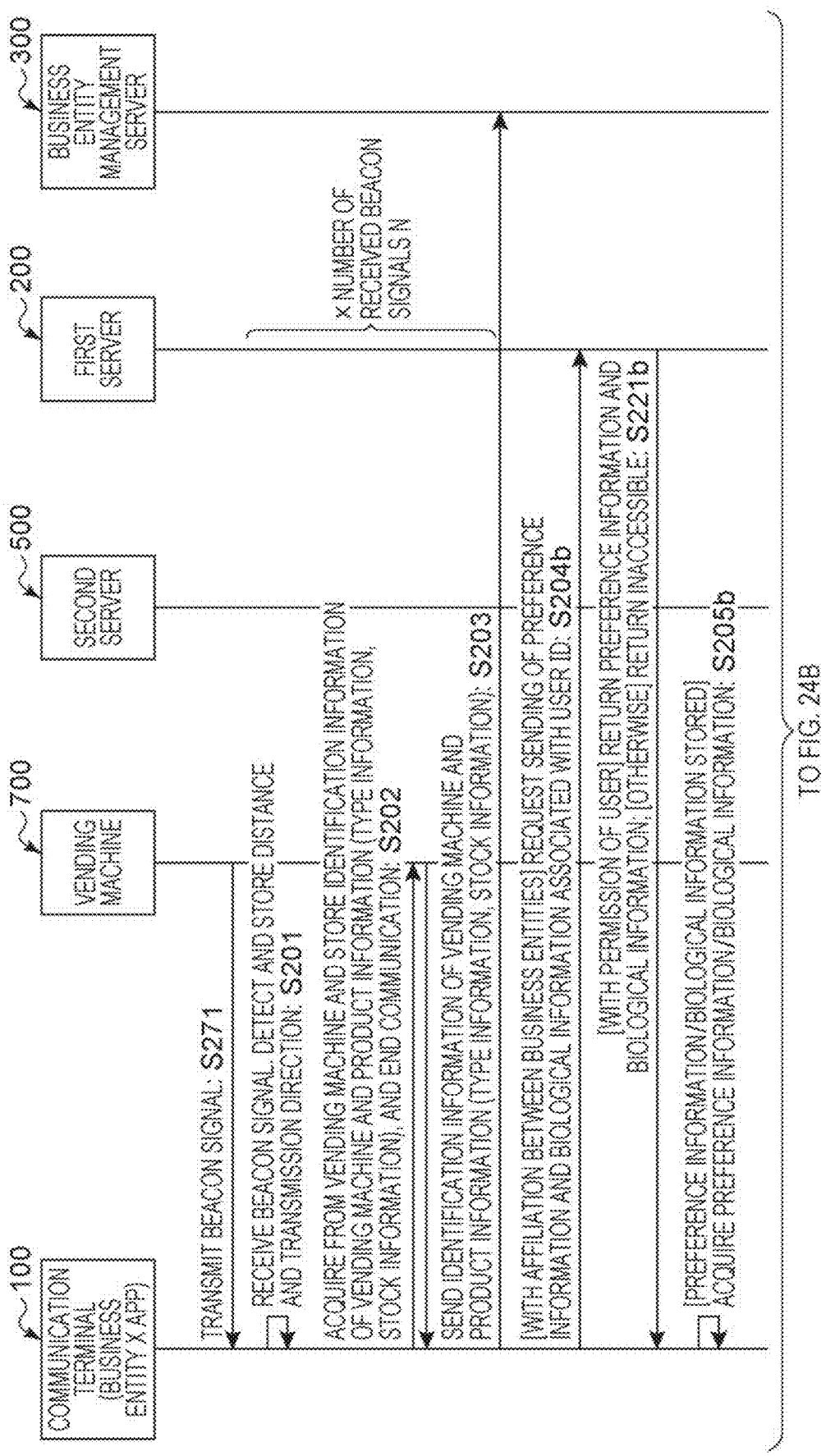
FIGS. 24A and 24B are a sequence diagram illustrating an example of an overview of a process performed in a vending machine management system in a third embodiment.
Figure 24B:
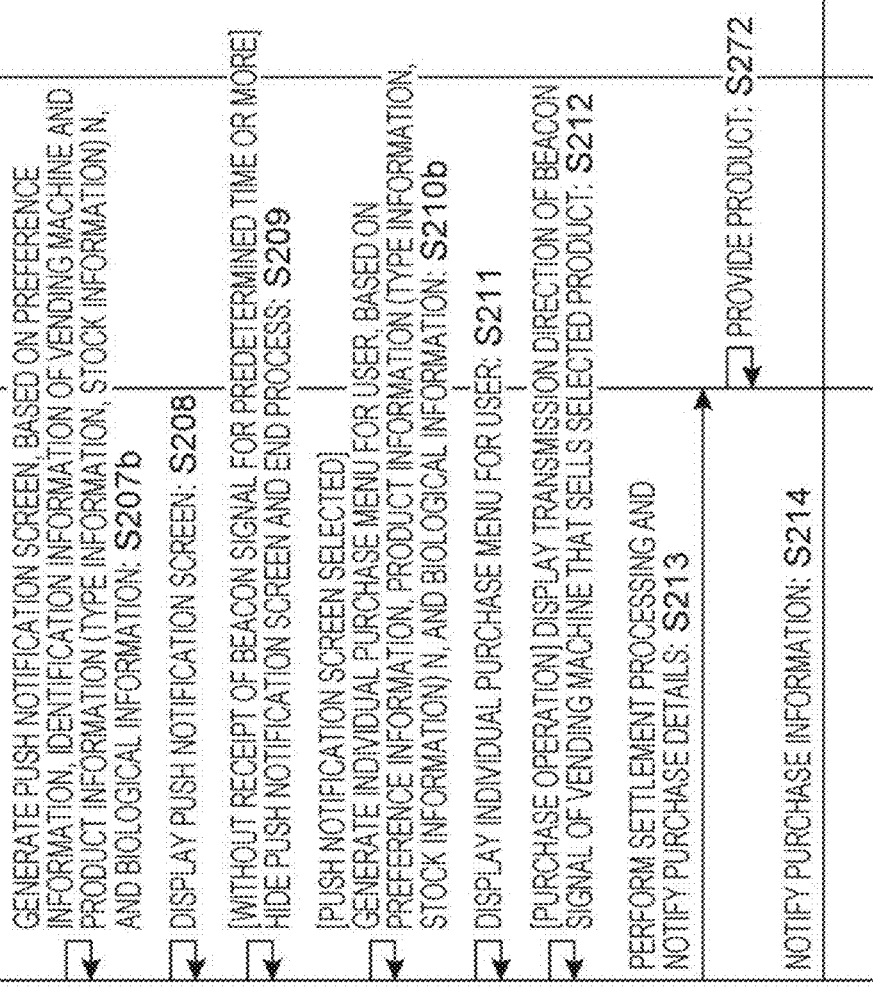

An overview of a process performed in the vending machine management system in the third embodiment will be described below. In the description below, a description of processing having the same details as those of the first embodiment is omitted as appropriate. FIGS. 24A and 24B are a sequence diagram illustrating an example of the overview of the process performed in the vending machine management system in the third embodiment.

As illustrated in FIG. 24A, the proximity communication unit 707 of each of the vending machines 700 included in the vending machine management system periodically transmits a beacon signal (step S271) as in the first embodiment. The business entity X application is executed in the communication terminal 100, so that each time the proximity communication unit 107 of the communication terminal 100 receives a beacon signal transmitted from the proximity communication unit 707 of the vending machine 700, the processing from step S201 to step S203 is repeated in response to the receipt as in the first embodiment.

In response to detecting that a plurality of beacon signals transmitted from the plurality of vending machines 700 are received by the proximity communication unit 107, the computation unit 104 may perform merely steps S201 and S202 at receipt of each of the beacon signals by the proximity communication unit 107 and may perform step S203 just once, as in the first embodiment.

Suppose that the business entity X that provides the business entity X application has an affiliation with the managing business entity of the first server 200 and that the business entity X is permitted to acquire, via the business entity X application, personal information of each user stored in the first server 200. In this case ([with affiliation between business entities]), the computation unit 104 of the communication terminal 100 controls the communication unit 101 to send, to the first server 200, a signal requesting preference information and biological information of the user identified by the user ID included in the identification information, together with identification information for identifying the communication terminal 100 stored in the memory 102 (step S204b).

In the first server 200, in response to the communication unit 201 receiving the identification information for identifying the communication terminal 100 and the signal requesting the preference information and the biological information of the user, which are sent in step S204b, the computation unit 202 performs processing of step S221b (step S221b).

Specifically, in step S221b, if the computation unit 202 determines that the user indicated by the user ID included in the identification information received by the communication unit 201 is a user with permission ([with permission of user]) as in step S221 (FIG. 7A) according to the first embodiment, the computation unit 202 acquires the preference information and the biological information included in the personal information of the user with permission from the memory 203 and causes the communication unit 201 to return the acquired preference information and biological information. On the other hand, if the computation unit 202 determines that the user is not a user with permission ([otherwise]), the computation unit 202 causes the communication unit 201 to return information indicating that the personal information is inaccessible. The returned information is received and output to the computation unit 104 by the communication unit 101 of the communication terminal 100.

If the computation unit 202 determines that the user is not a user with permission ([otherwise]), the computation unit 202 may cause the communication unit 201 to return a message for checking whether to permit reading of the personal information stored in the memory 203. Suppose that in response to this, the computation unit 202 acquires a reply indicating permission from the communication terminal 100 via the communication unit 201. In this case, the computation unit 202 may acquire, from the memory 203, the preference information and the biological information included in the personal information of the user indicated by the user ID included in the received identification information, and cause the communication unit 201 to return the acquired information in step S221b.

Next, if the preference information and/or the biological information of the user of the communication terminal 100 is stored in the memory 102 of the communication terminal 100 ([preference/biological information stored]), the computation unit 104 acquires the preference information and/or the biological information of the user within a range not overlapping the preference information and the biological information returned in step S221b (step S205b). There is a possibility that the latest biological information is sent from the biological sensor 600 to the communication terminal 100 and is accumulated and managed by the sensor application but is not uploaded to the first server 200 yet. Since the drink determination process (described below) is performed also using the latest biological information, the latest biological information stored in the memory 102 of the communication terminal 100 in this manner is also acquired in step S205b.

After step S205b, the computation unit 104 generates the push notification screen 800, based on each combination of the identification information of the vending machines 700 and the type information and the stock information included in the product information, the preference information, and the biological information that are acquired in the preceding steps (step S207b). Each combination of the identification information of the vending machines 700 and the type information and the stock information included in the product information is the combination acquired in step S202 each time a beacon signal is received. The preference information is the preference information returned and acquired via the communication unit 101 in step S221b and the preference information acquired in step S205b. The biological information is the biological information returned and acquired via the communication unit 101 in step S221b and the biological information acquired in step S205b.

In the third embodiment, in step S207b, the computation unit 104 performs the drink determination process (described below) by using each combination of the identification information of the vending machine 700 and the type information and the stock information included in the product information, the preference information, and the biological information.

The computation unit 104 then displays the push notification screen 800 generated in step S207b on the display 105 of the communication terminal 100 (step S208). The computation unit 104 may display the push notification screen 800 on the display 105 and may drive a vibration generator (not illustrated) built in the communication terminal 100 to allow the user of the communication terminal 100 to easily notice the push notification. The computation unit 104 may display the push notification screen 800 on the display 105 and reproduce a sound reporting receipt of the push notification from a speaker (not illustrated) built in the communication terminal 100 to allow the user of the communication terminal 100 to easily notice the push notification.

If receipt of a beacon signal by the proximity communication unit 107 is not detected for a predetermined time or more since the push notification screen is displayed in step S208 ([without receipt of beacon signal for predetermined time or more]), the computation unit 104 performs processing of hiding the displayed push notification screen to hide the push notification screen. The computation unit 104 then ends the process (step S209). After ending the process, the computation unit 104 returns to a state of waiting for receipt of a beacon signal by the proximity communication unit 107.

On the other hand, if the user performs an operation (for example, a touch operation) of selecting the push notification screen 800 by using the operation unit 106 ([push notification screen selected]), the computation unit 104 generates the individual purchase menu 900 for the user of the communication terminal 100, based on the type information and the stock information included in the product information, the preference information, and the biological information that are used in step S207b (step S210b).

In the third embodiment, in step S210b, the computation unit 104 generates the individual purchase menu 900 with reference to a work table (described later) obtained by performing the drink determination process (described later) in step S207b by using the type information and the stock information included in the product information, the preference information, and the biological information.

The computation unit 104 displays the individual purchase menu 900 for the user of the communication terminal 100 generated in step S210b on the display 105 of the communication terminal 100 (step S211). After step S211, steps S212 to S214, S272, and S222 are performed as in the first embodiment. Thus, the drink purchased by the user is provided to the user. If the user of the communication terminal 100 is a user with permission, the first server 200 updates the purchase history information of the user with permission stored in the memory 203.

Data Configurations

A data configuration of the biological information will be described next. FIG. 25 is a diagram illustrating an example of a biological information table 2300. As described above, the memory 203 of the first server 200 has the biological information table 2300 for storing the biological information collected from the biological sensor 600 by the sensor application in the communication terminal 100 in time series in association with the user ID of the user of the communication terminal 100 and the measurement date and time information indicating the measurement date and time of the biological information. There is a possibility that the most recent biological information in the biological information table 2300 illustrated in FIG. 25 is stored only in the memory 102 of the communication terminal 100. Thus, the latest biological information may be acquired from the communication terminal 100 instead of the first server 200.

In response to a request for the biological information of the user of the communication terminal 100 via the communication unit 201, the computation unit 202 of the first server 200 acquires a record including the user ID of the user from the biological information table 2300 illustrated in FIG. 25, and returns the acquired record as the biological information of the user.

A field "user ID" of the biological information table 2300 is a field indicating the user ID of the user of the communication terminal 100. A field "measurement date and time" is a field indicating the measurement date and time information. A "biological information" is a field indicating the biological information acquired from the communication terminal 100. The field "biological information" includes subfields "systolic blood pressure", "diastolic blood pressure", "heart rate", "body water percentage", and "body temperature" indicating the systolic blood pressure, the diastolic blood pressure, the heart rate, the body water percentage, and the body temperature of the user, respectively. The field "biological information" is not limited to this, and may include at least one or more of the fields "systolic blood pressure", "diastolic blood pressure", "heart rate", "body water percentage", or "body temperature".

For example, the biological information table 2300 illustrated in FIG. 25 presents an example in which pieces of biological information of the user having the user ID "USR01" measured every hour from 6:00:00 on Apr. 14, 2020 indicated by the measurement date and time information "20200414060000" to 9:00:00 on Apr. 14, 2020 indicated by the date and time information "20200414090000" are stored in time series.

For example, the biological information table 2300 illustrated in FIG. 25 presents an example in which the biological information of the user having the user ID "USR01", which indicates that the systolic blood pressure, the diastolic blood pressure, the heart rate, the body water percentage, and the body temperature measured at 6:00:00 on Apr. 14, 2020 are "124 mmHg", "79 mmHg", "76 beats/min", "57.0%", and "36.2° C." are stored in the fields "systolic blood pressure", "diastolic blood pressure", "heart rate", "body water percentage", and "body temperature" of a record in which the field "user ID" is "USR01" and the field "measurement date and time" is "20200414060000" which indicates 6:00:00 on Apr. 14, 2020, respectively.

Process of Determining at Least One Drink that Matches Preference of User

A drink determination process of determining at least one drink that matches a preference of the user of the communication terminal 100, is recommended in the push notification screen 800, and is displayed in the individual purchase menu 900 for the user in the third embodiment will be described next by using a specific example. The drink determination process is performed when the push notification screen 800 is generated, and a result of the drink determination process is used when the individual purchase menu 900 for the user is generated.

In the present embodiment, in the drink determination process, at least one drink that matches the preference, indicated by the preference information, of the user of the communication terminal 100 is determined in relation to the current physical condition, indicated by the biological information, of the user of the communication terminal 100 from among a plurality of drinks stored in the vending machines 700 that are transmission sources of respective beacon signals received by the proximity communication unit 107, by using each combination of the identification information of each of the vending machines 700 that are the transmission sources and the type information and the stock information included in the product information, the preference information, and the biological information that are acquired prior to the drink determination process.

Figure 26:
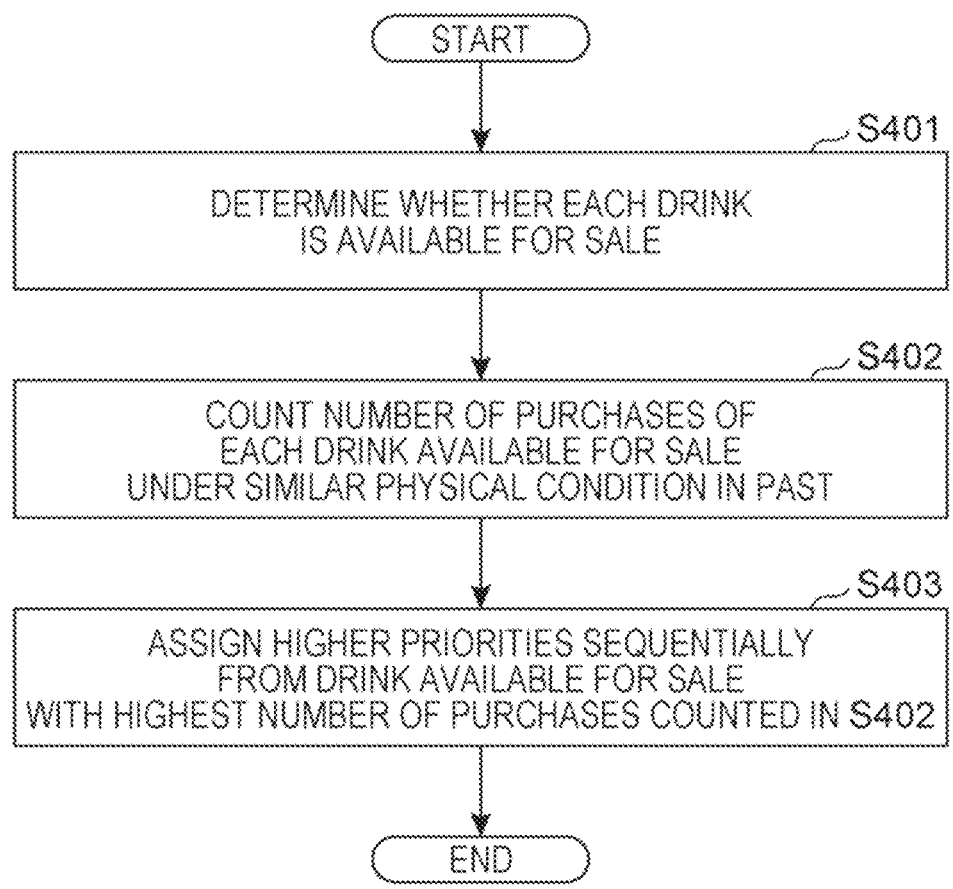
FIG. 26 is a flowchart illustrating an example of a drink determination process.

FIG. 26 is a flowchart illustrating an example of the drink determination process. FIG. 27 is a diagram illustrating an example of a work table 2500 used in the drink determination process illustrated in FIG. 26.

Suppose that in this specific example, the product information included in the information 2100 illustrated in FIG. 16, the preference information 2120 illustrated in FIG. 18, and each record of the biological information table 2300 illustrated in FIG. 25 are acquired prior to the drink determination process.

As illustrated in FIG. 26, the computation unit 104 first refers to each piece of product information (FIG. 16) acquired prior to the drink determination process, and determines whether a drink corresponding to the piece of product information is available for sale based on the type information and the stock information included in the piece of product information. The computation unit 104 then stores a result of the determination in the work table 2500 illustrated in FIG. 27 (step S401). Thus, drinks determined to be not available for sale can be excluded from drinks recommended to the user.

Specifically, in step S401, the computation unit 104 determines that a drink corresponding to a piece of product information in which the quantity information included in the stock information indicates a quantity "0" is a drink that is sold out and thus is not available for sale. The computation unit 104 also determines that a drink corresponding to a piece of product information in which the temperature indicated by the temperature information included in the stock information is out of the predetermined temperature range in which the drink is providable to users is a drink that has an unsuitable temperature and thus is not available for sale. In this specific example, the predetermined temperature range for cold drinks is higher than or equal to 4° C. and lower than or equal to 7° C. In this specific example (FIG. 16), hot drinks are not handled. However, the predetermined temperature range for hot drinks is higher than or equal to 53° C. and lower than or equal to 57° C.

In the example of FIG. 16, in the record with the beacon ID "ID2", the drink corresponding to the piece of product information in which the quantity indicated by the quantity information included in the stock information is "0" and the product name indicated by the type information is "beer 2" is determined to be a drink not available for sale. In the record with the beacon ID "ID2", the drink corresponding to the piece of product information in which the temperature indicated by the temperature information included in the stock information is "13" and the product name indicated by the type information is "beer 3" is determined to be a drink not available for sale. The drinks corresponding to the seven pieces of product information excluding these two pieces of product information are determined to be drinks available for sale.

As illustrated in FIG. 27, the computation unit 104 refers to each piece of product information (FIG. 16) acquired prior to the drink determination process, and stores the product name (for example, coffee 1) indicated by the type information included in the product information in a field "product name" of the work table 2500 illustrated in FIG. 27. The computation unit 104 then stores a result of the determination obtained in step S401 in a field "available for sale" of the work table 2500.

"OK" in the field "available for sale" in FIG. 27 indicates that the drink with the product name (for example, coffee 2) indicated by the field "product name" corresponding to the field "available for sale" is determined to be a drink available for sale. "NG (sold out)" in the field "available for sale" in FIG. 27 indicates that the drink with the product name (for example, beer 2) indicated by the field "product name"

corresponding to the field "available for sale" is determined to be sold out and thus is a drink not available for sale. "NG (unsuitable temperature)" in the field "available for sale" in FIG. 27 indicates that the drink with the product name (for example, beer 3) indicated by the field "product name" corresponding to the field "available for sale" is determined to have an unsuitable temperature and thus is a drink not available for sale.

Next, based on the product information (FIG. 16) on the drinks determined to be available for sale in step S401 and the preference information 2120 (FIG. 18) and the biological information (FIG. 25) that are acquired prior to the drink determination process, the computation unit 104 counts the number of times (past preference under similar physical condition (number of purchases) in FIG. 27) the user of the communication terminal 100 has purchased each of the drinks determined to be available for sale in step S401 in the past under a physical condition similar to the current physical condition of the user among the number of purchases of the drink (step S402).

Specifically, in step S402, the computation unit 104 refers to each record of the preference information 2120 (FIG. 18) acquired prior to the drink determination process, and acquires the product name (for example, green tea (cold)) of each drink stored in the field "product name" and the number of purchases (for example, 167) indicated by the field "number of purchases". Then, in the work table 2500 illustrated in FIG. 27, the computation unit 104 stores the acquired number of purchases (for example, 167) in a field "past preference (number of purchases)" in a record in which the acquired product name (for example, green tea (cold)) of the drink is stored in the field "product name".

In the work table 2500 illustrated in FIG. 27, the computation unit 104 stores "0" in the field "past preference (number of purchases)" in a record in which a product name that is not acquired from the preference information 2120 (FIG. 18) is stored in the field "product name". Thus, it is possible to grasp that the user does not like the drink with the product name that is not acquired from the preference information 2120 (FIG. 18).

The computation unit 104 sets the biological information included in the record corresponding to the most recent measurement date and time among the pieces of biological information (FIG. 25) acquired prior to the drink determination process, as the biological information (hereinafter, referred to as current biological information) indicating the current physical condition of the user of the communication terminal 100. The computation unit 104 then determines that biological information satisfying both of two conditions 1) and 2) below that use the current biological information among the pieces of biological information measured in the past before the current biological information is biological information (hereinafter, referred to as similar biological information) indicating a physical condition similar to the current physical condition of the user of the communication terminal 100. The computation unit 104 then acquires measurement date and time information (hereinafter, referred to as similar biological condition date and time information) associated with the similar biological information from the biological information (FIG. 25).

Condition 1): The body temperature indicated by the field "body temperature" is within ±1° C. from the body temperature indicated by the field "body temperature" of the current biological information.

Condition 2): The body water percentage indicated by the field "body water percentage" is within ±1% from the body water percentage indicated by the field "body water percentage" of the current biological information.

For example, among the four pieces of biological information included in the biological information table 2300 illustrated in FIG. 25, the computation unit 104 sets, as the current biological information, biological information included in a record in which the most recent date and time "20200414090000" is stored in the field "measurement date and time". In this case, three pieces of biological information, other than the current biological information, included in the biological information table 2300 illustrated in FIG. 25 satisfy both of the two conditions 1) and 2) above that use the current biological information. Thus, the computation unit 104 determines that the three pieces of biological information are the similar biological information, and acquires, as the similar biological condition date and time information, three pieces of date and time information "20200414060000", "20200414070000", and "20200414080000" associated with the respective three pieces of similar biological information included in the biological information table 2300 illustrated in FIG. 25.

The conditions for determining the similar biological information are not limited to the two conditions 1) and 2) described above, and may be one or more conditions that use one or more values indicated by one or more fields among the fields "systolic blood pressure", "diastolic blood pressure", "heart rate", "body water percentage", and "body temperature" included in the current biological information. For example, the similar biological information and the similar biological condition date and time information may be acquired using only the condition 1) related to the body temperature.

Next, in step S402, the computation unit 104 refers to the preference information 2120 (FIG. 18) acquired prior to the drink determination process, and counts the number of times each drink determined to be available for sale in step S401 has been purchased within a predetermined time from the date and time indicated by the similar biological condition date and time information, as the number of purchases of the drink under the similar physical condition. In this specific example, the predetermined time is one hour.

Specifically, in the preference information 2120 illustrated in FIG. 18, the computation unit 104 refers to the field "purchase date and time" of a record in which the product name (for example, green tea (cold)) of each drink determined to be available for sale in step S401 is written in the field "product name". The computation unit 104 then counts, as the number of purchases of each drink under the similar physical condition, the number of dates and times in the field "purchase date and time" of the drink in a period (for example, from 5:00:00 on Apr. 14, 2020 to 7:00:00 on Apr. 14, 2020) that is within the predetermined time from the date and time (for example, 6:00:00 on Apr. 14, 2020) indicated by each piece of similar biological condition date and time information among the dates and times (for example, 20200414223442, 20200414095340, . . . ) stored in the field "purchase date and time" to which a reference is made.

In the work table 2500 illustrated in FIG. 27, the computation unit 104 then stores the counted number of purchases under the similar physical condition (for example, 89) in the field "past preference under similar physical condition (number of purchases)" of a record in which the product name (for example, green tea (cold)) of the drink is stored in the field "product name".

Next, the computation unit 104 assigns higher priorities to the drinks determined to be available for sale in step S401 in descending order of the number of purchases of the drink under the similar physical condition counted in step S402 by assuming that the drink for which the number of purchases under the similar physical condition is larger is more likely to match the preference of the user of the communication terminal 100 in relation to the current physical condition of the user of the communication terminal 100 (step S403).

For example, suppose that as a result of steps S401 and S402, the product name indicated by the type information included in each piece of product information illustrated in FIG. 16, the determination result obtained in step S401, the number of purchases of each drink determined to be available for sale in step S401, and the number of purchases of each drink under the similar physical condition counted in step S402 are stored in the fields "product name", "available for sale", "past preference (number of purchases)", and "past preference under similar physical condition (number of purchases)" of each record of the work table 2500, respectively, as illustrated in FIG. 27.

In this case, in step S403, the computation unit 104 assigns the highest priority "1" to the drink of which the product name is "green tea (cold)" and of which the number of purchases under the similar physical condition stored in the field "past preference under similar physical condition (number of purchases)" is "89", i.e., the largest. The computation unit 104 then stores the assigned priority "1" in the field "priority" of the record corresponding to the drink in the work table 2500.

Next, the computation unit 104 assigns the priority "2", which is the next highest priority of the priority "1", to the drink of which the product name is "sports drink (cold)" and of which the number of purchases under the similar physical condition stored in the field "past preference under similar physical condition (number of purchases)" is "14", i.e., the next largest. The computation unit 104 then stores the assigned priority "2" in the field "priority" of the record corresponding to the drink in the work table 2500.

Likewise, the priority "3" is assigned to the drink with the product name "carbonated drink (cold)", and the priority "4" is assigned to the drink with the product name "coffee 2". The computation unit 104 assigns the next priority (in this specific example, "5") to the drinks which are determined to be available for sale (for example, the drinks with the product names "coffee 1", "coffee 3", and "beer 1") and of which the number of purchases under the similar physical condition counted in step S402 is "0".

The computation unit 104 does not assign priorities to the drinks determined to be not available for sale in step S401 (for example, the drinks with the product names "beer 2" and "beer 3"). Thus, the computation unit 104 stores "-" indicating that the drink is not recommended to the user in the field "priority" of each record corresponding to the drink not available for sale in the work table 2500.

In the third embodiment, in step S207b (FIG. 24B), the computation unit 104 performs the drink determination process of steps S401 to S403. The computation unit 104 then generates a message that recommends a drink corresponding to a record in which "1" is stored in the field "priority" of the work table 2500 illustrated in FIG. 27, as the message 820 included in the push notification screens 800B and 800C illustrated in FIGS. 9 and 11, respectively. The computation unit 104 also generates a product image representing the drink corresponding to the record in which "1" is stored in the field "priority" of the work table 2500 illustrated in FIG. 27, as the icon image 840 of the push notification screens 800B and 800C illustrated in FIGS. 9 and 11, respectively.

In step S210b (FIG. 24B), with reference to the work table 2500 illustrated in FIG. 27, which is obtained by performing steps S401 to S403 of step S207b (FIG. 24B), the computation unit 104 generates the individual purchase menu 900 for the user, in which the tile objects 901 (such as FIG. 12) representing the drinks corresponding to the respective records in which the priorities are stored in the field "priority" are arranged according to the stored priorities.

Fourth Embodiment

A fourth embodiment of the present disclosure will be described below. In the third embodiment, an example has been described in which the business entity X application in the communication terminal 100 acquires the biological information of the user of the communication terminal 100 from the first server 200 and the communication terminal 100. The fourth embodiment is different from the third embodiment in that the business entity X application in the communication terminal 100 acquires the biological information of the user of the communication terminal 100 from the sensor application in the communication terminal 100.

In the fourth embodiment, the memory 102 of the communication terminal 100 has a table having the same configuration as the biological information table 2300 illustrated in FIG. 25. For convenience of explanation, the table is hereinafter referred to as the biological information table 2300. The sensor application collects the biological information of the user of the communication terminal 100 periodically measured by the biological sensor 600, and stores the collected biological information in the biological information table 2300 (FIG. 25) in time series in association with the user ID of the user and the measurement date and time information indicating the measurement date and time of the biological information.

Figure 28B:
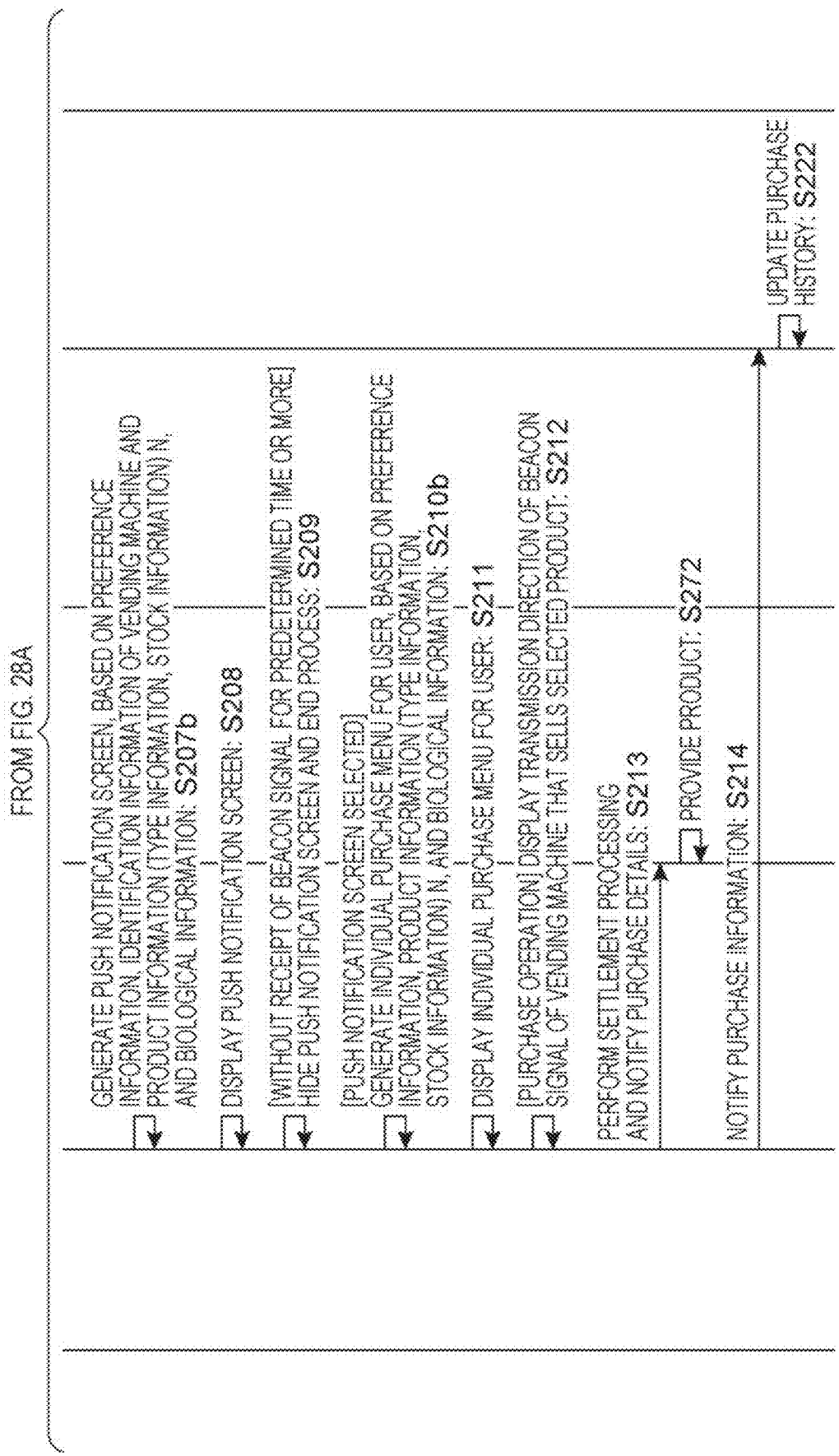

An overview of a process performed in the vending machine management system in the fourth embodiment will be described below. In the description below, a description of processing having the same details as those of the third embodiment is omitted as appropriate. FIGS. 28A and 28B are a sequence diagram illustrating an example of the overview of the process performed in the vending machine management system in the fourth embodiment.

As illustrated in FIG. 28A, in the fourth embodiment, step S204 (FIG. 7A) is performed as in the first embodiment, instead of step S204b (FIG. 24A) in the third embodiment. In response to this, step S221 (FIG. 7A) is performed in the first server 200 as in the first embodiment. As a result, if it is determined that the user of the communication terminal 100 is a user with permission ([with permission of user]), the preference information of the user with permission is returned. If it is determined that the user is not a user with permission ([otherwise]), information indicating that the personal information is inaccessible is returned. The returned information is received and output to the computation unit 104 by the communication unit 101 of the communication terminal 100.

The computation unit 104 then executes the sensor application to acquire records including the user ID of the user of the communication terminal 100 in the biological information table 2300 (FIG. 25) in the memory 102, as the biological information of the user (step S206b). Thereafter, the processing of step S205 and subsequent steps is performed as in the third embodiment.

In the fourth embodiment, in step S207b, the computation unit 104 performs the drink determination process (steps S401 to S403 (FIG. 26)) as in the third embodiment by using each combination of the identification information of the vending machines 700 and the type information and the stock information included in the product information which are acquired in step S202 each time a beacon signal is received, the preference information returned and acquired via the communication unit 101 in step S221, the preference information acquired in step S205, and the biological information acquired in step S206*b*. In step S210*b*, the computation unit 104 generates the individual purchase menu 900 with reference to the work table 2500 (FIG. 27) obtained by performing the drink determination process (steps S401 to S403 (FIG. 26)) in step S207*b*.

Fifth Embodiment

A fifth embodiment of the present disclosure will be described below. In the third embodiment, an example has been described in which the business entity X application in the communication terminal 100 acquires the preference information and the biological information of the user of the communication terminal 100 from the first server 200 and the communication terminal 100, generates the push notification screen 800 and the individual purchase menu 900 for the user, and notifies the first server 200 of the purchase information of the drink by the user of the communication terminal 100.

The fifth embodiment is different from the third embodiment in that the business entity management server 300 that provides the business entity X application acquires the preference information and the biological information of the user of the communication terminal 100 from the first server 200, generates the push notification screen 800 and the individual purchase menu 900 for the user, and notifies the first server 200 of the purchase information of the drink by the user of the communication terminal 100.

Figure 29A:
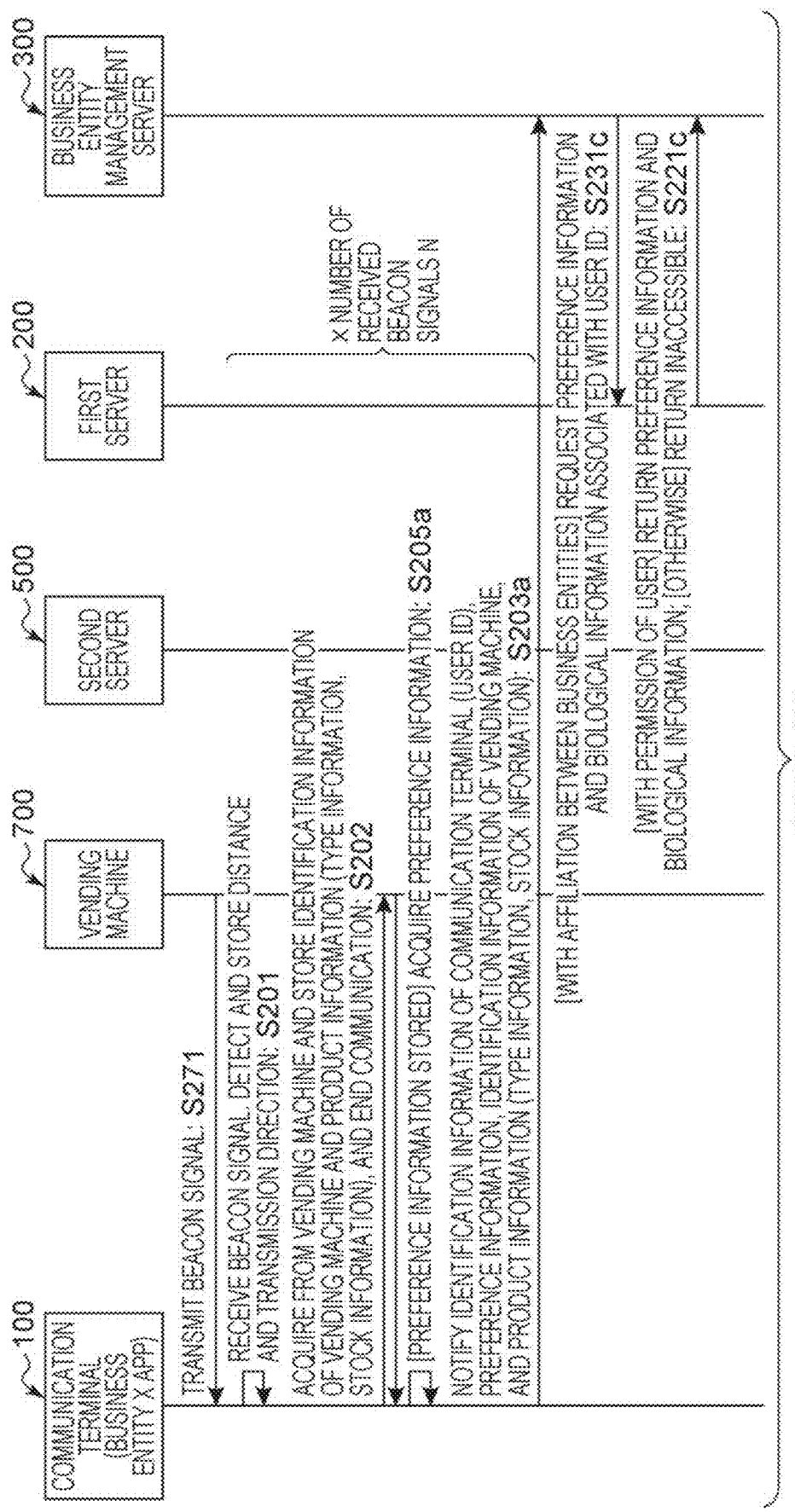
FIGS. 29A and 29B are a sequence diagram illustrating an example of an overview of a process performed in a vending machine management system in a fifth embodiment.
Figure 29B:
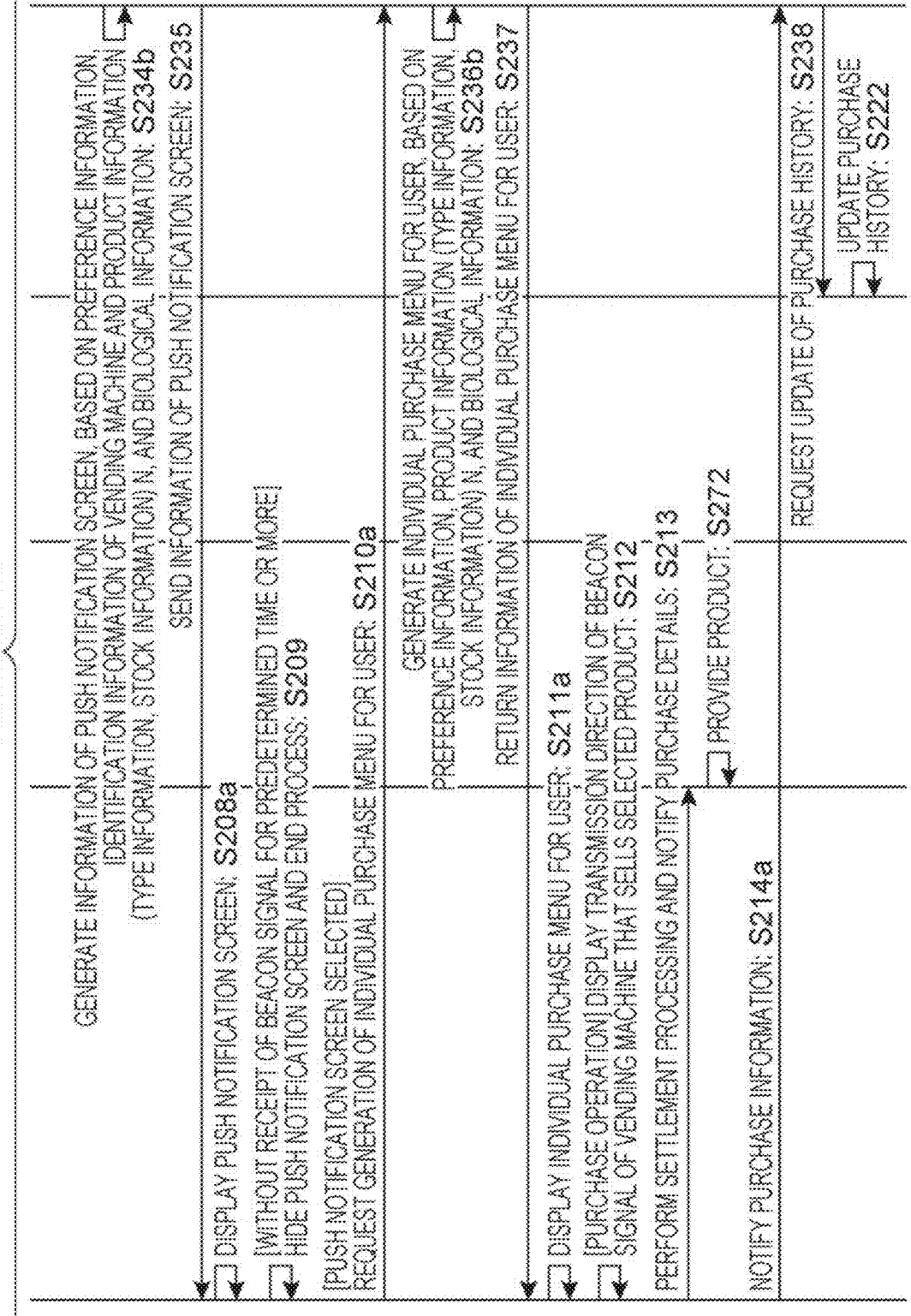

An overview of a process performed in the vending machine management system in the fifth embodiment will be described below. In the description below, a description of processing having the same details as those of the third embodiment is omitted as appropriate. FIGS. 29A and 29B are a sequence diagram illustrating an example of the overview of the process performed in the vending machine management system in the fifth embodiment.

As illustrated in FIG. 29A, the proximity communication unit 707 of each of the vending machines 700 included in the vending machine management system periodically transmits a beacon signal (step S271) as in the third embodiment.

The business entity X application is executed in the communication terminal 100, so that step S201 is performed as in the third embodiment. Thus, information indicating the distance to the vending machine 700 that is the transmission source of the beacon signal and the transmission direction of the beacon signal as well as the beacon ID are stored in the memory 102. Step S202 is performed, so that the identification information for identifying the vending machine 700 and the product information including the type information and the stock information are stored in the memory 102.

After step S202, if the preference information of the user of the communication terminal 100 is stored in the memory 102 ([preference information stored]), the computation unit 104 acquires the preference information of the user of the communication terminal 100 stored in the memory 102 (step S205*a*).

The computation unit 104 then controls the communication unit 101 to send, to the business entity management server 300, pieces of information stored in the memory 102, i.e., the identification information for identifying the communication terminal 100 including the user ID, the preference information acquired in step S205*a*, and the identification information and product information of each of the vending machines 700 which are the transmission sources of the respective beacon signals acquired in step S202 (step S203*a*).

In response to this, in the business entity management server 300, based on the identification information of the vending machine 700 and the product information acquired via the communication unit 301, the computation unit 302 updates the product information of the vending machine 700 corresponding to the identification information and stored in the memory 303.

In this way, each time the proximity communication unit 107 of the communication terminal 100 receives a beacon signal transmitted from the proximity communication unit 707 of the vending machine 700, the processing from step S201 to step S203*a* is repeated in response to the receipt.

In response to detecting that a plurality of beacon signals transmitted from the plurality of vending machines 700 are received by the proximity communication unit 107, the computation unit 104 may perform merely steps S201 and S202 at receipt of each of the beacon signals by the proximity communication unit 107 and may perform steps S205*a* and S203*a* just once. Thus, the computation unit 104 may collectively send the identification information for identifying the communication terminal 100 including the user ID, the preference information acquired in step S205*a*, and the pieces of information acquired in steps S201 and S202 to the business entity management server 300 in single step S203*a*.

Suppose that the business entity X that provides the business entity X application has an affiliation with the managing business entity of the first server 200 and that the business entity X is permitted to acquire personal information of each user stored in the first server 200. In this case ([with affiliation between business entities]), the computation unit 302 of the business entity management server 300 controls the communication unit 301 to send, to the first server 200, a signal requesting sending of the preference information and the biological information of the user identified by the user ID included in the identification information, together with the identification information for identifying the communication terminal 100 acquired from the communication terminal 100 (step S231*c*).

In the first server 200, in response to the communication unit 201 receiving the identification information for identifying the communication terminal 100 and the signal requesting sending of the preference information and the biological information of the user, which are sent in step S231*c*, the computation unit 202 performs step S221*c* (step S221*c*).

Specifically, in step S221*c*, if the computation unit 202 determines that the user indicated by the user ID included in the identification information received by the communication unit 201 is a user with permission ([with permission of user]), the computation unit 202 controls the communication unit 201 to return the preference information and the biological information of the user with permission acquired from the memory 203 to the business entity management server 300. On the other hand, if the computation unit 202 determines that the user is not a user with permission ([otherwise]), the computation unit 202 controls the communication unit 201 to return information indicating that the personal information is inaccessible to the business entity management server 300. The returned information is received and output to the computation unit 302 by the communication unit 301 of the business entity management server 300.

If the computation unit 202 determines that the user is not a user with permission ([otherwise]), the computation unit 202 may control the communication unit 201 to send a message for checking whether to permit the business entity management server 300 to read the personal information, to the communication terminal 100 indicated by the identification information acquired from the business entity management server 300. Suppose that in response to this, the computation unit 202 acquires a reply indicating permission from the communication terminal 100 via the communication unit 201. In this case, the computation unit 202 may acquire, from the memory 203, the preference information and the biological information of the user indicated by the user ID included in the received identification information in step S221*c*. The computation unit 202 then may cause the communication unit 201 to return the acquired information to the business entity management server 300.

The computation unit 302 then generates the push notification screen 800, based on each combination of the identification information of the vending machines 700 and the type information and the stock information included in the product information, the preference information, and the biological information that are acquired in the preceding steps (step S234*b*). Each combination of the identification information of the vending machines 700 and the type information and the stock information included in the product information is a combination sent and acquired via the communication unit 301 in step S203*a*. The preference information is the preference information sent and acquired via the communication unit 301 in step S203*a* and the preference information returned and acquired via the communication unit 301 in step S221*c*. The biological information is the biological information returned and acquired via the communication unit 301 in step S221*c*.

In the fifth embodiment, in step S234*b*, the computation unit 302 performs the drink determination process (steps S401 to S403 (FIG. 26)) by using each combination of the identification information of the vending machine 700 and the type information and the stock information included in the product information, the preference information, and the biological information. Thus, the computation unit 302 generates a message that recommends a drink corresponding to a record in which "1" is stored in the field "priority" of the work table 2500 (FIG. 27), as the message 820 included in the push notification screens 800B and 800C illustrated in FIGS. 9 and 11, respectively. The computation unit 302 also generates a product image representing the drink corresponding to the record in which "1" is stored in the field "priority" of the work table 2500 (FIG. 27), as the icon image 840 of the push notification screens 800B and 800C illustrated in FIGS. 9 and 11, respectively.

The computation unit 302 then controls the communication unit 301 to send information representing the push notification screen 800 generated in step S234*b* to the communication terminal 100 (step S235).

On the other hand, in the communication terminal 100, in response to acquiring, via the communication unit 101, the information representing the push notification screen 800 sent in step S235, the computation unit 104 displays the push notification screen 800 represented by the acquired information on the display 105 of the communication terminal 100 (step S208*a*).

If receipt of a beacon signal by the proximity communication unit 107 is not detected for a predetermined time or more since the push notification screen 800 is displayed in step S208*a*, ([without receipt of beacon signal for predetermined time or more]), the computation unit 104 performs processing of hiding the displayed push notification screen 800 to hide the push notification screen 800. The computation unit 104 then ends the process (step S209). After ending the process, the computation unit 104 returns to a state of waiting for receipt of a beacon signal by the proximity communication unit 107.

On the other hand, if the user performs an operation (for example, a touch operation) of selecting the push notification screen 800 by using the operation unit 106 ([push notification screen selected]), the computation unit 104 controls the communication unit 101 to send a signal requesting generation of the individual purchase menu 900 for the user of the communication terminal 100 to the business entity management server 300 (step S210*a*). The signal requesting generation of the individual purchase menu 900 for the user is received and output to the computation unit 302 by the communication unit 301 of the business entity management server 300.

In response to acquiring, via the communication unit 301, the signal requesting generation of the individual purchase menu for the user of the communication terminal 100 sent in step S210*a*, the computation unit 302 generates the individual purchase menu 900 for the user of the communication terminal 100, based on the type information and the stock information included in the product information, the preference information, and the biological information that are used in step S234*b* (step S236*b*).

In step S236*b*, the computation unit 302 refers to the work table 2500 (FIG. 27) obtained by performing the drink determination process (steps S401 to S403 (FIG. 26)) in step S234*b*. The computation unit 302 then generates the individual purchase menu 900 in which the tile objects 901 (such as FIG. 12) representing the drinks corresponding to the respective records in which the priorities are stored in the field "priority" are arranged according to the stored priorities.

The computation unit 302 then controls the communication unit 301 to send information representing the individual purchase menu 900 for the user of the communication terminal 100, generated in step S236*b*, to the communication terminal 100 (step S237).

In the communication terminal 100, in response to acquiring, via the communication unit 101, the information representing the individual purchase menu 900 for the user of the communication terminal 100 sent in step S237, the computation unit 104 displays the individual purchase menu 900 for the user of the communication terminal 100 represented by the acquired information on the display 105 of the communication terminal 100 (step S211*a*).

After step S211*a*, as in the third embodiment, steps S212, S213, and S272 are performed, so that the drink purchased by the user is provided to the user.

After step S213, the computation unit 104 of the communication terminal 100 controls the communication unit 101 to send the purchase information of the drink to the business entity management server 300 (step S214*a*). Thus, in the business entity management server 300, the purchase information of the drink sent in step S214*a* is received and output to the computation unit 302 by the communication unit 301. The purchase information of the drink includes the user ID of the user of the communication terminal 100, the date and time information indicating the purchase date and time of the drink by the user, the identification information for identifying the vending machine 700 from which the user purchased the drink, and the type information indicating the type of the drink purchased by the user.

In response to acquiring the purchase information of the drink from the communication unit 301, the computation unit 302 of the business entity management server 300 causes the communication unit 301 to send a signal requesting update of the purchase history information of the user of the communication terminal 100 to the first server 200 together with the acquired purchase information of the drink (step S238). In response to this, step S222 is performed in the first server 200 as in the first embodiment, and if the user of the communication terminal 100 is a user with permission, the purchase history information of the user with permission stored in the memory 203 is updated.

Sixth Embodiment

A sixth embodiment of the present disclosure will be described below. In the fifth embodiment, an example has been described in which the business entity management server 300 acquires the biological information of the user of the communication terminal 100 from the first server 200. The sixth embodiment is different from the fifth embodiment in that the business entity management server 300 requests the sensor application in the communication terminal 100 to send the biological information of the user of the communication terminal 100 and acquires the biological information from the sensor application.

In the sixth embodiment, the memory 102 of the communication terminal 100 has a table having the same configuration as the biological information table 2300 illustrated in FIG. 25 as in the fourth embodiment. For convenience of explanation, the table is hereinafter referred to as the biological information table 2300. As in the fourth embodiment, the sensor application collects the biological information of the user of the communication terminal 100 periodically measured by the biological sensor 600, and stores the collected biological information in the biological information table 2300 (FIG. 25) in time series in association with the user ID of the user and the measurement date and time information indicating the measurement date and time of the biological information.

Figure 30B:
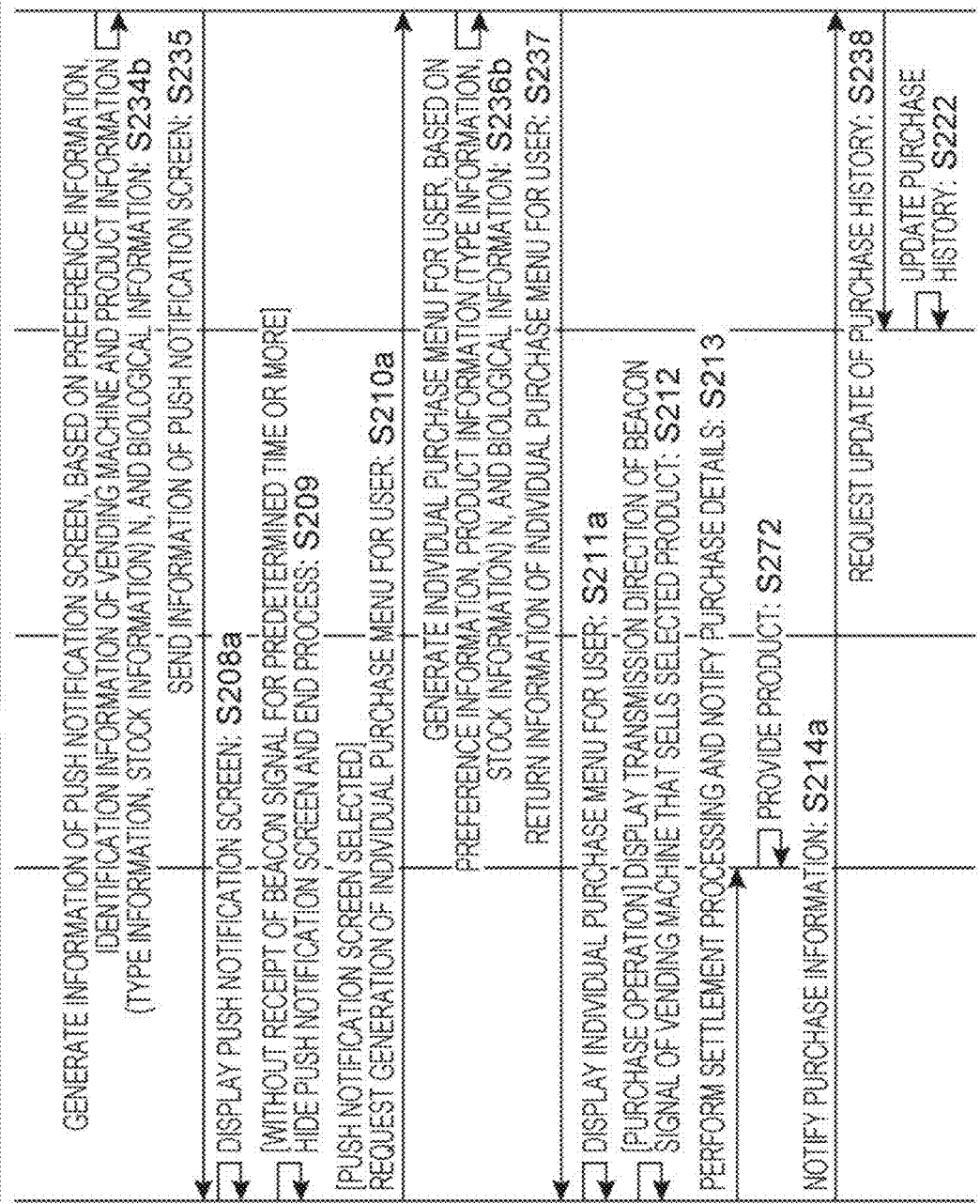

An overview of a process performed in the vending machine management system in the sixth embodiment will be described below. In the description below, a description of processing having the same details as those of the fifth embodiment is omitted as appropriate. FIGS. 30A and 30B are a sequence diagram illustrating an example of the overview of the process performed in the vending machine management system in the sixth embodiment.

As illustrated in FIG. 30A, in the sixth embodiment, step S231d is performed instead of step S231c (FIG. 29A) in the fifth embodiment.

Specifically, suppose that the business entity X that provides the business entity X application has an affiliation with the managing business entity of the first server 200 and that the business entity X is permitted to acquire personal information of each user stored in the first server 200. In this case ([with affiliation between business entities]), the computation unit 302 of the business entity management server 300 controls the communication unit 301 to send, to the first server 200, a signal requesting sending of preference information of the user identified by the user ID included in the identification information, together with identification information for identifying the communication terminal 100 acquired from the communication terminal 100 (step S231d).

In the first server 200, in response to the communication unit 201 receiving the identification information for identifying the communication terminal 100 and the signal requesting sending of the preference information of the user, which are sent in step S231d, the computation unit 202 performs step S221d that is substantially the same as step S221b (FIG. 24A), instead of step S221c (FIG. 29A) in the fifth embodiment (step S221d).

Specifically, in step S221d, if the computation unit 202 determines that the user indicated by the user ID included in the identification information received by the communication unit 201 is a user with permission ([with permission of user]), the computation unit 202 controls the communication unit 201 to return the preference information of the user with permission acquired from the memory 203 to the business entity management server 300. On the other hand, if the computation unit 202 determines that the user is not a user with permission ([otherwise]), the computation unit 202 controls the communication unit 201 to return information indicating that the personal information is inaccessible to the business entity management server 300. The returned information is received and output to the computation unit 302 by the communication unit 301 of the business entity management server 300.

If the computation unit 202 determines that the user is not a user with permission ([otherwise]), the computation unit 202 may control the communication unit 201 to send a message for checking whether to permit the business entity management server 300 to read the personal information, to the communication terminal 100 indicated by the identification information acquired from the business entity management server 300. Suppose that in response to this, the computation unit 202 acquires a reply indicating permission from the communication terminal 100 via the communication unit 201. In this case, the computation unit 202 may acquire, from the memory 203, the preference information included in the personal information of the user indicated by the user ID included in the received identification information in step S221d. The computation unit 202 then may cause the communication unit 201 to return the acquired information to the business entity management server 300.

Next, the computation unit 302 requests the communication terminal 100 indicated by the terminal ID included in the identification information for identifying the communication terminal 100 acquired in step S203a to provide the biological information of the user of the communication terminal 100, and acquires the biological information of the user of the communication terminal 100 returned in response the request (step S239).

Specifically, in step S239, the computation unit 302 controls the communication unit 301 to send a signal requesting the biological information of the user of the communication terminal 100 to the communication terminal 100 indicated by the terminal ID included in the identification information for identifying the communication terminal 100 acquired in step S203a. In the communication terminal 100, in response to the communication unit 101 receiving the signal requesting the biological information of the user of the communication terminal 100, the communication unit 101 notifies the computation unit 104 of the receipt. In response to receiving the notification, the computation unit 104 executes the sensor application to acquire records including the user ID of the user of the communication terminal 100 in the biological information table 2300 (FIG. 25) in the memory 102, as the biological information of the user. The computation unit 104 then causes the communication unit 101 to return the acquired biological information. In response to this, the computation unit 302 of the business entity management server 300 acquires, via the communication unit 301, the biological information of the user of the communication terminal 100 returned from the communication terminal 100. Thereafter, the processing of step S234*b* and subsequent steps is performed as in the fifth embodiment.

In the sixth embodiment, in step S234*b*, the computation unit 302 performs the drink determination process (steps S401 to S403 (FIG. 26)) by using each combination of the identification information of the vending machine 700 and the type information and the stock information included in the product information, which are sent and acquired via the communication unit 301 in step S203*a*, the preference information sent and acquired via the communication unit 301 in step S203*a*, the preference information returned and acquired via the communication unit 301 in step S221*d*, and the biological information acquired in step S239. In step S236*b*, the computation unit 104 generates the individual purchase menu 900 with reference to the work table 2500 (FIG. 27) obtained by performing the drink determination process (steps S401 to S403 (FIG. 26)) in step S234*b*.

Seventh Embodiment

A seventh embodiment of the present disclosure will be described below. In the first embodiment, an example has been described in which the business entity X application in the communication terminal 100 generates the push notification screen 800 and the individual purchase menu 900 for the user, based on each combination of the identification information of each of the vending machines 700 that are the transmission sources of the respective beacon signals received by the proximity communication unit 107 and the type information and the stock information included in the product information, the preference information of the user of the communication terminal 100, and the weather information of the current location of the communication terminal 100.

In the third embodiment, an example has been described in which the business entity X application in the communication terminal 100 generates the push notification screen 800 and the individual purchase menu 900 for the user, based on each combination of the identification information of each of the vending machines 700 that are the transmission sources of the respective beacon signals received by the proximity communication unit 107 and the type information and the stock information included in the product information, the preference information of the user of the communication terminal 100, and the biological information of the user.

The seventh embodiment is different from the first embodiment and the third embodiment in that the business entity X application in the communication terminal 100 generates the push notification screen 800 and the individual purchase menu 900 for the user, based on each combination of the identification information of each of the vending machines 700 that are the transmission sources of respective beacon signals received by the proximity communication unit 107 and the type information and the stock information included in the product information, the preference information of the user of the communication terminal 100, the biological information of the user, and the weather information of the current location of the communication terminal 100.

Thus, in the seventh embodiment, each combination of the identification information of each of the vending machines 700 that are the transmission sources of the respective beacon signals received by the proximity communication unit 107 and the type information and the stock information included in the product information, the preference information of the user of the communication terminal 100, the biological information of the user, and the weather information of the current location of the communication terminal 100 (or the installed location of the vending machine 700), which are acquired prior to the drink determination process, are used in the drink determination process performed when the push notification screen 800 is generated. In the drink determination process, at least one drink that matches a preference of the user indicated by the preference information is determined, in relation to the weather, indicated by the weather information, at the current location of the communication terminal 100 (or installed location of the vending machine 700) and to the current physical condition, indicated by the biological information, of the user of the communication terminal 100 from among a plurality of drinks stored in the vending machines 700 that are the transmission sources of the respective beacon signals received by the communication terminal 100.

Figure 31A:
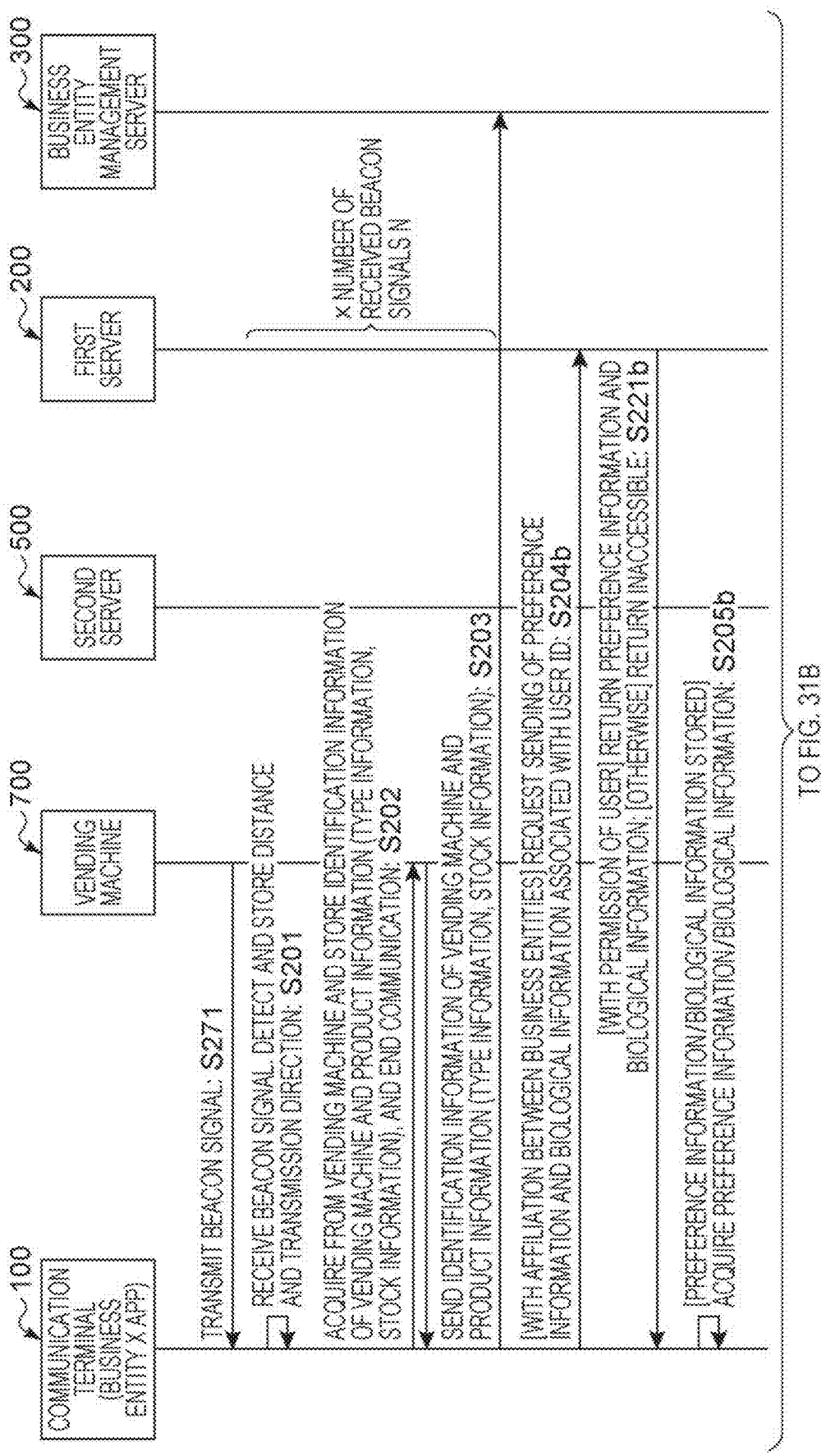
FIGS. 31A and 31B are a sequence diagram illustrating an example of an overview of a process performed in a vending machine management system in a seventh embodiment.
Figure 31B:
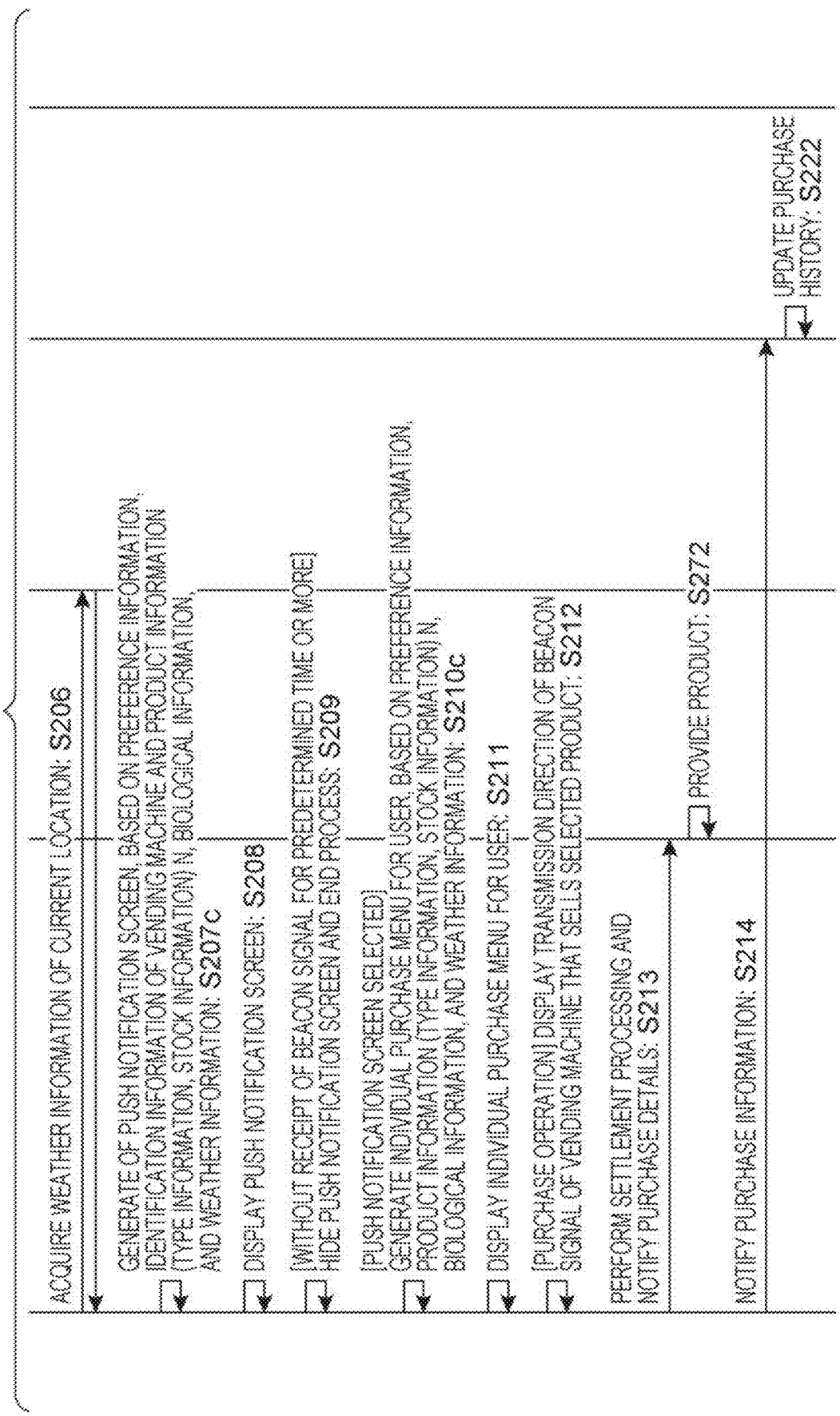

An overview of a process performed in the vending machine management system in the seventh embodiment will be described below. In the description below, a description of processing having the same details as those of the first embodiment and the third embodiment is omitted as appropriate. FIGS. 31A and 31B are a sequence diagram illustrating an example of the overview of the process performed in the vending machine management system in the seventh embodiment.

As illustrated in FIG. 31A, the proximity communication unit 707 of each of the vending machines 700 included in the vending machine management system periodically transmits a beacon signal (step S271) as in the first embodiment and the third embodiment. The business entity X application is executed in the communication terminal 100, so that each time the proximity communication unit 107 of the communication terminal 100 receives a beacon signal transmitted from the proximity communication unit 707 of each of the vending machines 700, the processing from step S201 to step S203 is repeated in response to the receipt as in the first embodiment and the third embodiment.

In response to detecting that a plurality of beacon signals transmitted from the plurality of vending machines 700 are received by the proximity communication unit 107, the computation unit 104 may perform merely steps S201 and S202 at receipt of each of the beacon signals by the proximity communication unit 107 and may perform step S203 just once as in the first embodiment and the third embodiment.

Next, step S204*b* is performed in the communication terminal 100, and in response to which, step S221*b* is performed in the first server 200 as in the third embodiment. Thus, if the business entity X is permitted to acquire the personal information of each user stored in the first server 200 ([with affiliation between business entities]) and the user of the communication terminal 100 is a user with permission ([with permission of user]), the preference information and the biological information of the user with permission are returned from the first server 200. On the other hand, if the user of the communication terminal 100 is not a user with permission ([otherwise]), information indicating that the personal information is inaccessible is returned from the first server 200. The returned information is received and output to the computation unit 104 by the communication unit 101 of the communication terminal 100.

If the user is not a user with permission ([otherwise]), a message for checking whether to permit reading of the personal information stored in the memory 203 may be returned from the first server 200 to the communication terminal 100 as in the first embodiment and the third embodiment. If permission is returned to the first server 200 in response to this, the preference information and the biological information of the user of the communication terminal 100 may be returned from the first server 200 to the communication terminal 100.

Next, step S205b is performed as in the third embodiment. Specifically, if the preference information and/or the biological information of the user of the communication terminal 100 are/is stored in the memory 102 of the communication terminal 100 ([preference information/biological information stored]), the preference information and/or the biological information of the user are/is acquired within a range not overlapping the preference information and the biological information returned in step S221b. There is a possibility that the latest biological information is sent from the biological sensor 600 to the communication terminal 100 and is accumulated and managed by the sensor application but is not uploaded to the first server 200 yet. Since the drink determination process (described below) is performed also using the latest biological information, the latest biological information stored in the memory 102 of the communication terminal 100 in this manner is also acquired in step S205b.

After step S205b, step S206 is performed as in the first embodiment. Thereafter, step S206 is periodically repeated. Thus, the communication terminal 100 acquires, from the second server 500, as the weather information of the current location of the communication terminal 100, the weather information corresponding to the current location of the communication terminal 100 or the installed location of the vending machine 700 indicated by the identification information acquired in step S202. The acquired weather information is stored in the memory 102 in time series, as a history of the weather information, in association with the date and time information indicating the acquisition date and time of the weather information. However, the weather information is not limited to this, and weather information of a region including the current location of the communication terminal 100 in a past predetermined period may be acquired in step S206 as in the first embodiment. As described in the first embodiment, the history of the weather information of the current location of the communication terminal 100 stored in the memory 102 of the communication terminal 100 owned by the user with permission may be managed as the personal information of the user with permission in the first server 200. In this case, in step S204b, the history of the weather information of the current location of the communication terminal 100 owned by the user may be requested from the communication terminal 100 together with the request for the preference information and the biological information associated with the user ID, so that the history of the weather information may be acquired together with the preference information and the biological information from the first server 200 in step S221b.

Next, the computation unit 104 generates the push notification screen 800, based on each combination of the identification information of the vending machines 700 and the type information and the stock information included in the product information, the preference information, the biological information, and the weather information that are acquired in the preceding steps (step S207c). Each combination of the identification information of the vending machines 700 and the type information and the stock information included in the product information is the combination acquired in step S202 each time a beacon signal is received. The preference information is the preference information returned and acquired via the communication unit 101 in step S221b and the preference information acquired in step S205b. The biological information is the biological information returned and acquired via the communication unit 101 in step S221b and the biological information acquired in step S205b. The weather information is the weather information acquired in step S206 and the history of the weather information stored in the memory 102 or the first server 200.

In the seventh embodiment, in step S207c, the computation unit 104 performs a drink determination process (described below) by using each combination of the identification information of the vending machine 700 and the type information and the stock information included in the product information, the preference information, the biological information, and the weather information.

The computation unit 104 then displays the push notification screen 800 generated in step S207c on the display 105 of the communication terminal 100 as in the first embodiment (step S208). The computation unit 104 may display the push notification screen 800 on the display 105 and may drive a vibration generator (not illustrated) built in the communication terminal 100 to allow the user of the communication terminal 100 to easily notice the push notification. The computation unit 104 may display the push notification screen 800 on the display 105 and reproduce a sound reporting receipt of the push notification from a speaker (not illustrated) built in the communication terminal 100 to allow the user of the communication terminal 100 to easily notice the push notification.

If receipt of a beacon signal by the proximity communication unit 107 is not detected for a predetermined time or more since the push notification screen is displayed in step S208 ([without receipt of beacon signal for predetermined time or more]), the computation unit 104 performs processing of hiding the displayed push notification screen to hide the push notification screen. The computation unit 104 then ends the process (step S209). After ending the process, the computation unit 104 returns to a state of waiting for receipt of a beacon signal by the proximity communication unit 107.

On the other hand, if the user performs an operation (for example, a touch operation) of selecting the push notification screen 800 by using the operation unit 106 ([push notification screen selected]), the computation unit 104 generates the individual purchase menu 900 for the user of the communication terminal 100, based on the type information and the stock information included in the product information, the preference information, the biological information, and the weather information that are used in step S207c (step S210c).

In the seventh embodiment, in step S210c, the computation unit 104 generates the individual purchase menu 900 with reference to a work table (described later) obtained by performing the drink determination process (described later) in step S207c by using the type information and the stock information included in the product information, the preference information, the biological information, and the weather information.

The computation unit 104 then displays the individual purchase menu 900 for the user of the communication terminal 100 generated in step S210c on the display 105 of the communication terminal 100 (step S211). After step S211, steps S212 to S214, S272, and S222 are performed as in the first embodiment and the third embodiment. Thus, the drink purchased by the user is provided to the user. If the user of the communication terminal 100 is a user with permission, the first server 200 updates the purchase history information of the user with permission stored in the memory 203.

Process of Determining at Least One Drink that Matches Preference of User

The drink determination process of determining at least one drink that matches a preference of the user of the communication terminal 100, is recommended in the push notification screen 800, and is displayed in the individual purchase menu 900 for the user in the seventh embodiment will be described next by using a specific example. The drink determination process is performed when the push notification screen 800 is generated, and a result of the drink determination process is used when the individual purchase menu 900 for the user is generated.

In the seventh embodiment, each combination of the identification information of each of the vending machines 700 that are the transmission sources of the respective beacon signals received by the proximity communication unit 107 and the type information and the stock information included in the product information, the preference information, the biological information, and the weather information, which are acquired prior to the drink determination process, are used in the drink determination process. In the drink determination process, at least one drink that matches the preference of the user of the communication terminal 100 indicated by the preference information is determined, in relation to the weather, indicated by the weather information, at the current location of the communication terminal 100 and to the current physical condition, indicated by the biological information, of the user of the communication terminal 100 from among a plurality of drinks stored in the vending machines 700 that are the transmission sources.

FIG. 32 is a flowchart illustrating an example of the drink determination process. FIG. 33 is a diagram illustrating an example of a work table 2600 used in the drink determination process illustrated in FIG. 32.

Suppose that in this specific example, the product information included in the information 2100 illustrated in FIG. 16, the preference information 2120 illustrated in FIG. 18, the weather information 2200 illustrated in FIG. 19, the history 2210 of the weather information illustrated in FIG. 20, and the biological information included in the biological information table 2300 illustrated in FIG. 25 are acquired prior to the drink determination process.

As illustrated in FIG. 32, the computation unit 104 first refers to each piece of product information (FIG. 16) acquired prior to the drink determination process, and determines whether a drink corresponding to the piece of product information is available for sale based on the type information and the stock information included in the piece of product information. The computation unit 104 then stores a result of the determination in the work table 2600 illustrated in FIG. 33 (step S501). Thus, drinks determined to be not available for sale can be excluded from drinks recommended to the user.

Specifically, in step S501, the computation unit 104 determines that a drink corresponding to a piece of product information in which the quantity information included in the stock information indicates a quantity "0" is a drink that is sold out and thus is not available for sale. The computation unit 104 also determines that a drink corresponding to a piece of product information in which the temperature indicated by the temperature information included in the stock information is out of the predetermined temperature range in which the drink is providable to users is a drink that has an unsuitable temperature and thus is not available for sale. In this specific example, the predetermined temperature range for cold drinks is higher than or equal to 4° C. and lower than or equal to 7° C. In this specific example (FIG. 16), hot drinks are not handled. However, the predetermined temperature range for hot drinks is higher than or equal to 53° C. and lower than or equal to 57° C.

In the example of FIG. 16, in the record with the beacon ID "ID2", the drink corresponding to the piece of product information in which the quantity indicated by the quantity information included in the stock information is "0" and the product name indicated by the type information is "beer 2" is determined to be a drink not available for sale. In the record with the beacon ID "ID2", the drink corresponding to the piece of product information in which the temperature indicated by the temperature information included in the stock information is "13" and the product name indicated by the type information is "beer 3" is determined to be a drink not available for sale. The drinks corresponding to the seven pieces of product information excluding these two pieces of product information are determined to be drinks available for sale.

The computation unit 104 refers to each piece of product information (FIG. 16) acquired prior to the drink determination process, and stores the product name (for example, coffee 1) indicated by the type information included in the piece of product information in a field "product name" of the work table 2600 illustrated in FIG. 33. The computation unit 104 then stores a result of the determination obtained in step S501 in a field "available for sale" of the work table 2600.

"OK" in the field "available for sale" in FIG. 33 indicates that the drink with the product name (for example, coffee 2) indicated by the field "product name" corresponding to the field "available for sale" is determined to be a drink available for sale. "NG (sold out)" in the field "available for sale" in FIG. 33 indicates that the drink with the product name (for example, beer 2) indicated by the field "product name" corresponding to the field "available for sale" is determined to be sold out and thus is a drink not available for sale. "NG (unsuitable temperature)" in the field "available for sale" in FIG. 33 indicates that the drink with the product name (for example, beer 3) indicated by the field "product name" corresponding to the field "available for sale" is determined to have an unsuitable temperature and thus is a drink not available for sale.

Next, based on the product information (FIG. 16) on the drinks determined to be available for sale in step S501 and the preference information 2120 (FIG. 18), the weather information 2200 (FIG. 19), and the history 2210 (FIG. 20) of the weather information that have been acquired prior to the drink determination process, the computation unit 104 counts the number of times (hereinafter, referred to as the number of purchases under the similar weather) the user of the communication terminal 100 has purchased each of the drinks determined to be available for sale in step S501 in the past under a weather condition similar to the current weather condition among the number of purchases of the drink (step S502).

Specifically, in step S502, the computation unit 104 refers to each record of the preference information 2120 (FIG. 18) acquired prior to the drink determination process, and acquires the product name (for example, green tea (cold)) of each drink stored in the field "product name" and the number of purchases (for example, 167) indicated by the field "number of purchases". Then, in the work table 2600 illustrated in FIG. 33, the computation unit 104 stores the acquired number of purchases (for example, 167) in a field "past preference (number of purchases)" in a record in which the acquired product name (for example, green tea (cold)) of the drink is stored in the field "product name".

In the work table 2600 illustrated in FIG. 33, the computation unit 104 stores "0" in the field "past preference (number of purchases)" in a record in which a product name that is not acquired from the preference information 2120 (FIG. 18) is stored in the field "product name". Thus, it is possible to grasp that the user does not like the drink with the product name that is not acquired from the preference information 2120 (FIG. 18).

The computation unit 104 then determines that weather information satisfying all of three conditions 1) to 3) below that use the weather information 2200 (FIG. 19) acquired prior to the drink determination process among the history 2210 (FIG. 20) of the weather information acquired prior to the drink determination process is weather information (hereinafter, referred to as similar weather information) indicating a weather condition similar to the current weather condition. The computation unit 104 then acquires date and time information (hereinafter, referred to as similar weather date and time information) associated with the similar weather information from the history 2210 (FIG. 20) of the weather information.

Condition 1): The temperature indicated by the field "temperature (Celsius)" is within ±5° C. from the temperature indicated by the field "temperature (Celsius)" of the weather information 2200.

Condition 2): The humidity indicated by the field "humidity" is within ±20% from the humidity indicated by the field "humidity" of the weather information 2200.

Condition 3): The heat index indicated by the field "heat index (WBGT)" is within ±5° C. from the heat index indicated by the field "heat index (WBGT)" of the weather information 2200.

For example, four pieces of weather information included in the history 2210 of the weather information illustrated in FIG. 20 satisfy all of the above-described three conditions 1) to 3) that use the weather information 2200 illustrated in FIG. 19. Thus, the computation unit 104 determines that the four pieces of weather information are the similar weather information, and acquires four pieces of date and time information "20200414060000", "20200414070000", "20200414080000", and "20200414090000" associated with the respective four pieces of weather information included in the history 2210 of the weather information illustrated in FIG. 20, as the similar weather date and time information.

The conditions for determining the similar weather information are not limited to the three conditions 1) to 3) described above, and may be one or more conditions that use one or more values indicated by one or more fields among the fields "temperature (Celsius)", "humidity", "heat index (WBGT)", "solar radiation", or "weather type" included in the weather information 2200 (FIG. 19) acquired prior to the drink determination process. For example, the similar weather information and the similar weather date and time information may be acquired by using the condition 3) of the heat index (WBGT).

In step S502, the computation unit 104 then refers to the preference information 2120 (FIG. 18) acquired prior to the drink determination process, and counts the number of times each drink determined to be available for sale in step S501 has been purchased within a predetermined time from the date and time indicated by the similar weather date and time information, as the number of purchases of the drink under the similar weather. In this specific example, this predetermined time is one hour.

Specifically, in the preference information 2120 illustrated in FIG. 18, the computation unit 104 refers to the field "purchase date and time" of a record in which the product name (for example, green tea (cold)) of each drink determined to be available for sale in step S501 is written in the field "product name". The computation unit 104 then counts, as the number of purchases of each drink under the similar weather, the number of dates and times in the field "purchase date and time" of the drink included in a period between dates and times (for example, from 5:00:00 on Apr. 14, 2020 to 7:00:00 on Apr. 14, 2020) that are within the predetermined time from the date and time (for example, 6:00:00 on Apr. 14, 2020) indicated by each similar weather date and time information among the dates and times (for example, 20200414223442, 20200414095340, . . . ) stored in the field "purchase date and time" to which a reference is made.

In the work table 2600 illustrated in FIG. 33, the computation unit 104 then stores the counted number of purchases under the similar weather (for example, 103) in the field "past preference under similar weather condition (number of purchases)" of a record in which the product name (for example, green tea (cold)) of the drink is stored in the field "product name".

Next, based on the product information (FIG. 16) on the drinks determined to be available for sale in step S501 and the preference information 2120 (FIG. 18) and the biological information (FIG. 25) that are acquired prior to the drink determination process, the computation unit 104 counts the number of times (past preference under similar physical condition (number of purchases) in FIG. 33) the user of the communication terminal 100 has purchased each of the drinks in the past under a physical condition similar to the current physical condition among the number of purchases of the drink under the similar weather counted in step S502 (step S503).

Specifically, in step S503, the computation unit 104 sets the biological information included in the record corresponding to the most recent measurement date and time among the pieces of biological information (FIG. 25) acquired prior to the drink determination process, as the biological information (hereinafter, referred to as current biological information) indicating the current physical condition of the user of the communication terminal 100. The computation unit 104 then determines that biological information satisfying both of two conditions 1) and 2) below that use the current biological information among the pieces of biological information measured in the past before the current biological information is biological information (hereinafter, referred to as similar biological information) indicating a physical condition similar to the current physical condition of the user of the communication terminal 100. The computation unit 104 then acquires measurement date and time information (hereinafter, referred to as similar biological condition date and time information) associated with the similar biological information from the biological information (FIG. 25).

Condition 1): The body temperature indicated by the field "body temperature" is within ±1° C. from the body temperature indicated by the field "body temperature" of the current biological information.

Condition 2): The body water percentage indicated by the field "body water percentage" is within ±1% from the body water percentage indicated by the field "body water percentage" of the current biological information.

For example, among the four pieces of biological information included in the biological information table 2300 illustrated in FIG. 25, the computation unit 104 sets, as the current biological information, biological information included in a record in which the most recent date and time "20200414090000" is stored in the field "measurement date and time". In this case, three pieces of biological information, other than the current biological information, included in the biological information table 2300 illustrated in FIG. 25 satisfy both of the two conditions 1) and 2) above that use the current biological information. Thus, the computation unit 104 determines that the three pieces of biological information are the similar biological information, and acquires, as the similar biological condition date and time information, three pieces of date and time information "20200414060000", "20200414070000", and "20200414080000" associated with the respective three pieces of similar biological information included in the biological information table 2300 illustrated in FIG. 25.

The conditions for determining the similar biological information are not limited to the two conditions 1) and 2) described above, and may be one or more conditions that use one or more values indicated by one or more fields among the fields "systolic blood pressure", "diastolic blood pressure", "heart rate", "body water percentage", and "body temperature" included in the current biological information. For example, the similar biological information and the similar biological condition date and time information may be acquired using only the condition 1) related to the body temperature.

Next, in step S503, the computation unit 104 refers to the preference information 2120 (FIG. 18) acquired prior to the drink determination process, and counts, as the number of purchases of the drink corresponding to the similar weather date and time information under the similar physical condition, the number of pieces of similar weather date and time information indicating dates and times within a predetermined time from the date and time indicated by the similar biological condition date and time information among the pieces of similar weather date and time information acquired in step S502. In this specific example, this predetermined time is one hour.

Specifically, in the preference information 2120 illustrated in FIG. 18, the computation unit 104 refers to the field "purchase date and time" of a record in which the product name (for example, green tea (cold)) of each drink determined to be available for sale in step S501 is written in the field "product name". The computation unit 104 counts, as the number of purchases of each drink (for example, the drink with the product name "green tea (cold)") corresponding to the similar weather date and time information under the similar physical condition, the number of pieces of similar weather date and time information (for example, 89) indicating the dates and times in a period (for example, from 5:00:00 on Apr. 14, 2020 to 7:00:00 on Apr. 14, 2020) by the date and time that is within a predetermined time from the date and time (for example, 6:00:00 on Apr. 14, 2020) indicated by the each similar weather date and time information, among the "103" pieces of similar weather date and time, the number of which is the number of purchases under the similar weather that are included in the dates and times stored in the field "purchase date and time" to which the reference is made, that is acquired in step S502, and that is indicated by the field "past preference under similar weather condition (number of purchases)" of the work table 2600 illustrated in FIG. 33.

In the work table 2600 illustrated in FIG. 33, the computation unit 104 then stores the counted number of purchases under the similar physical condition (for example, 89) in the field "past preference under similar physical condition (number of purchases)" of a record in which the product name (for example, green tea (cold)) of the drink is stored in the field "product name".

Next, the computation unit 104 assigns higher priorities to the drinks determined to be available for sale in step S501 in descending order of the number of purchases of the drink under the similar physical condition counted in step S503 by assuming that the drink for which the number of purchases under the similar physical condition is larger is more likely to match the preference of the user of the communication terminal 100 in relation to the weather at the current location of the communication terminal 100 and to the current physical condition of the user of the communication terminal 100 (step S504).

For example, suppose that as a result of steps S501 and S503, the product name indicated by the type information included in each piece of product information illustrated in FIG. 16, the determination result obtained in step S501, the number of purchases of each drink determined to be available for sale in step S501, the number of purchases of each drink under the similar weather counted in step S502, and the number of purchases of each drink under the similar physical condition counted in step S503 among the number of purchases of the drink under the similar weather are stored in the fields "product name", "available for sale", "past preference (number of purchases)", "past preference under similar weather condition (number of purchases)", and "past preference under similar physical condition (number of purchases)" of each record of the work table 2600, respectively, as illustrated in FIG. 33.

In this case, in step S504, the computation unit 104 assigns the highest priority "1" to the drink of which the product name is "green tea (cold)" and of which the number of purchases under the similar physical condition stored in the field "past preference under similar physical condition (number of purchases)" is "89", i.e., the largest. The computation unit 104 then stores the assigned priority "1" in the field "priority" of the record corresponding to the drink in the work table 2600.

Next, the computation unit 104 assigns the priority "2", which is the next highest priority of the priority "1", to the drink of which the product name is "sports drink (cold)" and of which the number of purchases under the similar physical condition stored in the field "past preference under similar physical condition (number of purchases)" is "14", i.e., the next largest. The computation unit 104 then stores the assigned priority "2" in the field "priority" of the record corresponding to the drink in the work table 2600.

Likewise, the priority "3" is assigned to the drink with the product name "carbonated drink (cold)", and the priority "4" is assigned to the drink with the product name "coffee 2". The computation unit 104 assigns the next priority (in this specific example, "5") to the drinks which are determined to be available for sale (for example, the drinks with the product names "coffee 1", "coffee 3", and "beer 1") and of which the number of purchases under the similar physical condition counted in step S503 is "0".

The computation unit 104 does not assign priorities to the drinks determined to be not available for sale in step S501 (for example, the drinks with the product names "beer 2" and "beer 3"). Thus, the computation unit 104 stores "-" indicating that the drink is not recommended to the user in the field "priority" of each record corresponding to the drink not available for sale in the work table 2600.

In the seventh embodiment, in step S207c (FIG. 31B), the computation unit 104 performs the drink determination process of steps S501 to S504. The computation unit 104 then generates a message that recommends a drink corresponding to a record in which "1" is stored in the field "priority" of the work table 2600 illustrated in FIG. 33, as the message 820 included in the push notification screens 800B and 800C illustrated in FIGS. 9 and 11, respectively. The computation unit 104 also generates a product image representing the drink corresponding to the record in which "1" is stored in the field "priority" of the work table 2600 illustrated in FIG. 33, as the icon image 840 of the push notification screens 800B and 800C illustrated in FIGS. 9 and 11, respectively.

In step S210c (FIG. 31B), with reference to the work table 2600 illustrated in FIG. 33, which is obtained by performing steps S501 to S504 of step S207c (FIG. 31B), the computation unit 104 generates the individual purchase menu 900 for the user, in which the tile objects 901 (such as FIG. 12) representing the drinks corresponding to the respective records in which the priorities are stored in the field "priority" are arranged according to the stored priorities.

In the drink determination process described above, the order in which steps S502 and S503 are performed may be reversed. That is, the number of purchases under the similar physical condition may be counted among the number of purchases of each drink determined to be available for sale in step S501, and then the number of purchases under the similar weather may be counted among the counted number of purchases under the similar physical condition. Then, the higher priorities may be assigned to the drinks determined to be available for sale in step S501 in descending order of the number of purchases under the similar weather.

Eighth Embodiment

An eighth embodiment of the present disclosure will be described below. In the seventh embodiment, an example has been described in which the business entity X application in the communication terminal 100 acquires the biological information of the user of the communication terminal 100 from the first server 200. The eighth embodiment is different from the seventh embodiment in that the business entity X application in the communication terminal 100 acquires the biological information of the user of the communication terminal 100 from the sensor application.

In the eighth embodiment, the memory 102 of the communication terminal 100 has a table having the same configuration as the biological information table 2300 illustrated in FIG. 25. For convenience of explanation, the table is hereinafter referred to as the biological information table 2300. The sensor application collects the biological information of the user of the communication terminal 100 periodically measured by the biological sensor 600, and stores the collected biological information in the biological information table 2300 (FIG. 25) in time series in association with the user ID of the user and the measurement date and time information indicating the measurement date and time of the biological information.

Figure 34B:
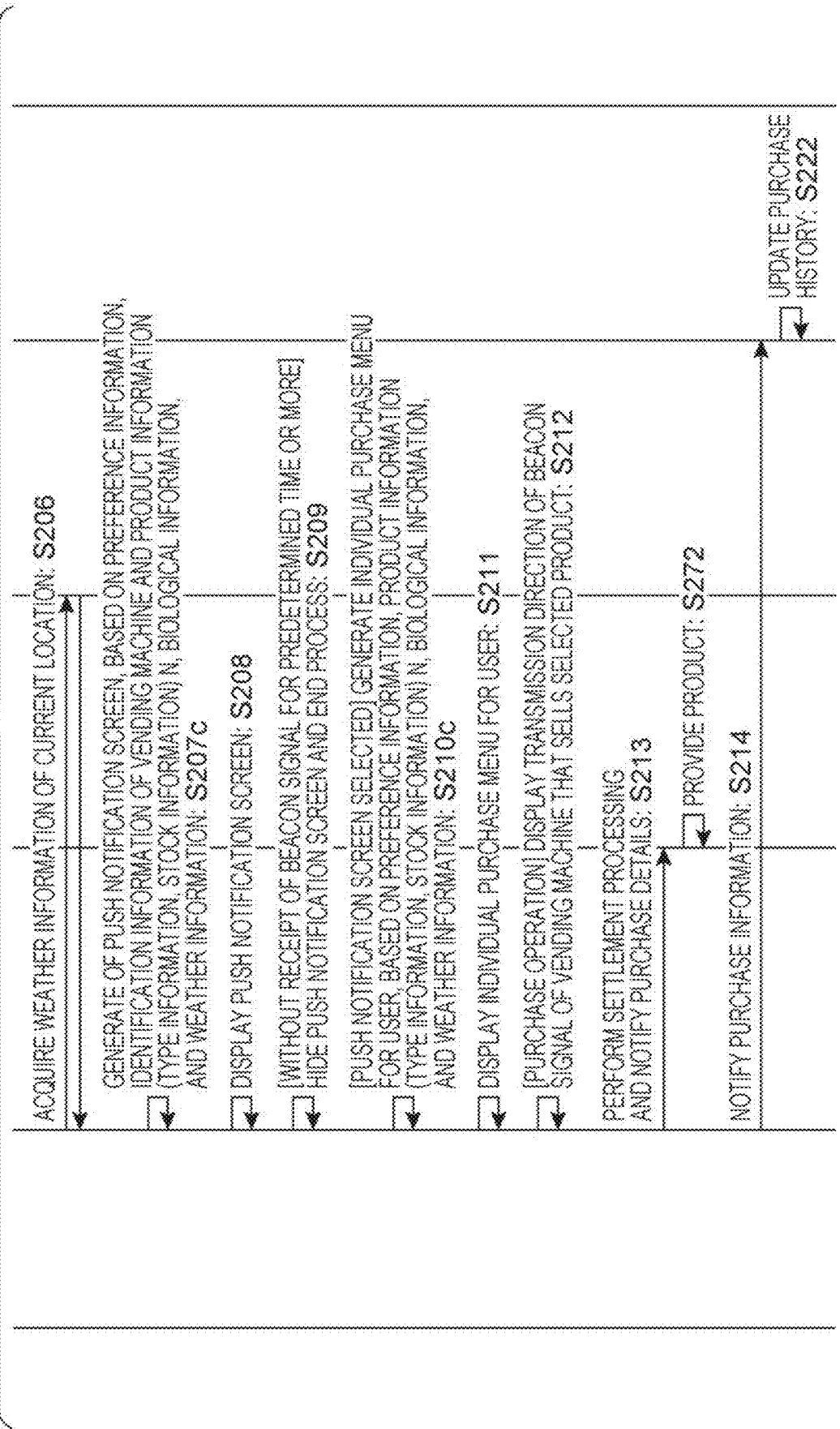

An overview of a process performed in the vending machine management system in the eighth embodiment will be described below. In the description below, a description of processing having the same details as those of the seventh embodiment is omitted as appropriate. FIGS. 34A and 34B are a sequence diagram illustrating an example of the overview of the process performed in the vending machine management system in the eighth embodiment.

As illustrated in FIG. 34A, in the eighth embodiment, step S204 (FIG. 7A) is performed as in the first embodiment, instead of step S204b (FIG. 31A) in the seventh embodiment. In response to this, step S221 (FIG. 7A) is performed in the first server 200 as in the first embodiment. As a result, if it is determined that the user of the communication terminal 100 is a user with permission ([with permission of user]), the preference information of the user with permission is returned. If it is determined that the user is not a user with permission ([otherwise]), information indicating that the personal information is inaccessible is returned. The returned information is received and output to the computation unit 104 by the communication unit 101 of the communication terminal 100.

The computation unit 104 then executes the sensor application to acquire records including the user ID of the user of the communication terminal 100 in the biological information table 2300 (FIG. 25) in the memory 102, as the biological information of the user (step S206b). Thereafter, the processing of step S205 and subsequent steps is performed as in the seventh embodiment.

In the eighth embodiment, in step S207c, the computation unit 104 performs the drink determination process (steps S501 to S504 (FIG. 32)) as in the seventh embodiment by using each combination of the identification information of the vending machines 700 and the type information and the stock information included in the product information which are acquired in step S202 each time a beacon signal is received, the preference information returned and acquired via the communication unit 101 in step S221, the preference information acquired in step S205, the biological information acquired in step S206b, and the weather information acquired in step S206. In step S210c, the computation unit 104 generates the individual purchase menu 900 with reference to the work table 2600 (FIG. 33) obtained by performing the drink determination process (steps S501 to S504 (FIG. 32)) in step S207c.

Ninth Embodiment

A ninth embodiment of the present disclosure will be described below. In the seventh embodiment, an example has been described in which the business entity X application in the communication terminal 100 acquires the biological information of the user of the communication terminal 100 from the first server 200, acquires the weather information of the current location of the communication terminal 100 from the second server 500, generates the push notification screen 800 and the individual purchase menu 900 for the user, and notifies the first server 200 of the purchase information of the drink by the user of the communication terminal 100.

The ninth embodiment is different from the seventh embodiment in that the business entity management server 300 that provides the business entity X application acquires the biological information of the user of the communication terminal 100 from the first server 200, acquires the weather information of the current location of the communication terminal 100 from the second server 500, generates the push notification screen 800 and the individual purchase menu 900 for the user, and notifies the first server 200 of the purchase information of the drink by the user of the communication terminal 100.

In the ninth embodiment, the history 2210 (FIG. 20) of the weather information of the current location of the communication terminal 100 owned by a user with permission is managed as personal information of the user with permission in the first server 200.

Figure 35B:
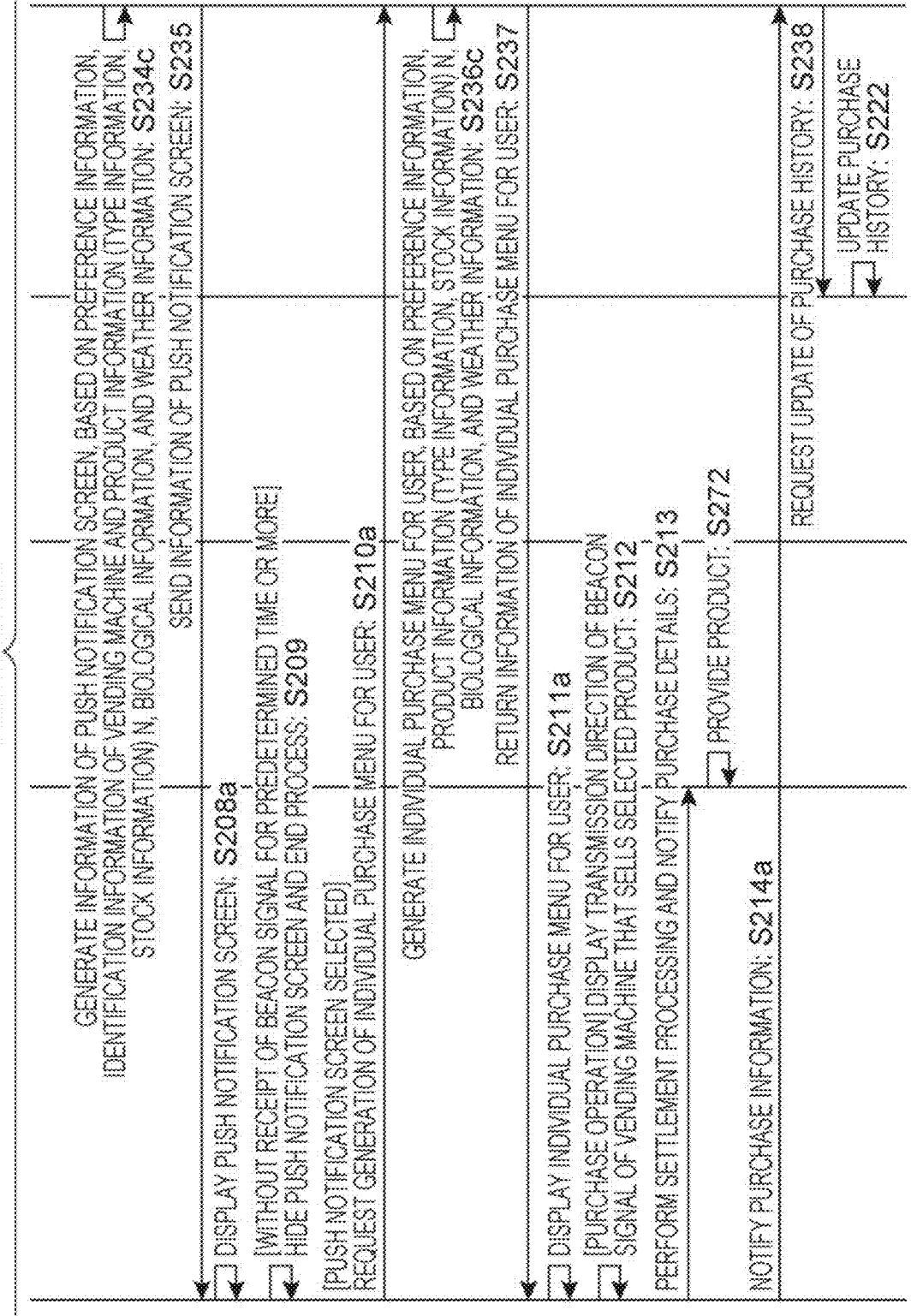

An overview of a process performed in the vending machine management system in the ninth embodiment will be described below. In the description below, a description of processing having the same details as those of the seventh embodiment is omitted as appropriate. FIGS. 35A and 35B are a sequence diagram illustrating an example of the overview of the process performed in the vending machine management system in the ninth embodiment.

As illustrated in FIG. 35A, the proximity communication unit 707 of each of the vending machines 700 included in the vending machine management system periodically transmits a beacon signal (step S271) as in the seventh embodiment.

The business entity X application is executed in the communication terminal 100, so that step S201 is performed as in the seventh embodiment. Thus, information indicating the distance to the vending machine 700 that is the transmission source of the beacon signal and the transmission direction of the beacon signal is stored in the memory 102. Step S202 is performed, so that the identification information for identifying the vending machine 700 and the product information including the type information and the stock information are stored in the memory 102.

After step S202, if the preference information of the user of the communication terminal 100 is stored in the memory 102 ([preference information stored]), the computation unit 104 acquires the preference information of the user of the communication terminal 100 stored in the memory 102 (step S205a).

The computation unit 104 then controls the communication unit 101 to send, to the business entity management server 300, pieces of information stored in the memory 102, i.e., the identification information for identifying the communication terminal 100 including the user ID, the information that indicates the distance to each vending machine 700 which is the transmission source of the beacon signal and the transmission direction of the beacon signal and that is acquired in step S201, the preference information acquired in step S205a, and the identification information of the vending machine 700 which is the transmission source of the beacon signal and the product information that are acquired in step S202 (step S203a).

In response to this, in the business entity management server 300, based on the identification information of the vending machine 700 and the product information acquired via the communication unit 301, the computation unit 302 updates the product information of the vending machine 700 corresponding to the identification information and stored in the memory 303.

In this way, each time the proximity communication unit 107 of the communication terminal 100 receives a beacon signal transmitted from the proximity communication unit 707 of the vending machine 700, the processing from step S201 to step S203a is repeated in response to the receipt.

If the proximity communication unit 107 of the communication terminal 100 receives beacon signals transmitted from the proximity communication unit 707 of the plurality of vending machines 700, the computation unit 104 may execute merely steps S201 and S202 in response to the receipt of each beacon signal, and perform each of steps S205a and S203a just once. Thus, the computation unit 104 may collectively send the identification information for identifying the communication terminal 100 including the user ID, the preference information acquired in step S205a, and the pieces of information acquired in steps S201 and S202 to the business entity management server 300 in single step S203a.

Suppose that the business entity X that provides the business entity X application has an affiliation with the managing business entity of the first server 200 and that the business entity X is permitted to acquire personal information of each user stored in the first server 200. In this case ([with affiliation between business entities]), the computation unit 302 of the business entity management server 300 controls the communication unit 301 to send, together with the identification information for identifying the communication terminal 100 acquired from the communication terminal 100, a signal requesting the preference information and the biological information of the user identified by the user ID included in the identification information and the history 2210 (FIG. 20) of the weather information of the current location of the communication terminal 100 owned by the user to the first server 200 (step S231e).

In the first server 200, in response to the communication unit 201 receiving the identification information for identifying the communication terminal 100 (including the user ID for identifying the user) and the signal requesting sending of the preference information and the biological information of the user and the history 2210 (FIG. 20) of the weather information, which are sent in step S231e, the computation unit 202 performs step S221e (step S221e).

Specifically, in step S221e, if the computation unit 202 determines that the user indicated by the user ID included in the identification information received by the communication unit 201 is a user with permission ([with permission of user]), the computation unit 202 controls the communication unit 201 to return the preference information and the biological information of the user with permission and the history 2210 (FIG. 20) of the weather information that are acquired from the memory 203 to the business entity management server 300. On the other hand, if the computation unit 202 determines that the user is not a user with permission ([otherwise]), the computation unit 202 controls the communication unit 201 to return information indicating that the personal information is inaccessible to the business entity management server 300. The returned information is received and output to the computation unit 302 by the communication unit 301 of the business entity management server 300.

If the computation unit 202 determines that the user is not a user with permission ([otherwise]), the computation unit 202 may control the communication unit 201 to send a message for checking whether to permit the business entity management server 300 to read the personal information, to the communication terminal 100 indicated by the identification information acquired from the business entity management server 300. Suppose that in response to this, the computation unit 202 acquires a reply indicating permission from the communication terminal 100 via the communication unit 201. In this case, the computation unit 202 may acquire, from the memory 203, the preference information and the biological information of the user indicated by the user ID included the received identification information and the history 2210 (FIG. 20) of the weather information in step S221e. The computation unit 202 then may cause the communication unit 201 to return the acquired information to the business entity management server 300.

Next, the computation unit 302 performs step S233 to acquire the weather information of the current location of the communication terminal 100 (step S233).

Specifically, in step S233, the computation unit 302 acquires, from the memory 303, location information that indicates a location where any one of the vending machines 700 is installed and that is associated with the identification information of the one of the vending machines 700 received from the communication terminal 100. Thus, the computation unit 302 acquires the location information indicating the installed location of the one of the vending machines 700 located near the communication terminal 100, as the location information indicating the current location of the communication terminal 100.

The computation unit 302 then controls the communication unit 301 to send, together with the acquired location information, a signal requesting acquisition of weather information of a region including the location indicated by the location information to the second server 500. If the weather information of the region including the installed location of the one of the vending machines 700 is returned from the second server 500 in response to this, the computation unit 302 acquires the returned weather information as the weather information of the current location of the communication terminal 100 via the communication unit 301.

In step S233, the computation unit 302 may control the communication unit 301 to send, together with the location information of the current location of the communication terminal 100, a signal requesting weather information of a region including the location indicated by the location information to the second server 500. Thus, the computation unit 302 may directly acquire the weather information of the current location of the communication terminal 100 from the second server 500. In step S203a, the computation unit 104 may control the communication unit 101 to send the location information of the current location of the communication terminal 100 to the business entity management server 300 together with the identification information for identifying the communication terminal 100 including the user ID and so on. The computation unit 302 may acquire the sent location information of the current location of the communication terminal 100 via the communication unit 301.

As in the first embodiment, in response to receipt of the signal requesting acquisition of the weather information of the current location of the communication terminal 100 via the communication unit 501, the computation unit 502 of the second server 500 reads, from the memory 503, weather information associated with date and time information indicating the most recent date and time, for example, from among pieces of weather information of the region including the location indicated by the location information included in the signal, and causes the communication unit 501 to return the read weather information. The acquisition method is not limited to this. The computation unit 502 may read one or more pieces of weather information associated with date and time information indicating a past predetermined period from the reception time of the signal, for example, from among the pieces of weather information, stored in the memory 503, of the region including the location indicated by the location information included in the signal received by the communication unit 501, and cause the communication unit 501 to return the read one or more pieces of weather information.

If the weather information of the current location of the communication terminal 100 is included in the weather information acquired by the business entity management server 300 from the first server 200 in step S221e, step S233 may be skipped. If the latest date and time information in the field "date and time information" among the weather information acquired by the business entity management server 300 from the first server 200 in step S221e is sufficiently close to the current time (for example, within an hour or 15 minutes from the current time), the weather information corresponding to the latest date and time information may be handled as the weather information of the current location of the communication terminal 100 and step S233 may be skipped.

Next, the computation unit 302 generates the push notification screen 800, based on each combination of the identification information of the vending machines 700 and the type information and the stock information included in the product information, the preference information, the biological information, and the weather information that are acquired in the preceding steps (step S234c). Each combination of the identification information of the vending machines 700 and the type information and the stock information included in the product information is a combination sent and acquired via the communication unit 301 in step S203a. The preference information is the preference information sent and acquired via the communication unit 301 in step S203a and the preference information returned and acquired via the communication unit 301 in step S221e. The weather information is the history 2210 (FIG. 20) of the weather information returned and acquired via the communication unit 301 in step S221e and the weather information acquired in step S233.

In the ninth embodiment, in step S234c, the computation unit 302 performs the drink determination process (steps S501 to S504 (FIG. 32)) by using each combination of the identification information of the vending machine 700 and the type information and the stock information included in the product information, the preference information, the biological information, and the weather information. Thus, the computation unit 302 generates a message that recommends a drink corresponding to a record in which "1" is stored in the field "priority" of the work table 2600 (FIG. 33), as the message 820 included in the push notification screens 800B and 800C illustrated in FIGS. 9 and 11, respectively. The computation unit 302 also generates a product image representing the drink corresponding to the record in which "1" is stored in the field "priority" of the work table 2600 (FIG. 33), as the icon image 840 of the push notification screens 800B and 800C illustrated in FIGS. 9 and 11, respectively.

The computation unit 302 then controls the communication unit 301 to send information representing the push notification screen 800 generated in step S234c to the communication terminal 100 (step S235).

On the other hand, in the communication terminal 100, in response to acquiring, via the communication unit 101, the information representing the push notification screen 800 sent in step S235, the computation unit 104 displays the push notification screen 800 represented by the acquired information on the display 105 of the communication terminal 100 (step S208a).

If receipt of a beacon signal by the proximity communication unit 107 is not detected for a predetermined time or more since the push notification screen 800 is displayed in step S208a, ([without receipt of beacon signal for predetermined time or more]), the computation unit 104 performs processing of hiding the displayed push notification screen 800 to hide the push notification screen 800. The computation unit 104 then ends the process (step S209). After ending the process, the computation unit 104 returns to a state of waiting for receipt of a beacon signal by the proximity communication unit 107.

On the other hand, if the user performs an operation (for example, a touch operation) of selecting the push notification screen 800 by using the operation unit 106 ([push notification screen selected]), the computation unit 104 controls the communication unit 101 to send a signal requesting generation of the individual purchase menu 900 for the user of the communication terminal 100 to the business entity management server 300 (step S210*a*). The signal requesting generation of the individual purchase menu 900 for the user is received and output to the computation unit 302 by the communication unit 301 of the business entity management server 300.

In response to acquiring, via the communication unit 301, the signal requesting generation of the individual purchase menu 900 for the user of the communication terminal 100 sent in step S210*a*, the computation unit 302 generates the individual purchase menu 900 for the user of the communication terminal 100, based on the type information and the stock information included in the product information, the preference information, the biological information, and the weather information that are used in step S234*c* (step S236*c*).

In the ninth embodiment, in step S236*c*, the computation unit 302 refers to the work table 2600 (FIG. 33) obtained by performing the drink determination process (steps S501 to S504 (FIG. 32)) in step S234*c* by using each combination of the identification information of the vending machine 700 and the type information and stock information included in the product information described above, the preference information, the biological information, and the weather information. The computation unit 302 then generates the individual purchase menu 900 in which the tile objects 901 (such as FIG. 12) representing the drinks corresponding to the respective records in which the priorities are stored in the field "priority" are arranged according to the stored priorities.

The computation unit 302 then controls the communication unit 301 to send information representing the individual purchase menu 900 for the user of the communication terminal 100, generated in step S236*c*, to the communication terminal 100 (step S237).

In the communication terminal 100, in response to acquiring, via the communication unit 101, the information representing the individual purchase menu 900 for the user of the communication terminal 100 sent in step S237, the computation unit 104 displays the individual purchase menu 900 for the user of the communication terminal 100 represented by the acquired information on the display 105 of the communication terminal 100 (step S211*a*).

After step S211*a*, as in the seventh embodiment, steps S212, S213, and S272 are performed, so that the drink purchased by the user is provided to the user.

After step S213, the computation unit 104 of the communication terminal 100 controls the communication unit 101 to send the purchase information of the drink to the business entity management server 300 (step S214*a*). Thus, in the business entity management server 300, the purchase information of the drink sent in step S214*a* is received and output to the computation unit 302 by the communication unit 301. The purchase information of the drink includes the user ID of the user of the communication terminal 100, the date and time information indicating the purchase date and time of the drink by the user, the identification information for identifying the vending machine 700 from which the user purchased the drink, and the type information indicating the type of the drink purchased by the user.

In response to acquiring the purchase information of the drink from the communication unit 301, the computation unit 302 of the business entity management server 300 causes the communication unit 301 to send a signal requesting update of the purchase history information of the user of the communication terminal 100 to the first server 200 together with the acquired purchase information of the drink (step S238). In response to this, step S222 is performed in the first server 200 as in the seventh embodiment, and if the user of the communication terminal 100 is a user with permission, the purchase history information of the user with permission stored in the memory 203 is updated.

Tenth Embodiment

A tenth embodiment of the present disclosure will be described below. In the ninth embodiment, an example has been described in which the business entity management server 300 acquires the biological information of the user of the communication terminal 100 from the first server 200. The tenth embodiment is different from the ninth embodiment in that the business entity management server 300 requests the sensor application in the communication terminal 100 to send the biological information of the user of the communication terminal 100 and acquires the biological information from the sensor application.

In the tenth embodiment, the memory 102 of the communication terminal 100 has a table having the same configuration as the biological information table 2300 illustrated in FIG. 25 as in the eighth embodiment. For convenience of explanation, the table is hereinafter referred to as the biological information table 2300. As in the eighth embodiment, the sensor application collects the biological information of the user of the communication terminal 100 periodically measured by the biological sensor 600, and stores the collected biological information in the biological information table 2300 (FIG. 25) in time series in association with the user ID of the user and the measurement date and time information indicating the measurement date and time of the biological information.

Figure 36B:
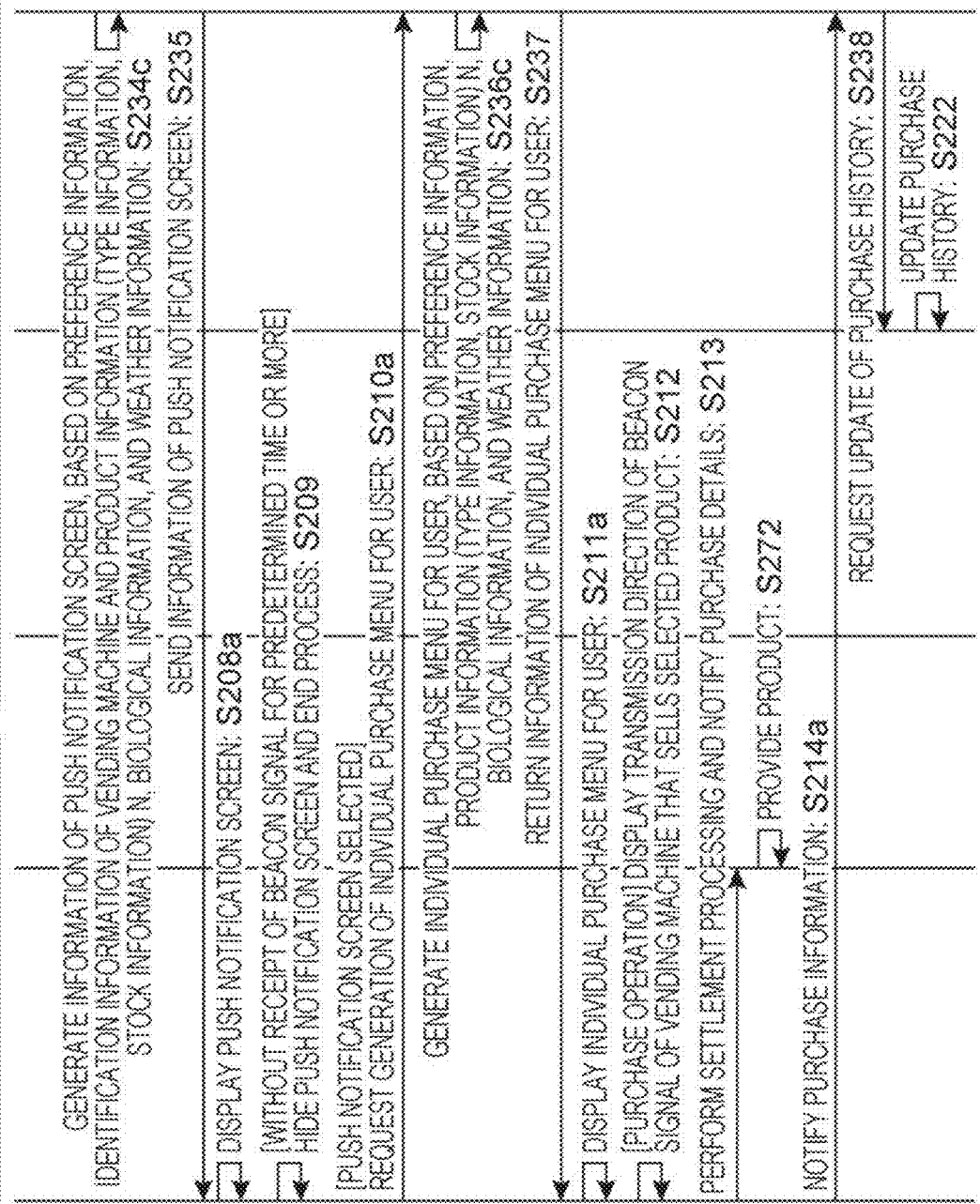

An overview of a process performed in the vending machine management system in the tenth embodiment will be described below. In the description below, a description of processing having the same details as those of the ninth embodiment is omitted as appropriate. FIGS. 36A and 36B are a sequence diagram illustrating an example of the overview of the process performed in the vending machine management system in the tenth embodiment.

As illustrated in FIGS. 36A, in the tenth embodiment, step S231 is performed instead of step S231*e* (FIG. 35A) in the ninth embodiment.

Specifically, suppose that the business entity X that provides the business entity X application has an affiliation with the managing business entity of the first server 200 and that the business entity X is permitted to acquire personal information of each user stored in the first server 200 via the business entity management server 300. In this case ([with affiliation between business entities]), the computation unit 302 of the business entity management server 300 controls the communication unit 301 to send, together with the identification information for identifying the communication terminal 100 acquired from the communication terminal 100, a signal requesting sending of the preference information of the user identified by the user ID included in the identification information and the history 2210 (FIG. 20) of the weather information of the current location of the communication terminal 100 owned by the user to the first server 200 (step S231).

In the first server 200, in response to the communication unit 201 receiving the identification information for identifying the communication terminal 100 (including the user ID for identifying the user) and the signal requesting sending of the preference information of the user and the history 2210 (FIG. 20) of the weather information, which are sent in step S231, the computation unit 202 performs step S221a instead of step S221e (FIG. 35A) in the ninth embodiment (step S221a).

Specifically, in step S221a, if the computation unit 202 determines that the user indicated by the user ID included in the identification information received by the communication unit 201 is a user with permission ([with permission of user]), the computation unit 202 controls the communication unit 201 to return the preference information of the user with permission and the history 2210 (FIG. 20) of the weather information that are acquired from the memory 203 to the business entity management server 300. On the other hand, if the computation unit 202 determines that the user is not a user with permission ([otherwise]), the computation unit 202 controls the communication unit 201 to return information indicating that the personal information is inaccessible to the business entity management server 300. The returned information is received and output to the computation unit 302 by the communication unit 301 of the business entity management server 300.

If the computation unit 202 determines that the user is not a user with permission ([otherwise]), the computation unit 202 may control the communication unit 201 to send a message for checking whether to permit the business entity management server 300 to read the personal information, to the communication terminal 100 indicated by the identification information acquired from the business entity management server 300. Suppose that in response to this, the computation unit 202 acquires a reply indicating permission from the communication terminal 100 via the communication unit 201. In this case, the computation unit 202 may acquire, from the memory 203, the preference information included in the personal information of the user indicated by the user ID included in the identification information received in step S231 and the history 2210 (FIG. 20) of the weather information. The computation unit 202 then may cause the communication unit 201 to return the acquired information to the business entity management server 300.

Next, the computation unit 302 requests the communication terminal 100 indicated by the terminal ID included in the identification information for identifying the communication terminal 100 acquired in step S203a to send the biological information of the user of the communication terminal 100, and acquires the biological information of the user of the communication terminal 100 returned in response the request (step S239).

Specifically, in step S239, the computation unit 302 controls the communication unit 301 to send a signal requesting sending of the biological information of the user of the communication terminal 100 to the communication terminal 100 indicated by the terminal ID included in the identification information for identifying the communication terminal 100 acquired in step S203a. In the communication terminal 100, in response to the communication unit 101 receiving the signal requesting sending of the biological information of the user of the communication terminal 100, the communication unit 101 notifies the computation unit 104 of the receipt. In response to receiving the notification, the computation unit 104 executes the sensor application to acquire records including the user ID of the user of the communication terminal 100 in the biological information table 2300 (FIG. 25) in the memory 102, as the biological information of the user. The computation unit 104 then causes the communication unit 101 to return the acquired biological information. In response to this, the computation unit 302 of the business entity management server 300 acquires, via the communication unit 301, the biological information of the user of the communication terminal 100 returned from the communication terminal 100. Thereafter, the processing of step S233 and subsequent steps is performed as in the ninth embodiment.

In the tenth embodiment, in step S234c, the computation unit 302 performs the drink determination process (steps S501 to S504 (FIG. 32)) by using each combination of the identification information of the vending machine 700 and the type information and the stock information included in the product information, which are sent and acquired via the communication unit 301 in step S203a, the preference information sent and acquired via the communication unit 301 in step S203a, the preference information returned and acquired via the communication unit 301 in step S221a, the biological information acquired in step S239, the history 2210 (FIG. 20) of the weather information returned and acquired via the communication unit 301 in step S221a, and the weather information acquired in step S233.

If the weather information of the current location of the communication terminal 100 is included in the weather information acquired by the business entity management server 300 from the first server 200 in step S221a, step S233 may be skipped. If the latest date and time information in the field "date and time information" among the weather information acquired by the business entity management server 300 from the first server 200 in step S221a is sufficiently close to the current time (for example, within an hour or 15 minutes from the current time), the weather information corresponding to the latest date and time information may be handled as the weather information of the current location of the communication terminal 100 and step S233 may be skipped.

In step S236c, the computation unit 104 generates the individual purchase menu 900 with reference to the work table 2600 (FIG. 33) obtained by performing the drink determination process (steps S501 to S504 (FIG. 32)) in step S234c by using the type information and stock information included in the product information described above, the preference information, the biological information, and the weather information.

The seventh embodiment to the tenth embodiment include other aspects of the present disclosure described below.

A control method according to another first aspect of the present disclosure is a control method executed in a communication terminal, the control method including causing a computer of the communication terminal to perform a process including:

acquiring, in response to receipt of a beacon signal transmitted from a vending machine of drinks, i) identification information for identifying the vending machine, ii) type information indicating types of a plurality of drinks stored in the vending machine, and iii) stock information indicating quantities of stock of the plurality of drinks stored in the vending machine from the vending machine of drinks by using short-range wireless communication;

acquiring preference information on drinks of a user of the communication terminal;

acquiring weather information of a current location of the communication terminal via a network;

acquiring current biological information of the user;

generating a push notification screen, based on the identification information, the type information, the stock information, the preference information, the weather information, and the biological information, the push notification screen being a screen that recommends at least one drink that matches a preference of the user indicated by the preference information in relation to weather, indicated by the weather information, at the current location of the communication terminal and to a current physical condition of the user indicated by the biological information from among the plurality of drinks stored in the vending machine indicated by the identification information; and displaying the push notification screen on a display of the communication terminal.

The "acquiring weather information of a current location of the communication terminal via a network" includes acquiring weather information corresponding to an installed location of the vending machine indicated by the identification information via a network and acquiring this weather information as the weather information of the current location of the communication terminal.

According to this aspect, the push notification screen that recommends at least one drink that matches the preference of the user is displayed on the display of the communication terminal of the user in response to the user merely passing in front of the vending machine of drinks, irrespective of a purchase intention of the user.

A purchase menu from the vending machine of drinks is not displayed but merely the push notification screen for displaying the purchase menu is displayed. Thus, irksomeness caused by the purchase menu from the vending machine being displayed irrespective of the absence of the purchase intention of the user can be reduced.

The push notification screen is generated by taking into account the preference information on drinks of the user, the weather information of the current location of the communication terminal, and the current physical condition of the user. Thus, a drink can be recommended that matches the preference of the user at a timing when the user passes in front of or is near the vending machine.

When the user purchases the recommended drink, the user displays the purchase menu according to their will. Thus, the user takes the initiative in determining whether to display the purchase menu.

Thus, a drink can be recommended that matches the preference of the user at a timing when the user passes in front of the vending machine while reducing irksomeness caused by the purchase menu of drinks being displayed on the display of the communication terminal against the intention of the user.

In the control method described above, the push notification screen may be used for displaying, on the display of the communication terminal, a purchase menu that allows the at least one drink to be purchased from among the plurality of drinks stored in the vending machine.

According to this aspect, a user who wishes to purchase a drink after viewing the push notification screen can use the push notification screen to display, on the display, the purchase menu that allows the user to purchase the at least one drink that matches the preference of the user. Thus, the user who wishes to purchase a drink after viewing the push notification screen can quickly purchase the at least one drink that matches the preference of the user.

In the control method described above, the process may further include generating, in response to the push notification screen displayed on the display of the communication terminal being selected, an individual purchase menu for the user, based on the type information, the stock information, the preference information, the weather information, and the biological information, the individual purchase menu being a menu displaying drinks that match the preference of the user indicated by the preference information in order according to a degree of matching the preference of the user in relation to the weather, indicated by the weather information, at the current location of the communication terminal and the current physical condition of the user indicated by the biological information from among the plurality of drinks stored in the vending machine indicated by the identification information; and displaying the individual purchase menu on the display of the communication terminal.

According to this aspect, by selecting the push notification screen, the user who wishes to purchase a drink after viewing the push notification screen can display, on the display, the individual purchase menu that displays drinks that match the preference of the user in order according to a degree of matching the preference of the user in relation to the weather at the current location and to the current physical condition of the user. Thus, the user who wishes to purchase a drink after viewing the push notification screen can browse the drinks that match the preference of the user under the weather at that time and the physical condition of the user in order according to the degree of matching the preference of the user and can purchase any of the drinks.

In the control method described above, the process may further include displaying, on the display on which the push notification screen is displayed, a direction indication indicating a transmission direction of the beacon signal transmitted from the vending machine of drinks.

According to this aspect, the direction indication indicating the transmission direction of the beacon signal transmitted from the vending machine of drinks is displayed on the display on which the push notification screen is displayed. Thus, the user of the communication terminal can easily grasp the direction in which the vending machine that sells the drink recommended in the push notification screen is present.

In the control method described above, the process may further include displaying, on the display on which the individual purchase menu is displayed, a direction indication indicating a transmission direction of the beacon signal transmitted from the vending machine of drinks.

According to this aspect, the direction indication indicating the transmission direction of the beacon signal transmitted from the vending machine of drinks is displayed on the display on which the individual purchase menu is displayed. Thus, the user of the communication terminal can easily grasp the direction in which the vending machine storing the drinks displayed in the individual purchase menu is present.

In the control method described above, the process may further include receiving a beacon signal transmitted from the vending machine of drinks; and hiding the displayed push notification screen in response to an elapse of a predetermined time during which receipt of the beacon signal is not detected.

According to this aspect, if receipt of a beacon signal transmitted from the vending machine of drinks is not detected for the predetermined time, the displayed push notification screen is hidden. Thus, when the predetermined time elapses since the user moves to a place where the beacon signal is not receivable and the user presumably does not wish to purchase any drink from the vending machine, the push notification screen that recommends a drink being kept uselessly displayed on the display can be avoided.

In the control method described above, the preference information on drinks of the user may be stored in the first server that stores the personal information of the user and may be acquired from the first server.

According to this aspect, the preference information on drinks of the user of the communication terminal is acquired from the first server that stores the personal information of the user. Thus, providing a configuration necessary for storing the preference information on drinks of the user in the communication terminal can be omitted.

In the control method described above, the weather information of the current location of the communication terminal may be acquired from a second server that stores the weather information.

The "weather information of the current location of the communication terminal" includes weather information corresponding to an installed location of the vending machine indicated by the identification information. The "second server that stores the weather information" includes the first server that stores, as the personal information of the user, a history of the weather information of the current location of the communication terminal owned by the user.

According to this aspect, the weather information of the current location of the communication terminal is acquired from the second server that stores the weather information. Thus, providing a configuration necessary for storing the weather information of the current location of the communication terminal in the communication terminal can be omitted.

In the control method described above, the weather information of the current location of the communication terminal may include at least one of a temperature, a humidity, a heat index, a solar radiation, or a weather type.

According to this aspect, the push notification screen is generated by taking into account the preference information on drinks of the user of the communication terminal and at least any one of the temperature, the humidity, the heat index, the solar radiation, or the weather type at the current location of the communication terminal. Thus, drinks can be recommended that match the preference of the user in relation to at least one of the temperature, the humidity, the heat index, the solar radiation, or the weather type at the timing when the user is near the vending machine.

In the control method described above, the current biological information of the user may be stored in the first server and may be acquired from the first server.

According to this aspect, the current biological information of the user of the communication terminal is acquired from the first server that stores the personal information of the user. Thus, providing a configuration necessary for storing the current biological information of the user in the communication terminal can be omitted.

In the control method described above, the current biological information of the user may be acquired from a biological sensor included in the communication terminal.

According to this aspect, the current biological information of the user of the communication terminal is acquired from the biological sensor included in the communication terminal. Thus, the current biological information of the user at the current location of the communication terminal can be acquired.

In the control method described above, the current biological information of the user may be acquired, via the communication terminal, from a biological sensor capable of communicating with the communication terminal.

According to this aspect, the current biological information of the user of the communication terminal is acquired, via the communication terminal, from the biological sensor capable of communicating with the communication terminal. Thus, even if the biological sensor is located at a place away from the communication terminal, the current biological information of the user can be acquired.

In the control method described above, the biological information may include information on at least one of a systolic blood pressure, a diastolic blood pressure, a heart rate, a body water percentage, or a body temperature.

According to this aspect, the push notification screen is generated by taking into account the preference information on the drinks of the user of the communication terminal, the weather at the current location of the communication terminal, and at least one of the systolic blood pressure, the diastolic blood pressure, the heart rate, the body water percentage, or the body temperature of the user. Thus, a drink can be recommended that matches the preference of the user suitable for at least one of the systolic blood pressure, the diastolic blood pressure, the heart rate, the body water percentage, or the body temperature as well as the ambient weather type when the user is near the vending machine.

The present disclosure can also be implemented as a program that causes a computer to execute each characteristic configuration included in the control method according to the other first aspect described above, or as a communication terminal that operates based on this program. Obviously, such a computer program can be distributed via a non-transitory computer-readable recording medium such as a CD-ROM or via a communication network such as the Internet.

A control method according to another second aspect of the present disclosure is a control method executed in a communication terminal, the control method including causing a computer of the communication terminal to perform a process including:

acquiring, in response to receipt of a first beacon signal transmitted from a first vending machine of drinks, i) first identification information for identifying the first vending machine, ii) first type information indicating types of a first group of drinks stored in the first vending machine, and iii) first stock information indicating quantities of stock of the first group of drinks stored in the first vending machine from the first vending machine of drinks by using short-range wireless communication;

acquiring, in response to receipt of a second beacon signal transmitted from a second vending machine of drinks, i) second identification information for identifying the second vending machine, ii) second type information indicating types of a second group of drinks stored in the second vending machine, and iii) second stock information indicating quantities of stock of the second group of drinks stored in the second vending machine from the second vending machine of drinks by using short-range wireless communication;

acquiring preference information on drinks of a user of the communication terminal;

acquiring current biological information of the user;

acquiring weather information of a current location of the communication terminal via a network;

generating a push notification screen, based on the first identification information, the first type information, the first stock information, the second identification information, the second type information, the second stock information, the preference information, the weather information, and the biological information, the push notification screen being a screen that recommends at least one drink that matches a preference of the user indicated by the preference information in relation to weather, indicated by the weather information, at the current location of the communication terminal and to a current physical condition of the user indicated by the biological information from among the first group of drinks stored in the first vending machine indicated by the first identification information and the second group of drinks stored in the second vending machine indicated by the second identification information; and displaying the push notification screen on a display of the communication terminal.

According to this aspect, the push notification screen that recommends at least one drink that matches the preference of the user is displayed on the display of the communication terminal of the user in response to the user merely passing in front of the first vending machine and the second vending machine that respectively sell the first group of drinks and the second group of drinks and are installed adjacently to or in proximity to each other, irrespective of a purchase intention of the user.

A first purchase menu from the first vending machine of the first group of drinks and a second purchase menu from the second vending machine of the second group of drinks are not displayed but merely the push notification screen for recommending purchase is displayed. Thus, irksomeness caused by the first purchase menu and the second purchase menu being displayed irrespective of the absence of the purchase intention of the user can be reduced.

The push notification screen is generated by taking into account the preference information on drinks of the user, the weather information of the current location of the communication terminal, and the current physical condition of the user. Thus, drinks can be recommended that match the preference of the user at a timing when the user passes in front of or is near the first vending machine and the second vending machine from among both the first group of drinks stored in the first vending machine and the second group of drinks stored in the second vending machine.

When the user purchases the recommended drink, the user displays the first purchase menu and the second purchase menu according to their will. Thus, the user takes the initiative in determining whether to display the purchase menus.

Thus, a drink can be recommended that matches the preference of the user at a timing when the user passes in front of the first vending machine and the second vending machine that respectively sell the first group of drinks and the second group of drinks and are installed in adjacently to each other, while reducing irksomeness caused by the purchase menu of drinks being displayed on the display of the communication terminal against the intention of the user.

In the control method described above, the push notification screen may be used for displaying, on the display of the communication terminal, a purchase menu that allows the at least one drink to be purchased from among the first group of drinks stored in the first vending machine and the second group of drinks stored in the second vending machine.

According to this aspect, a user who wishes to purchase a drink after viewing the push notification screen can use the push notification screen to display, on the display, the purchase menu that allows the user to purchase the at least one drink that matches the preference of the user from among the first group of drinks stored in the first vending machine and the second group of drinks stored in the second vending machine. Thus, the user who wishes to purchase a drink after viewing the push notification screen can quickly purchase the at least one drink that matches the preference of the user without any effort to display the individual purchase menu from the vending machine.

In the control method described above, the process may further include generating, in response to the push notification screen displayed on the display of the communication terminal being selected, an individual purchase menu for the user, based on the first type information, the first stock information, the second type information, the second stock information, the preference information, the weather information, and the biological information, the individual purchase menu being a menu displaying drinks that match the preference of the user indicated by the preference information in order according to a degree of matching the preference of the user in relation to the weather, indicated by the weather information, at the current location of the communication terminal and to the current physical condition of the user indicated by the biological information from among the first group of drinks stored in the first vending machine indicated by the first identification information and the second group of drinks stored in the second vending machine indicated by the second identification information; and displaying the individual purchase menu on the display of the communication terminal.

According to this aspect, by selecting the push notification screen, the user who wishes to purchase a drink after viewing the push notification screen can display, on the display, the individual purchase menu that displays drinks that match the preference of the user in order according to a degree of matching the preference of the user in relation to the weather at the current location and to the current physical condition of the user. Thus, the user who wishes to purchase a drink after viewing the push notification screen can purchase a drink that matches the preference of the user under the weather and the physical condition of the user at that time while being sensible of the order of the degree of matching the preference of the user.

In the control method described above, the process may further include displaying, on the display on which the push notification screen is displayed, at least one of a first direction indication indicating a transmission direction of the first beacon signal transmitted from the first vending machine or a second direction indication indicating a transmission direction of the second beacon signal transmitted from the second vending machine.

According to this aspect, at least one of the first direction indication indicating the transmission direction of the first beacon signal transmitted from the first vending machine or the second direction indication indicating the transmission direction of the second beacon signal transmitted from the second vending machine is displayed on the display on which the push notification screen is displayed. Thus, the user of the communication terminal can easily grasp the direction in which at least one of the first vending machine or the second vending machine recommended in the push notification screen is present.

In the control method described above, when one drink is displayed in the push notification screen, a direction indication indicating a transmission direction of a beacon signal transmitted from the vending machine storing the one drink may be displayed together with the one drink.

According to this aspect, the user can easily grasp the direction of the vending machine storing the drink recommended in the push notification screen.

In the control method described above, the process may further include, in response to one drink being selected using the individual purchase menu displayed on the display, based on a transmission direction of the first beacon signal or the second beacon signal transmitted from one vending machine storing the one drink among the first vending machine and the second vending machine, displaying, on the display on which the individual purchase menu is displayed, a direction indication indicating the one vending machine storing the one drink among the first vending machine and the second vending machine.

According to this aspect, when one drink is selected using the individual purchase menu, the direction indication indicating the one vending machine storing the one drink among the first vending machine and the second vending machine is displayed on the display on which the individual purchase menu is displayed. Thus, the user of the communication terminal can easily grasp the direction in which the vending machine storing the one drink selected using the individual purchase menu is present.

The present disclosure can also be implemented as a program that causes a computer to execute each characteristic configuration included in the control method according to the other second aspect described above, or as a communication terminal that operates based on this program. Obviously, such a computer program can be distributed via a non-transitory computer-readable recording medium such as a CD-ROM or via a communication network such as the Internet.

An information providing method according to another third aspect of the present disclosure is an information providing method for a vending machine management system that manages stock information for a vending machine for drinks, the information providing method including:

acquiring, from a communication terminal via a network, i) first identification information for identifying the communication terminal, ii) second identification information for identifying the vending machine, iii) type information indicating types of a plurality of drinks stored in the vending machine, and iv) the stock information indicating quantities of stock of the plurality of drinks stored in the vending machine, ii) the second identification information, iii) the type information, and the iv) the stock information being acquired in the communication terminal from the vending machine of drinks by using short-range wireless communication in response to receipt of a beacon signal transmitted from the vending machine of drinks;

acquiring preference information on drinks of a user of the communication terminal;

acquiring weather information of a current location of the communication terminal via the network;

acquiring current biological information of the user via the network;

generating information of a push notification screen, based on the second identification information, the type information, the stock information, the preference information, the weather information, and the biological information, the push notification screen being a screen that recommends at least one drink that matches a preference of the user indicated by the preference information in relation to weather, indicated by the weather information, at the current location of the communication terminal and to a current physical condition of the user indicated by the biological information from among the plurality of drinks stored in the vending machine indicated by the second identification information; and outputting the information of the push notification screen to the communication terminal to display the push notification screen on a display of the communication terminal.

The "weather information of a current location of the communication terminal" includes weather information corresponding to an installed location of the vending machine indicated by the second identification information.

According to this aspect, the push notification screen that recommends at least one drink that matches the preference of the user is displayed on the display of the communication terminal of the user in response to the user merely passing in front of or being near the vending machine of drinks, irrespective of a purchase intention of the user.

A purchase menu from the vending machine of drinks is not displayed but merely the push notification screen for displaying the purchase menu is displayed. Thus, irksomeness caused by the purchase menu from the vending machine being displayed irrespective of the absence of the purchase intention of the user can be reduced.

The push notification screen is generated by taking into account the preference information on drinks of the user, the weather information of the current location of the communication terminal, and the current physical condition of the user. Thus, a drink can be recommended that matches the preference of the user at a timing when the user passes in front of the vending machine.

When the user purchases the recommended drink, the user displays the purchase menu according to their will. Thus, the user takes the initiative in determining whether to display the purchase menu.

Thus, a drink can be recommended that matches the preference of the user at a timing when the user passes in front of or is near the vending machine while reducing irksomeness caused by the purchase menu of drinks being displayed on the display of the communication terminal against the intention of the user.

In the information providing method described above, the push notification screen may be used for displaying, on the display of the communication terminal, a purchase menu that allows the at least one drink to be purchased from among the plurality of drinks stored in the vending machine.

According to this aspect, a user who wishes to purchase a drink after viewing the push notification screen can use the push notification screen to display, on the display, the purchase menu that allows the user to purchase the at least one drink that matches the preference of the user. Thus, the user who wishes to purchase a drink after viewing the push notification screen can quickly purchase the at least one drink that matches the preference of the user.

In the information providing method described above, the process may further include: acquiring, from the communication terminal, information indicating that the push notification screen displayed on the display is selected;

generating information of an individual purchase menu for the user, based on the type information, the stock information, the preference information, the weather information, and the biological information, the individual purchase menu for the user being a menu displaying drinks that match the preference of the user indicated by the preference information in order according to a degree of matching the preference of the user in relation to weather, indicated by the weather information, at the current location of the communication terminal and to the current physical condition of the user indicated by the biological information from among the plurality of drinks stored in the vending machine indicated by the second identification information; and outputting the information of the individual purchase menu to the communication terminal to display the individual purchase menu on the display of the communication terminal.

The "weather at the current location of the communication terminal" includes weather corresponding to the installed location of the vending machine indicated by the second identification information.

According to this aspect, by selecting the push notification screen, the user who wishes to purchase a drink after viewing the push notification screen can display, on the display, the individual purchase menu that displays drinks that match the preference of the user in order according to a degree of matching the preference of the user in relation to the weather at the current location and to the current physical condition of the user. Thus, the user who wishes to purchase a drink after viewing the push notification screen can purchase a drink that matches the preference of the user under the weather and the physical condition of the user at that time while being sensible of the order of the degree of matching the preference of the user.

In the information providing method described above, the preference information on drinks of the user may be stored in the first server that stores the personal information of the user and may be acquired from the first server.

According to this aspect, the preference information on drinks of the user of the communication terminal is acquired from the first server that stores the personal information of the user. Thus, providing a configuration necessary for storing the preference information on drinks of the user in the communication terminal can be omitted.

In the information providing method described above, the weather information of the current location of the communication terminal may be acquired from a second server that stores the weather information.

The "weather information of the current location of the communication terminal" includes weather information of the installed location of the vending machine indicated by the identification information. The "second server that stores the weather information" includes the first server that stores, as the personal information of the user, a history of the weather information of the current location of the communication terminal owned by the user.

According to this aspect, the weather information of the current location of the communication terminal is acquired from the second server that stores the weather information. Thus, providing a configuration necessary for storing the weather information of the current location of the communication terminal in the communication terminal can be omitted.

In the information providing method described above, the weather information of the current location of the communication terminal may include at least one of a temperature, a humidity, a heat index, a solar radiation, or a weather type.

According to this aspect, the push notification screen is generated by taking into account the preference information on drinks of the user of the communication terminal and at least one of the temperature, the humidity, the heat index, the solar radiation, or the weather type at the current location of the communication terminal. Thus, a drink can be recommended that matches the preference of the user in relation to at least one of the temperature, the humidity, the heat index, the solar radiation, or the weather type at the timing when the user passes in front of or is near the vending machine.

In the information providing method described above, the current biological information of the user may stored in the first server and may be acquired from the first server.

According to this aspect, the current biological information of the user of the communication terminal is acquired from the first server that stores the personal information of the user. Thus, providing a configuration necessary for storing the current biological information of the user in the communication terminal can be omitted.

In the information providing method described above, the communication terminal may include a biological sensor, and the current biological information of the user may be acquired from the communication terminal including the biological sensor.

According to this aspect, the current biological information of the user of the communication terminal is acquired from the communication terminal including the biological sensor. Thus, the current biological information of the user at the current location of the communication terminal can be acquired.

In the information providing method described above, the communication terminal is capable of communicating with a biological sensor, and the current biological information of the user may be acquired from the biological sensor via the communication terminal.

According to this aspect, the current biological information of the user of the communication terminal is acquired, via the communication terminal, from the biological sensor capable of communicating with the communication terminal. Thus, even if the biological sensor is located at a place away from the communication terminal, the current biological information of the user can be acquired.

In the information providing method described above, the biological information may include information on at least one of a systolic blood pressure, a diastolic blood pressure, a heart rate, a body water percentage, or a body temperature.

According to this aspect, the push notification screen is generated by taking into account the preference information on the drinks of the user of the communication terminal, the weather at the current location of the communication terminal, and at least one of the systolic blood pressure, the diastolic blood pressure, the heart rate, the body water percentage, or the body temperature of the user. Thus, a drink can be recommended that matches the preference of the user in relation to at least one of the systolic blood pressure, the diastolic blood pressure, the heart rate, the body water percentage, or the body temperature when the user passes in front of or is near the vending machine.

The present disclosure is useful in recommending, to a user, a product which the user presumably desires at a timing when the user passes in front of a vending machine.

What is claimed is:

1. A method executed in a communication terminal, the communication terminal including a user ID for identifying a user of the communication terminal, the method causing a computer of the communication terminal to perform a process, the process comprising:
acquiring, in response to receipt of a beacon signal from a vending machine, from the vending machine by using short-range wireless communication, i) identification information for identifying the vending machine, ii) type information indicating product names of a plurality of drinks stored in the vending machine, and iii) stock information indicating quantities of stock of the plurality of drinks stored in the vending machine;

transmitting the user ID to a first server that securely manages personal information, the personal information including preference information on drinks of the user of the communication terminal, the preference information on drinks of the user including information on goods purchased by the user at a sales site managed by a business operator affiliated with a management operator of the first server, the preference information being stored by the first server in time series in association with the user ID in advance of the transmitting of the user ID;

acquiring, by the communication terminal and from the first server, the preference information on drinks of the user corresponding to the user ID, when the first server confirms that acquisition of the preference information on drinks of the user is permitted by the user;

acquiring biological information of the user, the biological information being stored in time series in advance of the transmitting of the user ID;

generating a push notification screen, based on the identification information, the type information, the stock information, the preference information, and the biological information, wherein the push notification screen recommends at least one drink that matches a preference of the user indicated by the preference information in relation to a current physical condition of the user indicated by a most recent record of the biological information, from among the plurality of drinks stored in the vending machine indicated by the identification information; and displaying the push notification screen on a display of the communication terminal, wherein, via at least one operation to the communication terminal via at least the push notification screen displayed on the display, the communication terminal is configured to purchase at least one of the plurality of drinks stored in the vending machine, whereby the vending machine is configured to transport the at least one of the plurality of drinks to a pick-up port for receipt by the user.

2. The method according to claim 1, wherein the push notification screen is configured to display, on the display of the communication terminal and in response to a selection by the user, a purchase menu that allows the at least one drink, and others from among the plurality of drinks stored in the vending machine, to be purchased.

3. The method according to claim 1, wherein the process further comprises:

generating, when the push notification screen displayed on the display of the communication terminal is selected, an individual purchase menu for the user, based on the type information, the stock information, the preference information, and the biological information, wherein the individual purchase menu displays drinks that match the preference of the user indicated by the preference information in an order matching the preference of the user in relation to the current physical condition of the user indicated by the biological information, from among the plurality of drinks stored in the vending machine indicated by the identification information; and displaying the individual purchase menu on the display of the communication terminal.

4. The method according to claim 1, wherein the process further comprises:

displaying, on the display on which the push notification screen is displayed, a direction indicating a transmission direction of the beacon signal transmitted from the vending machine.

5. The method according to claim 3, wherein the process further comprises:

displaying, on the display on which the individual purchase menu is displayed, a direction indicating a transmission direction of the beacon signal transmitted from the vending machine.

6. The method according to claim 1, wherein the process further comprises:

receiving the beacon signal from the vending machine; and erasing the display of the push notification screen after receipt of the beacon signal is not detected for a predetermined time.

7. The method according to claim 1, wherein the biological information of the user is stored in the first server and is acquired from the first server.

8. The method according to claim 1, wherein the biological information of the user is acquired from a biological sensor included in the communication terminal.

9. The method according to claim 1, wherein the biological information of the user is acquired, via the communication terminal, from a biological sensor capable of communicating with the communication terminal.

10. The method according to claim 1, wherein the biological information includes information on at least one of a systolic blood pressure, a diastolic blood pressure, a heart rate, a body water percentage, or a body temperature.

11. A communication terminal that executes the method according to claim 1.

12. A non-transitory computer-readable recording medium storing a program for causing the computer of the communication terminal to execute the method according to claim 1.

13. A method executed in a communication terminal, the method causing a computer of the communication terminal to perform a process, the process comprising:

acquiring, in response to receipt of a first beacon signal from a first vending machine, from the first vending machine by using short-range wireless communication, i) first identification information for identifying the first vending machine, ii) first type information indicating product names of a first group of drinks stored in the first vending machine, and iii) first stock information indicating quantities of stock of the first group of drinks stored in the first vending machine;

acquiring, in response to receipt of a second beacon signal from a second vending machine, from the second vending machine by using short-range wireless communication, i) second identification information for identifying the second vending machine, ii) second type information indicating product names of a second group of drinks stored in the second vending machine, and iii) second stock information indicating quantities of stock of the second group of drinks stored in the second vending machine;

transmitting a user ID for identifying a user of the communication terminal to a first server that securely manages personal information, the personal information including preference information on drinks of the user of the communication terminal, the preference information on drinks of the user including information on goods purchased by the user at a sales site managed by a business operator affiliated with a management operator of the first server, the preference information being stored by the first server in time series in association with the user ID in advance of the transmitting of the user ID;

acquiring, by the communication terminal and from the first server, the preference information on drinks of the user corresponding to the user ID, when the first server confirms that acquisition of the preference information on drinks of the user is permitted by the user;

acquiring biological information of the user, the biological information being stored in time series in advance of the transmitting of the user ID;

generating a push notification screen, based on the first identification information, the first type information, the first stock information, the second identification information, the second type information, the second stock information, the preference information, and the biological information, wherein the push notification screen recommends at least one drink that matches a preference of the user indicated by the preference information in relation to a current physical condition of the user indicated by a most recent record of the biological information, from among the first group of drinks stored in the first vending machine indicated by the first identification information and the second group of drinks stored in the second vending machine indicated by the second identification information; and displaying the push notification screen on a display of the communication terminal, wherein the process, via at least one operation to the communication terminal via at least the push notification screen displayed on the display, is further configured to cause the computer to purchase at least one of the plurality of drinks stored in the vending machine, whereby the vending machine is configured to transport the at least one of the plurality of drinks to a pick-up port for receipt by the user.

14. The method according to claim 13, wherein
the push notification screen is configured to display, on the display of the communication terminal and in response to a selection by the user, a purchase menu that allows the at least one drink, and others from among the first group of drinks stored in the first vending machine and the second group of drinks stored in the second vending machine, to be purchased.

15. The method according to claim 13, wherein the process further comprises:
generating, when the push notification screen displayed on the display of the communication terminal is selected, an individual purchase menu for the user, based on the first type information, the first stock information, the second type information, the second stock information, the preference information, and the biological information, wherein the individual purchase menu displays drinks that match the preference of the user indicated by the preference information in an order matching the preference of the user in relation to the current physical condition of the user indicated by the biological information, from among the first group of drinks stored in the first vending machine indicated by the first identification information and the second group of drinks stored in the second vending machine indicated by the second identification information; and displaying the individual purchase menu on the display of the communication terminal.

16. The method according to claim 13, wherein the process further comprises:
displaying, on the display on which the push notification screen is displayed, at least one of a first direction indicating a transmission direction of the first beacon signal transmitted from the first vending machine or a second direction indicating a transmission direction of the second beacon signal transmitted from the second vending machine.

17. The method according to claim 15, wherein the process further comprises:
when one drink is selected using the individual purchase menu displayed on the display,
based on a transmission direction of the first beacon signal or the second beacon signal transmitted from one vending machine storing the one drink among the first vending machine and the second vending machine,
displaying, on the display on which the individual purchase menu is displayed, a direction indicating the one vending machine.

18. A communication terminal that executes the method according to claim 13.

19. A non-transitory computer-readable recording medium storing a program for causing computer of the communication terminal to execute the method according to claim 13.

20. A method for a vending machine management system that manages stock information for a vending machine, the method comprising:
acquiring, from a communication terminal via a network, i) a user ID for identifying a user of the communication terminal, ii) identification information for identifying the vending machine, iii) type information indicating product names of a plurality of drinks stored in the vending machine, and iv) the stock information indicating quantities of stock of the plurality of drinks stored in the vending machine, the identification information, the type information, and the stock information being acquired at the communication terminal from the vending machine by using short-range wireless communication in response to receipt of a beacon signal from the vending machine;

transmitting the user ID to a first server that securely manages personal information, the personal information including preference information on drinks of the user of the communication terminal, the preference information on drinks of the user including information on goods purchased by the user at a sales site managed by a business operator affiliated with a management operator of the first server, the preference information being stored by the first server in time series in association with the user ID in advance of the transmitting of the user ID;

acquiring from the first server, the preference information on drinks of the user corresponding to the user ID, when the first server confirms that acquisition of the preference information on drinks of the user is permitted by the user;

acquiring biological information of the user via a network, the biological information being stored in time series in advance of the transmitting of the user ID;

generating information of a push notification screen, based on the identification information, the type information, the stock information, the preference information, and the biological information, wherein the push notification screen recommends at least one drink that matches a preference of the user indicated by the preference information in relation to a current physical condition of the user indicated by a most recent record of the biological information, from among the plurality of drinks stored in the vending machine indicated by the identification information; and outputting the information of the push notification screen to the communication terminal to display the push notification screen on a display of the communication terminal, wherein the information of the push notification screen, which is output to the communication terminal, is configured to, via at least one operation to the communication terminal via at least the push notification screen displayed on the display, cause at least one of the plurality of drinks stored in the vending machine to be purchased, whereby the vending machine is configured to transport the at least one of the plurality of drinks to a pick-up port for receipt by the user.

21. The method according to claim 20, wherein the push notification screen is configured to display, on the display of the communication terminal and in response to a selection by the user, a purchase menu that allows the at least one drink, and others from among the plurality of drinks stored in the vending machine, to be purchased.

22. The method according to claim 20, further comprising:

acquiring, from the communication terminal, information indicating that the push notification screen displayed on the display is selected;

generating information of an individual purchase menu for the user, based on the type information, the stock information, the preference information, and the biological information, wherein the individual purchase menu for the user displays drinks that match the preference of the user indicated by the preference information in an order matching the preference of the user in relation to the current physical condition of the user indicated by the biological information, from among the plurality of drinks stored in the vending machine indicated by the identification information; and outputting the information of the individual purchase menu to the communication terminal to display the individual purchase menu on the display of the communication terminal.

23. The method according to claim 20, wherein the biological information of the user is stored in the first server and is acquired from the first server.

24. The method according to claim 20, wherein the communication terminal includes a biological sensor, and the biological information of the user is acquired from the communication terminal including the biological sensor.

25. The method according to claim 20, wherein the communication terminal is capable of communicating with a biological sensor, and the biological information of the user is acquired from the biological sensor via the communication terminal.

26. The method according to claim 20, wherein the biological information includes information on at least one of a systolic blood pressure, a diastolic blood pressure, a heart rate, a body water percentage, or a body temperature.

27. A method executed in a communication terminal, the communication terminal including a user ID for identifying a user of the communication terminal, the method causing a computer of the communication terminal to perform a process, the process comprising:

in response to receipt, by using short-range wireless communication, of a beacon signal from a sales site of a business operator that sells drinks, acquiring, from the sales site, i) type information for identifying a plurality of drinks sold at the sales site and ii) stock information of the plurality of drinks sold at the sales site;

transmitting the user ID to a first server that securely manages personal information, the personal information including preference information on drinks of the user and biological information of the user, the preference information being stored by the first server in time series in association with the user ID in advance of the transmitting of the user ID, the biological information being stored by the first server in time series in association with the user ID in advance of the transmitting of the user ID;

acquiring the preference information and the biological information from the first server, the preference information and the biological information being provided in response to confirmation in the first server that the user permits the business operator that sells the drinks to access the preference information and the biological information; and displaying, on a display of the communication terminal, a notification screen that recommends at least one drink to the user based on at least the type information, the stock information, the preference information, and the biological information, wherein the notification screen recommends at least one drink that matches a preference of the user indicated by the preference information in relation to a current physical condition of the user indicated by a most recent record of the biological information, wherein, via at least one operation to the communication terminal via at least the notification screen displayed on the display, the communication terminal is configured to purchase at least one of the plurality of drinks stored in the vending machine, whereby the vending machine is configured to transport the at least one of the plurality of drinks to a pick-up port for receipt by the user.

28. A method executed in a communication terminal, the communication terminal including a user ID for identifying a user of the communication terminal, the method causing a computer of the communication terminal to perform a process, the process comprising:

acquiring, in response to receipt of a beacon signal from a vending machine, from the vending machine by using short-range wireless communication, i) identification information for identifying the vending machine, ii) type information indicating product names of a plurality of drinks stored in the vending machine, and iii) stock information indicating quantities of stock of the plurality of drinks stored in the vending machine;

transmitting the user ID to a first server that securely manages personal information, the personal information including preference information on drinks of the user of the communication terminal, the preference information on drinks of the user including information on goods purchased by the user at a sales site managed by a business operator affiliated with a management operator of the first server, the preference information being stored by the first server in time series in association with the user ID in advance of the transmitting of the user ID;

acquiring, by the communication terminal and from the first server, the preference information on drinks of the user corresponding to the user ID, when the first server confirms that acquisition of the preference information on drinks of the user is permitted by the user;

acquiring biological information of the user, the biological information being stored in time series in advance of the transmitting of the user ID;

generating a push notification screen, based on the identification information, the type information, the stock information, the preference information, and the biological information, wherein the push notification screen recommends at least one drink that matches a preference of the user indicated by the preference information in relation to a current physical condition of the user indicated by the most recent record of the biological information, from among the plurality of drinks stored in the vending machine indicated by the identification information;

displaying the push notification screen on a display of the communication terminal; and displaying, on the display of the communication terminal in response to selection of the push notification, a purchase menu that allows the at least one drink, and others from among the plurality of drinks stored in the vending machine, to be purchased, wherein, via at least one operation to the communication terminal via at least the purchase menu displayed on the display, the communication terminal is configured to purchase at least one of the plurality of drinks stored in the vending machine, whereby the vending machine is configured to transport the at least one of the plurality of drinks to a pick-up port for receipt by the user.

\* \* \* \* \*